United States Patent
Ciorba et al.

(10) Patent No.: US 9,219,830 B1
(45) Date of Patent: Dec. 22, 2015

(54) METHODS AND SYSTEMS FOR PAGE AND SPREAD ARRANGEMENT IN PHOTO-BASED PROJECTS

(71) Applicant: Interactive Memories, Inc., Palo Alto, CA (US)

(72) Inventors: Ilie Ciorba, San Mateo, CA (US); Paul Yokota, San Jose, CA (US); Thomas Allen Erickson, San Mateo, CA (US)

(73) Assignee: Interactive Memories, Inc., Palo Alto, CA (US)

( * ) Notice: Subject to any disclaimer, the term of this patent is extended or adjusted under 35 U.S.C. 154(b) by 0 days.

(21) Appl. No.: 14/678,817

(22) Filed: Apr. 3, 2015

Related U.S. Application Data

(63) Continuation-in-part of application No. 14/529,777, filed on Oct. 31, 2014, now Pat. No. 9,077,823.

(51) Int. Cl.
*G06F 3/12* (2006.01)
*H04N 1/00* (2006.01)

(52) U.S. Cl.
CPC ............ *H04N 1/00167* (2013.01); *G06F 3/125* (2013.01); *G06F 3/1208* (2013.01); *G06F 3/1243* (2013.01); *G06F 3/1256* (2013.01); *H04N 1/0044* (2013.01); *H04N 1/00145* (2013.01); *H04N 1/00164* (2013.01); *H04N 1/00188* (2013.01); *H04N 1/00196* (2013.01)

(58) Field of Classification Search
None
See application file for complete search history.

(56) References Cited

U.S. PATENT DOCUMENTS

| | | | |
|---|---|---|---|
| 4,888,648 | A | 12/1989 | Takeuchi et al. |
| 6,097,389 | A | 8/2000 | Morris et al. |
| 6,147,768 | A | 11/2000 | Norris |
| 6,389,181 | B2 | 5/2002 | Shaffer et al. |
| 6,583,799 | B1 | 6/2003 | Manolis et al. |
| 6,931,147 | B2 | 8/2005 | Colmenarez et al. |
| 7,117,519 | B1 | 10/2006 | Anderson et al. |
| 7,146,575 | B2 | 12/2006 | Manolis et al. |
| 7,383,282 | B2 | 6/2008 | Whitehead et al. |
| 7,474,801 | B2 | 1/2009 | Teo et al. |
| 7,479,949 | B2 | 1/2009 | Jobs et al. |
| 8,013,874 | B2 | 9/2011 | Reid et al. |
| 8,024,658 | B1 * | 9/2011 | Fagans et al. ................. 715/730 |

(Continued)

OTHER PUBLICATIONS

Picaboo, "Picaboo photo uploading," Picaboo website, available at http://picaboo.com/ Accessed on Mar. 4, 2014.

(Continued)

*Primary Examiner* — Miya J Cato
(74) *Attorney, Agent, or Firm* — American Patent Agency PC; Daniar Hussain

(57) ABSTRACT

Methods and systems of customizing a photobook by page arrangement and spread generation are disclosed. In one embodiment, the present invention creates an automatic grid preview of spreads, comprising pages, after a user of the user device completes a photo upload. In the grid preview, the user can swap a spread with another spread (spread location change), swap a photo from a spread with another photo from another spread (photo location change), create a new spread from a detached photo of an existing spread, add a new photo to a spread, and delete a photo from a spread. Unused photos and spreads may be stored in a temporary storage area in a manner that the unused photos and the spreads may be conveniently accessed anytime during the photobook creation process. The invention reduces friction points to purchase a photobook and increases user satisfaction with the photobook creation and customization process.

20 Claims, 49 Drawing Sheets

(56) References Cited

U.S. PATENT DOCUMENTS

| | | | |
|---|---|---|---|
| 8,326,945 B2 | 12/2012 | Grosz et al. | |
| 8,345,934 B2 | 1/2013 | Obrador et al. | |
| 8,358,846 B2 | 1/2013 | Gibbs | |
| 8,363,888 B2 | 1/2013 | Chen et al. | |
| 8,365,084 B1 | 1/2013 | Lin et al. | |
| 8,396,326 B2 | 3/2013 | Chen et al. | |
| 8,423,890 B2* | 4/2013 | Oda | 715/273 |
| 8,487,964 B2 | 7/2013 | Reid et al. | |
| 8,503,857 B2 | 8/2013 | Sikorski | |
| 8,504,932 B2 | 8/2013 | Quek et al. | |
| 8,510,669 B2 | 8/2013 | Schiller | |
| 8,520,979 B2 | 8/2013 | Conwell | |
| 8,554,020 B2 | 10/2013 | Berger et al. | |
| 8,555,154 B2 | 10/2013 | Chen et al. | |
| 8,571,331 B2 | 10/2013 | Cifarelli | |
| 8,611,677 B2 | 12/2013 | Das et al. | |
| 8,655,105 B2 | 2/2014 | Chen et al. | |
| 8,660,366 B2 | 2/2014 | Chen et al. | |
| 8,839,094 B2* | 9/2014 | Pearson et al. | 715/243 |
| 2004/0001219 A1* | 1/2004 | Wen et al. | 358/1.15 |
| 2005/0055635 A1 | 3/2005 | Bargeron et al. | |
| 2005/0105116 A1 | 5/2005 | Kobashi | |
| 2005/0129334 A1 | 6/2005 | Wilder et al. | |
| 2005/0210413 A1* | 9/2005 | Quek et al. | 715/838 |
| 2008/0155422 A1 | 6/2008 | Manico et al. | |
| 2009/0031235 A1 | 1/2009 | Martin et al. | |
| 2009/0158183 A1* | 6/2009 | McCurdy et al. | 715/764 |
| 2009/0235563 A1 | 9/2009 | Lehrman | |
| 2009/0249239 A1 | 10/2009 | Eilers | |
| 2010/0199227 A1 | 8/2010 | Xiao et al. | |
| 2010/0229085 A1 | 9/2010 | Nelson et al. | |
| 2010/0241939 A1 | 9/2010 | Rozen-Atzmon | |
| 2010/0241945 A1 | 9/2010 | Chen et al. | |
| 2011/0012929 A1 | 1/2011 | Grosz et al. | |
| 2011/0029601 A1 | 2/2011 | Grosz et al. | |
| 2011/0035759 A1 | 2/2011 | Williams et al. | |
| 2011/0167353 A1 | 7/2011 | Grosz et al. | |
| 2011/0283173 A1 | 11/2011 | Babcock et al. | |
| 2012/0066573 A1 | 3/2012 | Berger et al. | |
| 2012/0079375 A1* | 3/2012 | Ogino et al. | 715/274 |
| 2012/0294514 A1 | 11/2012 | Saunders et al. | |
| 2013/0004073 A1 | 1/2013 | Yamaji et al. | |
| 2013/0051684 A1* | 2/2013 | Chen et al. | 382/209 |
| 2013/0139055 A1 | 5/2013 | Chen et al. | |
| 2013/0177243 A1 | 7/2013 | Grosz et al. | |
| 2013/0301934 A1 | 11/2013 | Cok | |
| 2013/0322707 A1 | 12/2013 | Phillips et al. | |
| 2014/0096015 A1 | 4/2014 | Grosz et al. | |
| 2014/0205397 A1 | 7/2014 | Giamela et al. | |

OTHER PUBLICATIONS

Shutterfly, "Shutterfly photo uploading," Shutterfly website, available at http://www.shutterfly.com/ Accessed on Mar. 4, 2014.
Snapfish, "Snapfish photo uploading," Snapfish website, available at http://www.snapfish.com/ Accessed on Mar. 4, 2014.
Cluster, "Cluster photo album," Cluster website, available at https://cluster.co/ Accessed on Feb. 3, 2014.
Lulu, "Lulu photo books," Lulu website, available at http://www.lulu.com/ Accessed on Feb. 3, 2014.
Artscow, "Artscow photo album," Artscow website, available at http://www.artscow.com/ Accessed on Feb. 3, 2014.
CVS Photocenter, "CVS Photocenter photobook," CVS Photocenter website, available at http://www.cvsphoto.com/ Accessed on Feb. 3, 2014.
Digilabs, "Digilabs photo album," Digilabs website, available at http://www.digilabspro.com/ Accessed on Feb. 3, 2014.
Blurb, "Blurb photo album," Blurb website, available at http://www.blurb.com/ Accessed on Feb. 3, 2014.
MyCanvas, "MyCanvas photo album," MyCanvas website, available at http://www.mycanvas.com/ Accessed on Feb. 3, 2014.
MyPublisher, "MyPublisher photo album," MyPublisher website, available at http://www.mypublisher.com/ Accessed on Feb. 3, 2014.
Keepsy, "Keepsy photo album," Keepsy website, available at http://www.keepsy.com/ Accessed on Feb. 3, 2014.
Winkflash, "Winkflash photo album," Winkflash website, available at http://www.winkflash.com/ Accessed on Feb. 3, 2014.
Yogile, "Yogile photo album," Yogile website, available at http://www.yogile.com/ Accessed on Feb. 3, 2014.
Facebook's Shared Photo Album, "Facebook's shared photo album," Facebook's shared photo album website, available at https://www.facebook.com/help/151724461692727 Accessed on Feb. 3, 2014.
Jacobs, et al., "Multiresolution Image Querying," Proceedings of the 22nd Annual Conference on Computer Graphics and Interactive Techniques, SIGGRAPH 1995, pp. 277-286, U.S.
Athentec Imaging Inc., "Perfectly Clear by Athentech Imaging," available at http://www.athentech.com/ Accessed on Mar. 10, 2014.
Cheng, et al. "Salient Object Detection and Segmentation," IEEE Transactions on Pattern, 2011, U.S.
Forthis Production. "Update: Creating Photo Books in iOS," Review of Mosaic Photo Books, p. 8, retrieved from [http://forthisproductions.com]. Jun. 3, 2013.
Wright, Natalie. "Mixbook Photo Book," available at [www.organizedmom.net]. Jan. 2012.
Parez, Sarah. "Mixbook Reveals Mosaic: An Easy-To-Use App for Making Photo Books From Your iPhone," available at [www.techcrunch.com]. Oct. 22, 2012.
Parez, Sarah. "Now At Mixbook, Former Yobongo Team Reveals Mosaic, A Fast Way to Build Photobooks From Your iPhone," available at [www.techcrunch.com]. Sep. 7, 2012.
Parker, Jason. "Mosaic Makes Photo Books Easy," available at [http://cnet.com]. Oct. 22, 2012.
Laffoon, Andrew. "Tutorial: Moving pages together as spreads", blog entry posted Nov. 16, 2008, retrieved from [http://blog.mixbook.com].
Google Inc. Android 2.2 User Guide. May 20, 2010.
Winter, Johnny. "How to Create a Custom Photo Book Using iPhone", blog entry posted Dec. 24, 2013 retrieved from [http://computers.tutsplus.com/tutorials].
Dove, Jackie. "Got 15 Minutes? Create a printed photo book with new Montage Web app", blog entry posted Jul. 16, 2014 retrieved from [http://thenextweb.com].

\* cited by examiner

METHODS AND SYSTEMS FOR PAGE AND SPREAD ARRANGEMENT IN PHOTO-BASED PROJECTS

REFERENCE TO RELATED APPLICATIONS

The present invention is a Continuation-In-Part (CIP) and claims the benefit of earlier-filed and co-pending non-provisional application U.S. Ser. No. 14/529,777, filed on Oct. 31, 2014, entitled "SYSTEMS AND METHODS FOR AUTOMATICALLY GENERATING A PHOTO-BASED PROJECT HAVING A FLUSH PHOTO MONTAGE ON THE FRONT COVER," the entirety of which is hereby incorporated by reference herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention broadly relate to systems and methods for customizing media-based projects. Media-based projects include, but are not limited to, a photobook, a photocalendar, a photocard, a videobook, a videocalendar, a videocard, and the like. More particularly, embodiments of the present invention relate to customization of content (multimedia files, photos, text, and stylistic parameters) in creating a media-based project via an electronic commerce application of an Internet capable user device.

BACKGROUND OF THE INVENTION

The statements in this section may serve as a background to help understand the invention, but may not constitute prior art.

In the field of electronic commerce (e-commerce), there are interactive websites that assist Internet users in creating photo-based projects such as photobooks or albums, photo-calendars, photo-cards, and photo invitations. Such interactive websites allow internet users to upload photos, input text, and interact with the websites to create and order photo-based projects that are customized to user's preferences.

A common drawback with conventional photo-based project websites is the amount of time required by users (Internet users or customers) to create a photo-based project. Users must often participate in a variety of functions and processes in order to complete a photo-based project. For example, users usually must sort through the photos they desire to upload, remove the photos that are not adequate or properly focused, choose the photos to be uploaded, group photos together by topic or location, order the photos by chronological order, and crop or focus photos on the relevant portions of said photos. Furthermore, custom designing spreads and/or pages of a photobook, along with the design of a cover page (front and back hard covers) adds another complexity in a book creation project. An intelligent designing of pages and spreads in a photobook is a skill often not available to an average Internet user. Attempting to design a pleasant-looking photobook with all necessary processes can take undue time and labor.

Further, there are corrections and modifications that users must separately make on photos, pages, and spreads before the photos, pages, and spreads can be appropriately used in a photo-based project. For one example, users often would like to re-arrange or re-order photos, pages, and/or spreads once they preview a photobook, or other photo-project, but before ordering the project. Undue delays in editing a photo, page, or spread arrangement can create user frustration, increase inconvenience, and in general inconvenience and annoy users, and delay the purchasing process. Thus, conversion rates are reduced, and revenues to the photo project operator are reduced For another example, users often must correctly orient photos (landscape or portrait view), perform color corrections on photos, remove red-eye from the eyes of photo subjects, and correct photos for brightness or contrast. All of the corrections and modifications mentioned above require that the users additionally open a second program or application in a user device such as a personal computer, choose the photos to be corrected or modified, perform corrections or modifications, and then save the modified photos before using them in the project. Again, performing the corrections and modifications mentioned above may require additional skills, and can be time consuming, labor intensive, and thus creating displeasure in the entire book creation process. As a result, many users that log-on to prior art photo-based project websites often discontinue the process, without completing a purchase transaction of the photo-book.

Therefore, there is a long-felt and unsolved need to make it easy and efficient for an Internet user to create, customize, and preview a photo-based project, before ordering, on an Internet capable device.

It is against this background that various embodiments of the present invention were developed.

BRIEF SUMMARY OF THE INVENTION

An unsolved problem in an Internet device for creating a desirable photo project, photobook, or photo album by manipulating photos, pages, and spreads is resolved by the present invention. Photo editing or correction is automatically performed by using an image analysis engine that is capable of extracting photo metadata and applying image heuristics/use cases on analyzed photos. Background uploading of photos from a user device to a server, automatic grouping of photos, and content insertion into a photo project, are performed by the present invention. A photobook is produced by dragging and dropping of photos, pages, or spreads, thus creating user-desired pairing arrangements of photos, pages, or spreads. Photo editing tasks by a user are eliminated in large part, and an automation in creating a photobook is largely implemented, as taught by various embodiments of the present invention.

More precisely, in one aspect, the present invention is a method of creating a printable product, the method offered via a user device in a client-server environment, the method comprising providing an interface to allow a user to select a plurality of photos at a photo editing area of said user device; receiving an upload of said plurality of photos from said user device to a server, said server comprising a data repository for storing said plurality of photos and an engine for analyzing said plurality of photos; creating an automatic grid preview of a plurality of spreads, each spread comprising one or more photos of said printable product at said user device, wherein said grid preview is rendered by said server onto said user device; offering to said user an option of re-arrangement for manually re-arranging said plurality of spreads and said plurality of photos, wherein each spread or each photo is offered for re-arrangement, wherein a manual re-arrangement overrides contents of said grid preview, wherein said each spread or each photo is re-arranged by at least one action selected from the group consisting of (a) swapping at said grid preview the location of a first spread with the location of a second spread, (b) moving at said grid preview a first photo from said first spread to said second spread, and (c) dragging at said grid preview a second photo from said first spread to outside of said first spread, and dropping said second photo between said first spread and said second spread, wherein said dropping automatically creates a new third spread comprising said second photo, said new third spread located between said first spread and said second spread; sending to a printer an order to print said printable product; and printing said product on paper, wherein when said product is printed it becomes a delivery item to said user who placed said order for printing and delivery.

In one aspect of the method, said photo editing area offers a temporary photo storage area to store an unused third photo, wherein said unused third photo is later inserted into said first spread, and wherein a fourth photo is deleted from said second spread, wherein said deleted fourth photo is automatically dropped at said storage area.

In one embodiment, said printable product is a photobook. In another embodiment, said each spread consists of two pages.

The method, in another embodiment, further comprises, creating a manifested preview of said photobook based on said re-arrangement, wherein said manifested preview is a three-dimensional virtual production of a printable photobook graphically showing a front cover, a back cover, a spine, and said plurality of spreads, wherein said front cover, said back cover, and said plurality of spreads are virtually flappable or turnable via a computer mouse or a keystroke or a touch gesture, wherein said manifested preview is created before sending to said printer said order to print said photobook.

In some aspects of the invention, after a project is ordered to print, the project is permanently saved and is un-editable. In some aspects of the invention, the project before sending said order to print is temporarily auto-saved from time-to-time, and is editable.

In another aspect, the present invention is a non-transitory, computer-readable storage medium storing executable instructions, which when executed by a processor, causes the processor to perform a process of creating a printable product in a client-server environment, the instructions causing the processor to perform the steps taught in the preceding paragraphs. In another aspect, the present invention is a system for creating a printable product, the system comprising a user device having a processor, a display, and a first memory; a server comprising a second memory and a data repository; a telecommunications-link between said user device and said server; and a plurality of computer codes embodied on said memory of said user-device, said plurality of computer codes which when executed causes said processor to execute a process comprising the aforementioned steps. Other aspects of the present invention will be described in the detailed description.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 1R-1 is a diagram showing a splash-screen of uploading photos for a photobook creation in a mobile device, according to one embodiment of the invention.

FIG. 1R-2 is a flow diagram showing a process of photobook creation in a mobile device, according to one embodiment of the invention.

FIG. 1R-3 is a diagram showing pages and spreads of a photobook in a mobile device, according to one embodiment of the invention.

FIG. 1R-4 is a diagram showing dragging of a photo in a mobile device, according to one embodiment of the invention.

FIG. 1R-5 is a diagram showing a photo before dragging in a mobile device, according to one embodiment of the invention.

FIG. 1R-6 is a diagram showing a photo after dragging but before dropping, according to one embodiment of the invention.

FIG. 1R-7 is a diagram showing a photo after being dropped in a mobile device with pages reshuffled, according to one embodiment of the invention.

FIG. 1R-8 is a diagram showing a virtual photobook in a mobile device, according to one embodiment of the invention.

FIG. 1R-9 is a diagram showing an opened cover of a photobook in a mobile device, according to one embodiment of the invention.

FIG. 1R-10 is a diagram showing a virtual photobook with flappable pages and spreads in a mobile device, according to one embodiment of the invention.

FIG. 3 is a flowchart showing an automatic insertion of content into a design, according to an embodiment of the present invention.

FIG. 4 is a flowchart showing a first automatic and then a second manual insertion of content into a design, according to an embodiment of the present invention.

FIG. 5 is a flowchart showing a simultaneous automatic and manual insertion of contents into a design, according to an embodiment of the present invention.

FIG. 7 is an exemplary screenshot of an editing interface displaying a photo spread across multiple pages (front cover, back cover, and spine), according to an embodiment of the present invention.

FIG. 8 is a block diagram illustrating an asset recommendation system, according to an embodiment of the present invention.

FIG. 9 is an architectural diagram illustrating a printing network, according to an embodiment of the present invention.

FIG. 10 is a diagram showing a printable photobook with a cover in a virtually finished form, according to one embodiment of the invention.

DETAILED DESCRIPTION OF THE INVENTION

Glossary Definitions

Figure 1A:
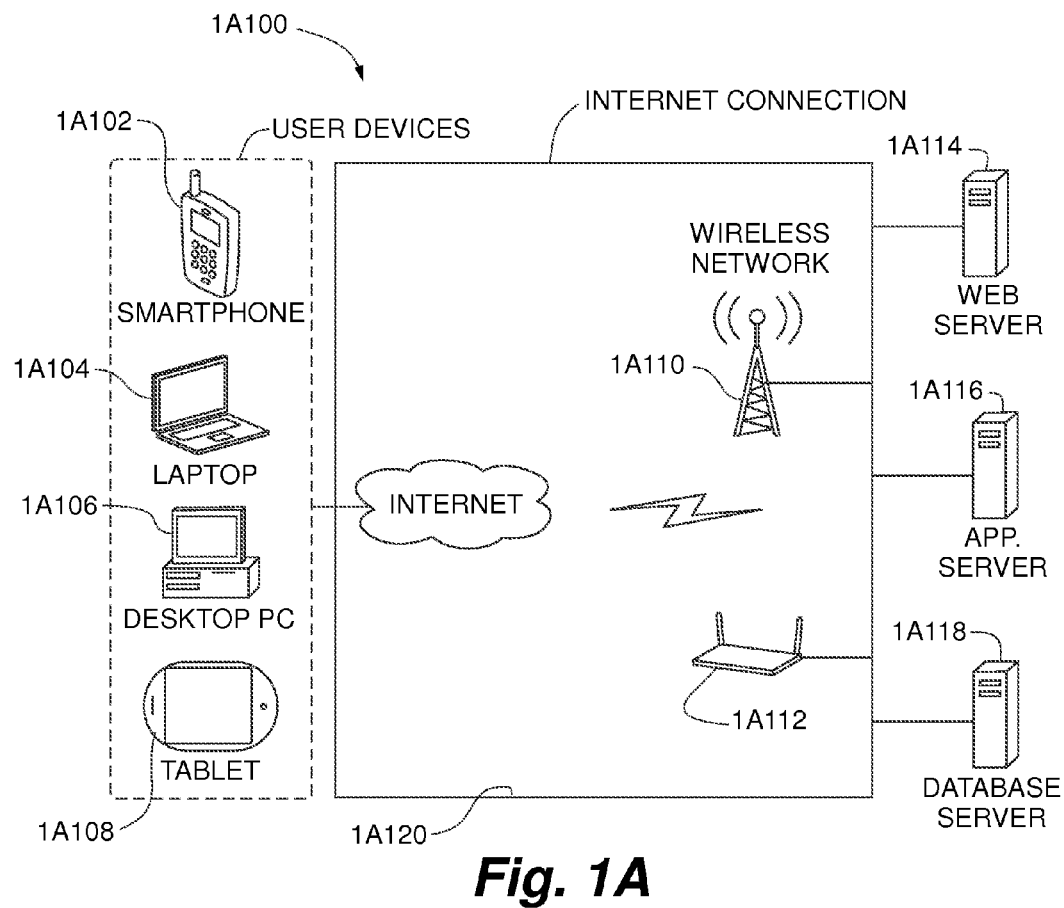
FIG. 1A is a network configuration diagram in which the present invention may be practiced.

The following terms shall have the below definitions throughout this specification and claims. The terms may be used in the form of nouns, verbs or adjectives, within the scope of the definitions.

"Grid preview" is a framework of virtual spaced bars (rectangular or square) that are parallel or across each other. In a grid preview of a photo-project, all pages or spreads of the photo-project are displayed along a virtual grid on a display screen, wherein all pages or spreads are in miniature forms in a single display, and such miniature forms are individually editable via input devices.

"Space constrained device" is a device that has limited space or limited means to offer user inputs into such devices. Limited space or limited means include, such as, a miniature soft on-screen keyboard, a touch screen of a smart phone, a stylus of a touch screen device, and the like.

"Virtual manifestation" refers to a virtually displayed but appearing on screen like a real photobook that will eventually be produced by printing and binding, after an order to print is received.

"Project", "photo-project", "photo-based project", or "media-project" is a computer-representation of a photo or multimedia based product that is worked on either collaboratively or singularly by one or more users, that is either printed and shipped physically, or delivered electronically to the one or more users.

"Communications network" is a collection of terminal nodes, links and any intermediate nodes that are connected so as to enable telecommunication between the terminals. The Internet is a widely used communications network.

"Physical medium" and "storage medium" refer to an article of manufacture in which computer program code may be stored, said program code later to be executed by a computer having at least one processor, such as a server.

"Data repository" refers to a central place, such as a database, where data is stored and maintained. It is also a logical (and sometimes physical) partitioning of data where multiple databases which apply to specific applications or sets of applications reside.

"Interface", "user interface", or "graphical user interface (GUI)" is a user interface (UI) in a display of a computer screen, where a user of a computer system can provide input. A touch interface is an interface where a user can provide an input by using a finger or stylus.

"Server" is a computer comprising a processor and a memory that is used by the system to provide the software program code implementing the invention to multiple client devices over a communications network.

"User-device", "client device", "mobile device," "computing device", or "user-operated computer" is a computer with a display, input options, a processor and a memory, often in the form of a laptop, desktop, tablet, smartphone, or the like, that is used by users of the system to access the services of the present invention.

"Client-server connection", "telecommunications link", or "client-server environment" is a connection between a sever and a user-device via a communications network.

"Image", "photo," and "photograph" shall be used interchangeably to refer to a digital image stored in memory.

"Multimedia content" and "content" refers to images and/or text.

"Visual content", "visual information", and "image information" is 2-D information presented in images after it has been processed and analyzed through computer algorithms.

"Automatic image information" is visual information in the images extracted by the system using automated photo analysis carried out by a processor.

"Observed image information" is visual information in the images extracted by the system through observing user interactions at the GUI.

"Media analysis," "photo analysis," and "image analysis" are all computer-based methods of extracting visual information from media files. These terms are used interchangeably to refer to an automated software and/or hardware process by which important features or salient features of the media files are identified, separated from background, extracted, and analyzed. Photo analysis in particular extracts useful information from digital images by means of digital image processing. In some embodiments, photo analysis comprises "feature extraction," in which specific features are extracted. Examples of features include, but are not limited to, scenery, faces, wedding cakes, people present, etc.

"Computer vision" is a field that includes methods for acquiring, processing, analyzing, and understanding images and high-dimensional data in order to produce numerical or symbolic visual information.

"Metadata" or "meta-data" is a set of data that describes and gives information about images. Meta-data also comprises data embedded in a digital image, which is known as EXIF (Exchangeable Image File Format) data.

"Automatic customization actions" refer to any automatic editorial work performed automatically by the system to customize a design of a photo project. Examples of customization actions include, but is not limited to, matching images automatically to a use case specific theme, grouping similar images, grouping images having identical faces, grouping images having identical objects, removing undesirable images, cropping images to highlight relevant portions of said images, applying correction function on the plurality of images, and so on.

"Printed project" and "printed product" refer to a project that is physically printed on a paper by a printing machine. Examples of printed products include, but not limited to, a photobook, a photocalendar, a photocard, and the like.

"Use case" refers to a use, context, or events related to a use of the printed project. Use cases may comprise a wedding, a night out, an event with friends, a baby, a year in review, a trip, a water-related event, a beach trip, a lake trip, a pool trip, a snow-related event, a ski trip, a road trip, and the like. A use case is any scenario in which the user will be ultimately providing images from.

"User analysis" comprises behavioral observation of the user's inputs, interests, and choices, and any data relevant to the interest of the user. Such data can be obtained by the user's own inputs or by third party applications comprising social networking sites. User analysis is performed on the expected user of the printed product. User analysis can be manual inputs as well as automatic extractions.

"User data" refers to data obtained through user analysis. The user's interactions with the system and/or behavioral observations of the user by the system via user inputs create such user data.

"Social media platform" refers to social or professional networking sites. Such sites include, but are not limited to, FACEBOOK, TWITTER, LINKEDIN, and the like.

"Canvas" is a virtual page of a project as displayed on a GUI, before being printed into a printed product. A canvas has a particular design for a page or pages of a project, which is selected by selecting a design from a designset (and automatically inheriting a layout from a layoutset, since every designset is tied to a layoutset). The canvas includes the design along with the content inserted by the user into the design.

"Layout" specifies a number of photo and/or text slots and their positions on a canvas. No style is applied on a layout.

"Layoutset" is a collection or set of layouts. Layouts are distinguished by their types. The types comprise magazine layouts, signature layouts, and the like.

"Style", "styling", or "style and formatting information" adds design customizations over a layout, in which the customizations comprise frames, stickers, backgrounds, borders, and their appearances and positions, including fonts, colors, etc.

"Design" is a particular style on top of a layout.

"Designset" is a collection or set of designs. Designs are grouped by the layoutsets being used. One layoutset can spur off many designsets. A design from a given designset can choose its layout from the associated layoutset that is also related to that designset. That is known as a "design-layout relationship."

"Theme" is a collection or set of designsets.

"Spread" is a canvas that extends to two opposite pages of an album or book. Two opposing pages can have one photo stretching to two pages, or a plurality of photos arranged across the two pages, based on a design choice made by a user. The outer cover of a book may have an additional part, called spine, which bridges a front cover and a back cover. Therefore, a spread on the outer cover of the book may stretch to three elements, including the front cover, the spine, and the back cover. In some other parts of the specification, the word "spread" may also be used to mean simply "extend to" or "distribute across." The usage of the word "spread" that is intended will be clearly evident from the context of the use of the word "spread" within the context of the paragraph or sentence in which it is being used.

"Page" in the context of a photobook refers to a page on which a user designs a photo page for a photobook creation. In a book, when two opposing pages flip open, in the same manner of a butterfly opening up wings, the two opposing pages may be called a "spread", as defined above. In a two page design, in the form of a butterfly-like inside-wings, one photo can stretch to two opposing pages. Alternatively, in one spread, each page may comprise a plurality of photos. An inside page of a book may be different from an outside page, or cover, of the same book. An outside page, or cover, may often be harder, being a hard cover. An outside page may include (1) a front cover, (2) a back cover, and (3) a spine, between the front cover and the back cover. Hence, a full outside cover or outside spread of a photobook may have these three elements, which contrasts with an inside spread that consists of just two opposing pages.

"Photo slot" is a slot or location on a page of a canvas in which a target image or photo can be placed.

"Text slot" or "caption slot" is a slot or location on a page of a virtual canvas in which text or a caption can be inserted.

"Aesthetics" is a visual appearance of a design, designating the look and feel of the design.

"Saliency" refers to a most relevant and/or most important part of an image as determined by image analysis or user action analysis (user inputs).

"Face detection" is a specific type of image analysis that determines locations and sizes of human faces in images. The algorithms used detect faces from background (buildings, trees, bodies, and the like).

"Object detection" is a specific type of image analysis that detects instances of semantic objects of a certain class in digital images and videos.

"Timestamp" is a sequence of characters or encoded information identifying when a certain event occurred, usually providing date and time of day, sometimes accurate to a small fraction of a second.

"Image heuristics" refers to specific types of image analysis that are based on experience-based techniques for image analysis that give a solution that is not guaranteed to be optimal. Certain image issues for creating an optimal design are resolved in certain ways as defined in the specification. Such issues primarily are relevant in image processing and image editing, to finally produce a design. Since such solutions are not guaranteed to be optimal global solutions, they may be referred to as image heuristics in some embodiments.

"Image sequence" is a sequence of images in which the sequence is determined by timestamp, geo-location, landscape, or by some other ordering.

"Image score" is a relative importance of an image calculated mathematically to determine a best fitting image for an intended use.

"Rule" refers to any instruction provided by the methods and the systems of the present invention in the process of creating a project. A rule comprises image heuristics, computer programs or codes, and/or algorithms.

"Algorithm" is a set of instructions to be followed in calculations or image processing, especially by a computer. In a computer implemented method or system, the term algorithm may be used interchangeably with the terms "rules" or "instructions," to refer to a sequence of steps to be carried out by a computer processor following instructions encoded in memory.

"Buffer area" is an area around an object of interest in the photo. For example, if one takes a photo of an apple on a table, one wouldn't want the photo window to crop the apple exactly at the edge of the apple. One would want there to be "buffer area" around the apple so that it doesn't look crowded on the page. The size of the buffer area is an aesthetic choice of the user or designer.

"Focal box", "focal area," or "focal subsection" is defined on a layout or a design, and defines an area within a photo slot that is "visible" or "unobstructed." In other words, this is the area on the design where the photo can clearly be seen. If a photo slot were completely uncovered, then this focal box would simply be the dimension of the photo slot itself. The focal box can be represented with any shape, not just a rectangle, as long as it's a continuous shape. That is, a focal box is a box of any shape that is contained within the bounds of a photo slot, which a photo is fitted to. Most of the time, the focal box and the bounds of the photo slot are the same. However, when there is something covering parts of the photo slot (for example, a caption covering up a portion of a photo slot, a border, or any other obstruction to the photo slot), then the focal box is adjusted to be less than the actual photo slot, so that any inserted photo is automatically shifted away from the area that is covered.

"One embodiment" or "an embodiment" means that a particular feature, structure, or characteristic described in connection with the embodiment is included in at least one embodiment of the invention. The appearance of the phrases "in one embodiment" in various places in the specification is not necessarily all referring to the same embodiment, nor is a separate or alternative embodiment mutually exclusive of other embodiments. Various features are described which may be exhibited by some embodiments and not others.

Overview

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematic, use case, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

In the field of electronic commerce (e-commerce), there are interactive websites that assist Internet users in creating photo-based projects such as photobooks or albums, photo calendars, photo cards, and photo invitations. Such interactive websites allow Internet users to upload photos, input text, and interact with the websites to create and order photo-based projects that are customized to user's preferences.

The inventors of the present invention have created methods and systems of customizing a photobook by page arrangement and spread generation. An unsolved problem for efficiently creating a desirable photobook or photo album by manipulating photos, pages, and spreads is resolved by the present invention. The present invention reduces the number of Internet users who, because of undue time and labor required by prior art media-based projects, drop off or discontinue a photobook creation process before completing a purchase of the photobook.

Broadly, embodiments of the present invention relate to methods and systems of customizing a photobook by page arrangement and spread generation. In one embodiment, the present invention creates an automatic grid preview of spreads comprising pages, after a user of the user device completes a photo upload. In the grid preview, the user can swap a spread with another spread (spread location change), swap a photo from a spread with another photo from another spread (photo location change), create a new spread from a detached photo of an existing spread, add a new photo to a spread, and delete a photo from a spread. Unused photos and spreads may be stored in a temporary storage area in a manner that the unused photos and the spreads may be used anytime in the book creation process. The invention therefore reduces friction points to purchase a photobook and increases user satisfaction with the photobook creation and customization process.

Photo editing or correction may be automatically performed in some embodiments by using an image analysis engine that is capable of extracting photo metadata and applying image heuristics/use cases on analyzed photos. Background uploading of photos from a user device to a server, automatic grouping of photos, and content insertion into a photo project, are performed by the present invention. A photobook is produced by dragging and dropping of photos, pages, or spreads, thus creating user-desired pairing arrangements of photos, pages, or spreads. Photo editing tasks by a user are eliminated in large part, and an automation in creating a photobook is largely implemented, as taught by various embodiments of the present invention.

More precisely, in one aspect, the present invention is a method of creating a printable product, the method offered via a user device in a client-server environment, the method comprising: providing an interface to allow a user to select a plurality of photos at a photo editing area of said user device; receiving an upload of said plurality of photos from said user device to a server, said server comprising a data repository for storing said plurality of photos and an engine for analyzing said plurality of photos; creating an automatic grid preview of a plurality of spreads, each spread comprising one or more pages of said printable product at said user device, wherein said grid preview is rendered by said server onto said user device; offering to said user an option of re-arrangement for manually re-arranging said plurality of spreads and said plurality of photos, wherein each spread or each photo is offered for re-arrangement, wherein a manual re-arrangement overrides contents of said grid preview, wherein said each spread or each photo is re-arranged by at least, (a) swapping at said grid preview the location of a first spread with the location of a second spread, (b) moving at said grid preview a first photo from said first spread to said second spread, and (c) dragging at said grid preview a second photo from said first spread to outside of said first spread, and dropping said second photo between said first spread and said second spread, wherein said dropping automatically creates a new third spread comprising said second photo, said new third spread located between said first spread and said second spread; sending to a printer an order to print said printable product, wherein after said product is ordered to print, said product is permanently saved as a soft-copy and is un-editable, wherein said product before sending said order to print is temporarily auto-saved and is editable; and printing said product on a resizable photo paper, wherein when said product is printed, said printed product becomes a delivery item to said user, wherein said user places said order for printing and delivery. In the method, said photo editing area offers a temporary photo storage area to store an unused third photo, wherein said unused third photo is later inserted into said first spread, and wherein a fourth photo is deleted from said second spread, wherein said deleted fourth photo is automatically dropped at said storage area. In one embodiment, said printable product is a photobook. In another embodiment, said each spread consists of two pages. The method, in another embodiment, further comprises, creating a manifested preview of said photobook based on said re-arrangement, wherein said manifested preview is a three-dimensional virtual production of a printable photobook graphically showing a front cover, a back cover, a spine, and said plurality of spreads, wherein said front cover, said back cover, and said plurality of spreads are virtually flappable or turnable via a computer mouse or a keystroke or a touch gesture, wherein said manifested preview is created before sending to said printer said order to print said photobook.

In another aspect, the present invention is a non-transitory, computer-readable storage medium storing executable instructions, which when executed by a processor, causes the processor to perform a process of creating a printable product in a client-server environment, the instructions causing the processor to perform the steps taught in the above paragraph.

In another aspect, the present invention is a system for creating a printable product, the system comprising: a user device having a processor, a display, and a first memory; a server comprising a second memory and a data repository; a telecommunications-link between said user device and said server; and a plurality of computer codes embodied on said memory of said user-device, said plurality of computer codes which when executed causes said processor to execute a process comprising the aforementioned steps.

Generally, to create a photobook online, a user needs to select photos from a user-device, such as a laptop or mobile device. Once the photos are selected, the photos are uploaded to a server. Upon image analysis of the uploaded photos by the server, the server provides essential tools to the user-device to build a photobook. A server operates within a client-server architecture of a computer system. A server comprises computer hardware and software to serve computational requests of other programs or clients. A client comprises a user-device, such as, a laptop, a smartphone, or a desktop PC. A server performs tasks on behalf of clients. A server often provides services via the Internet or other network.

In some embodiments, the media-based project comprises a physical manifestation of the project, resulting in a printed photobook, photo album, or other physical manifestation of the project. A photobook may be printed on a canvas or photo quality paper and bound together as a book. The media-based project also includes an online product comprising: audio, video, image and text—all packaged together as a single cohesive item or product for display or sharing through online means or electronic means, or for ordering a physical version of said online product.

A media-based project is not limited to a photobook. A photobook is a physical manifestation of the project in the form of a printed product. A physical manifestation may not be necessary in other embodiments, such as, an online video album, an online photo album, and/or combinations thereof. In the description that follows, a photobook may be used as a representative of any type of media-based project.

MONTAGE, MOSAIC, and MIXBOOK are trademark names carrying embodiments of the present invention, and hence, the aforementioned trademark names may be collectively or interchangeably used in the specification and drawings to refer to the products/services offered by embodiments of the present invention. Because all of the products are created from media-files using a graphical manipulation system provided by the inventors as a network-based software application, the relative terms descriptive of the overall process and for the providing company are MONTAGE, MOSAIC, and/or MIXBOOK. The terms MONTAGE, MOSAIC, and/or MIXBOOK may be used in this specification to describe the overall media-based product creation and editing process of the invention, the website, mobile app, or web-app through which the process is made accessible to authorized users, and/or the service-providing company. With reference to the figures, embodiments of the present invention are now described in detail.

System Architecture

FIG. 1A shows a schematic diagram of a network configuration 1A100 for practicing embodiments of the present invention (this embodiment is sometimes known as "MONTAGE"). A user-device or devices may be connected to the Internet using a wireless network or wired network. A user-device may be a smartphone 1A102, laptop 1A104, desktop PC 1A106, or tablet 1A108. The wireless network comprises a cellular tower 1A110, or a wireless router 1A112. User-devices are connected to servers comprising a web server 1A114, an application server 1A116, and a database server 1A118. The servers are connected to a user-device through the wireless network, or the wired network 1A120. The wired network 1A120 or the wireless network may employ technologies and protocols comprising Ethernet technology, Local Area Network (LAN), Wide Area Network (WAN), and optical network, and the like.

Figures 1, 1B:
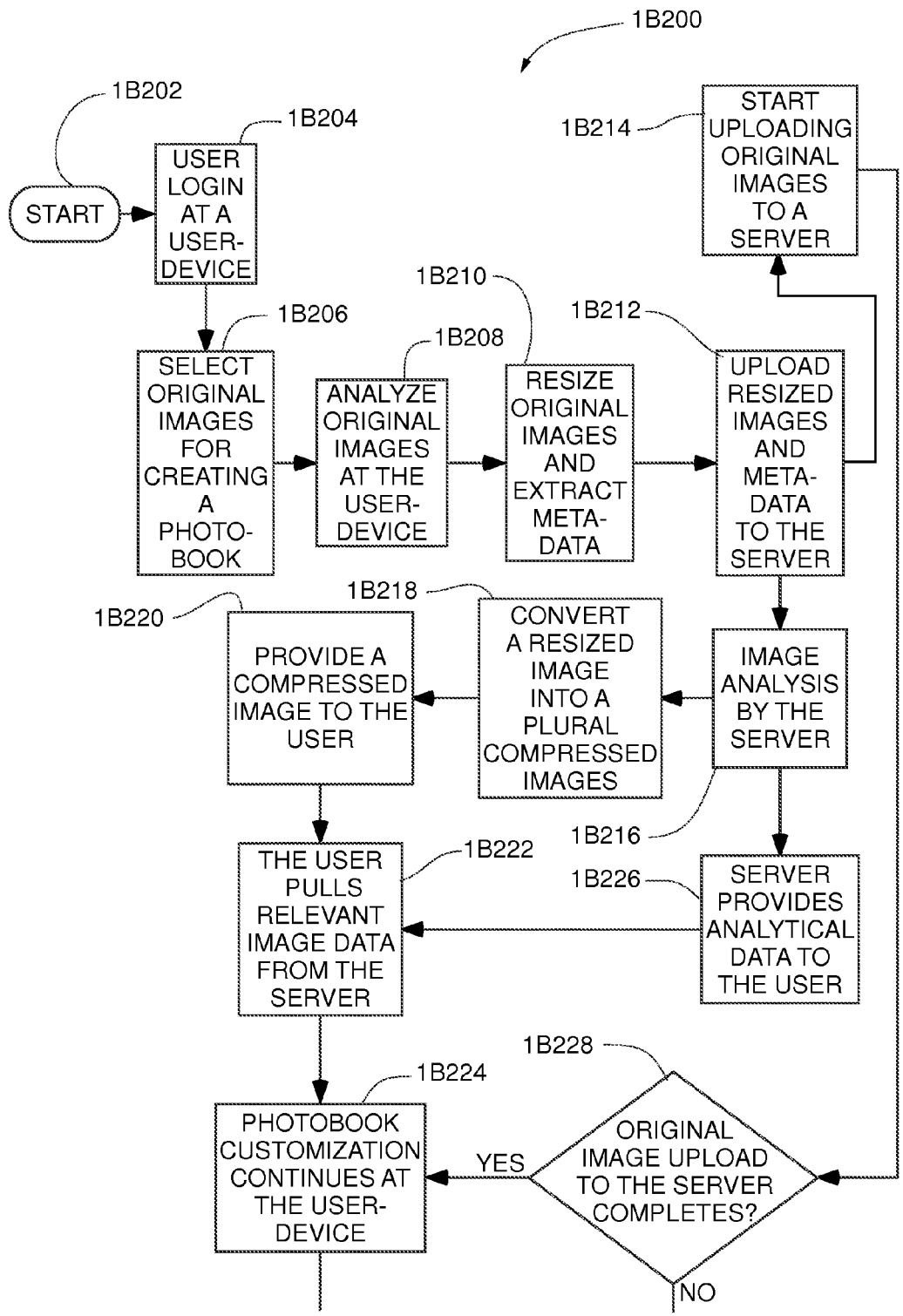
FIGS. 1B-1 and 1B-2 comprise a flow diagram showing a method of background uploading of media files, according to one embodiment of the invention.
Figures 1, 1B, 2:
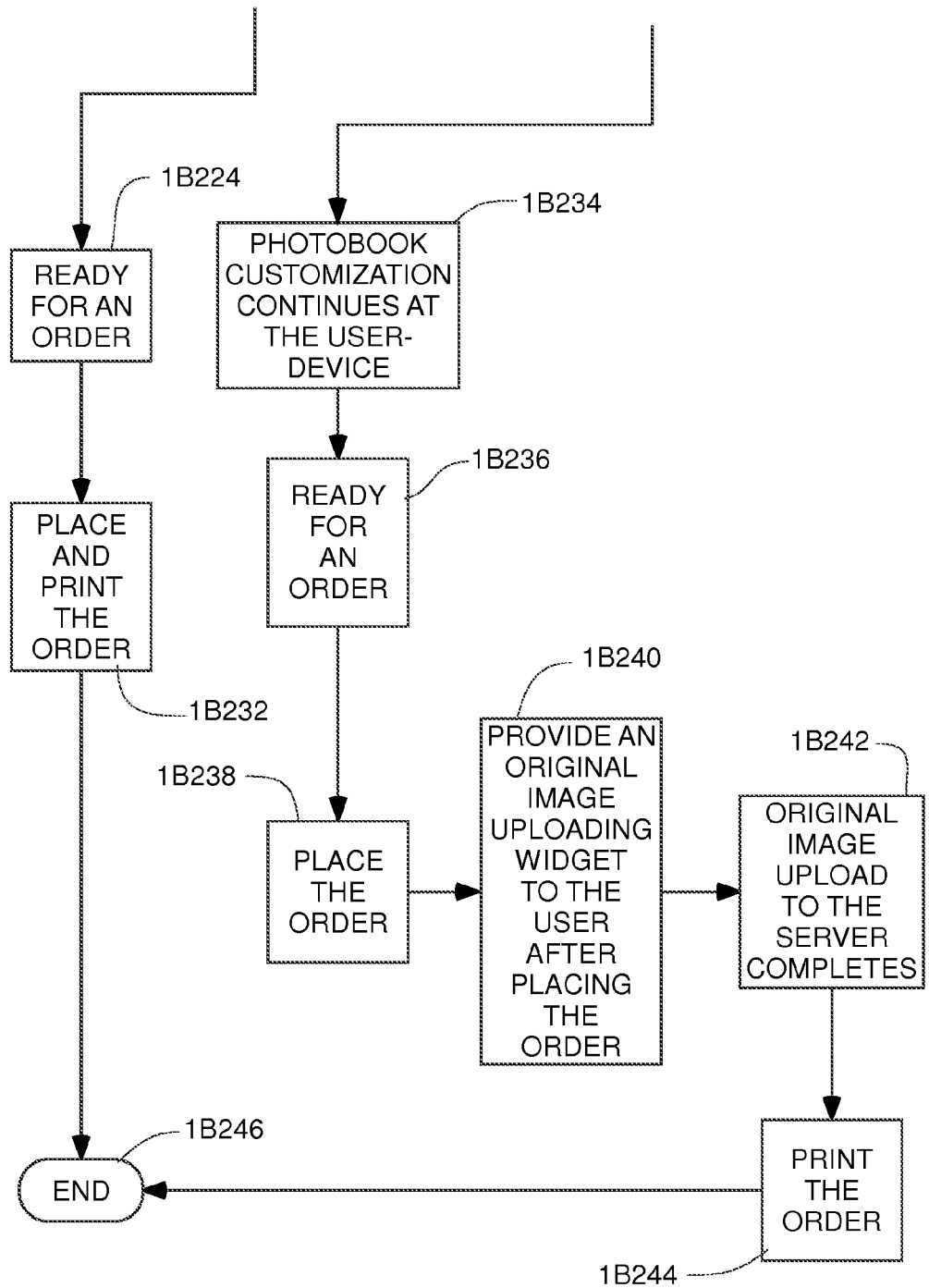

FIGS. 1B-1 and 1B-2 show a flow diagram of an exemplary embodiment 1B200 showing a method of background uploading of media-files while an Internet user is customizing a media-based project, which in this embodiment is a photobook. An Internet user (hereinafter "user") starts the process of creating a media-based project (hereinafter "project") using a user-device at step 1B202. The term photobook or project may be used interchangeably. The user logs in at step 1B204 using the user-device. After the user logs in at the user-device, at step 1B206 the user selects original media files or images for creating a photobook. At step 1B206, following the log-in process at the user-device, the user is provided a workspace (also called "editor") where the user can practice or utilize various embodiments of the present invention to customize, edit or create the photobook. After the selection of images is made, then at step 1B208, optionally and in some embodiments, the client-device analyses the images. Once the optional image analysis is completed at the client-device, at step 1B210 the original images are resized to smaller sized image files and a meta-data is extracted from each original image. Meta-data is a type of data that is relevant to or embedded in an image. Meta-data comprises digital data about a media file. In one embodiment, meta-data is an Exchangeable Image File format data, or "EXIF" data (also in some cases known as "Exif" data). EXIF is a standard that specifies a format for images, sound, geolocation data (provided by a Global Positioning Receiver or GPS receiver attached to a camera), and ancillary tags used by digital cameras, smartphone cameras, scanners, and other systems that handle image and/or sound files recorded by digital cameras. EXIF data comprises a broad spectrum of data, including, but not limiting to, date and time information of images taken, GPS location of images, camera settings (camera make and model, image orientation or rotation, aperture, shutter speed, focal length, metering mode, and ISO information), a thumbnail of the image, a description of the images, and/or copyright information thereof.

At step 1B212, the resized image files and the meta-data are uploaded to the server. The resized image files are smaller in size as compared to the larger sized original images, but not so small as to be un-useable by the server for image analysis. The resized images are immediately provided to the user-device for building the project. After the resized images and the extracted meta-data of the original images are uploaded to the server, step 1B214 will follow to begin uploading the original images to the server in a background computer process at the user-device. Using the uploaded resized images and the meta-data, at step 1B216, the server performs a server-side image analysis. An image analysis comprises image optimization algorithms, image ranking algorithms, feature or object detection algorithms, use case formation techniques, layout, and/or photobook design formation techniques, as described in greater detail below. Once the server-side image analysis is completed, at step 1B218, the server converts the resized uploaded media files into multiple sizes or multiple (plural) compression levels (the term "compressed media file" or "compressed image" is used herein to refer to a media file that has been in some way modified by the server and of a different size from the resized file uploaded from the client to the server). At step 1B220, the server provides to the user-device a compressed image, or an image of a size relevant to the scope of the project (photobook). The server converts a resized image into many different sizes (called "compressed files" herein) so that each size may be called by the user-device depending on the scope of the project. The scope of the project may comprise different sizes and different resolutions of image files, wherein the server performs the server-side image reduction to prepare images of different sizes as needed by the project. While the server performs the server-side image reduction using the resized image files, the original image files are still uploading in the background computer process. At step 1B226, the server provides analytical data to the user. At step 1B222, the user pulls relevant image data comprising image files and analytical data from the server. At step 1B224, the user continues customizing (building) the photobook or project. At step 1B228, the original image files may or still may not be uploaded [completed upload] to the server. If the original image files are uploaded to the server, the user continues building the photobook as shown by step 1B224. If the original image files are not uploaded, the photobook customization still continues at step 1B234. If the original image files are uploaded and the photobook customization continues (and thus completes), the photobook will be ready to order at step 1B224. At step 1B232, the user can place an order to print the photobook. Once the photobook is ordered and printed at step 1B232, the embodiment 1B200 ends at step 1B246.

In the event that the upload of the original images is not complete, the user still customizes (and thereby completes) the photobook at step 1B234, and is ready to order the photobook at step 1B236. The user places the order at step 1B238. Once the order is placed at step 1B238 and the original images are still not uploaded, the embodiment 1B200 provides the user a widget to upload [begin a new upload or complete the ongoing upload] the original image files that the user selects. Step 1B238 allows the user to order the photobook before the upload of the original image files completes. At step 1B240, the embodiment 1B200 provides the user an optional uploading mechanism of original image files if the user does not have time to wait until the original images are uploaded to the server before placing an order to print the photobook. However, in another embodiment, step 1B240 can happen before step 1B238 and/or before the step 1B236; that is, a widget to upload original images may be provided to the user-device before placing an order, or before the order is ready. In other words, steps discussed herein may be switched, overlapped, or altered as long as the spirit of the present invention is consistent with the plurality of embodiments described herein. An uploading widget may comprise a software application that the user can download from an embodiment of the present invention. Once the widget is downloaded and installed at the user-device, the user can begin uploading or continue uploading the original image files using the installed widget. At step 1B242, the original image files are uploaded to the server with the aid of the widget. After the original image files are uploaded to the server, at step 1B244 the server can send the order to print the finished product. The embodiment thereby ends at step 1B246.

Montage Embodiments

Figure 1C:
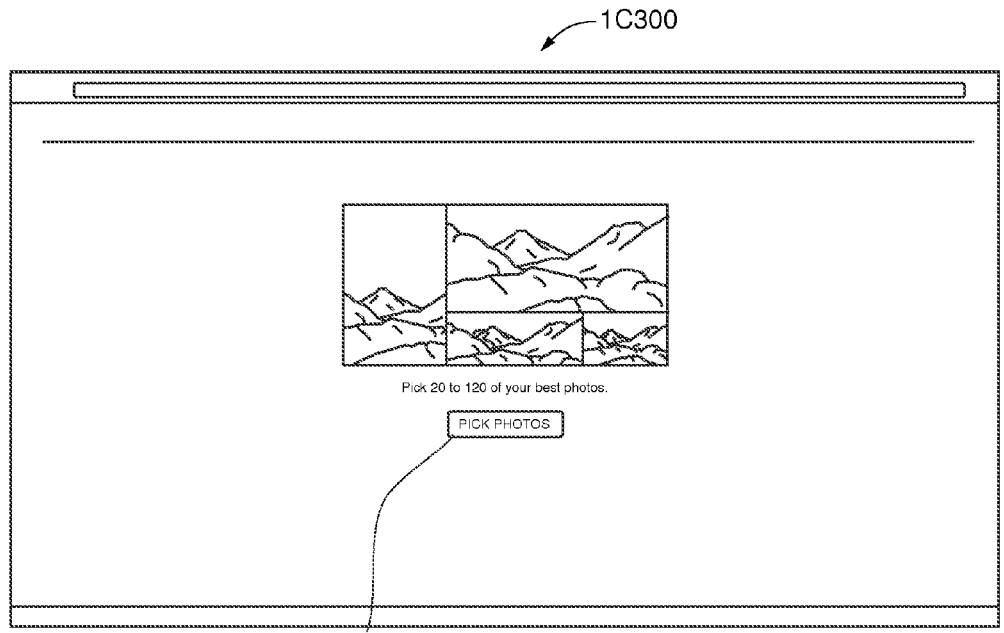
FIG. 1C is a diagram showing a method of selecting media files, according to one embodiment of the present invention (this embodiment sometimes known as "MONTAGE").

FIG. 1C is a screenshot embodiment 1C300 showing a method of selecting original media files or images at a user-device. In the embodiment 1C300, a user-device may select original images by clicking a button 1C302, labeled as "pick photos." A button is a soft-button in a software embodiment. The words "image(s)" and "photo(s)" are used interchangeably in this specification.

Figure 1D:
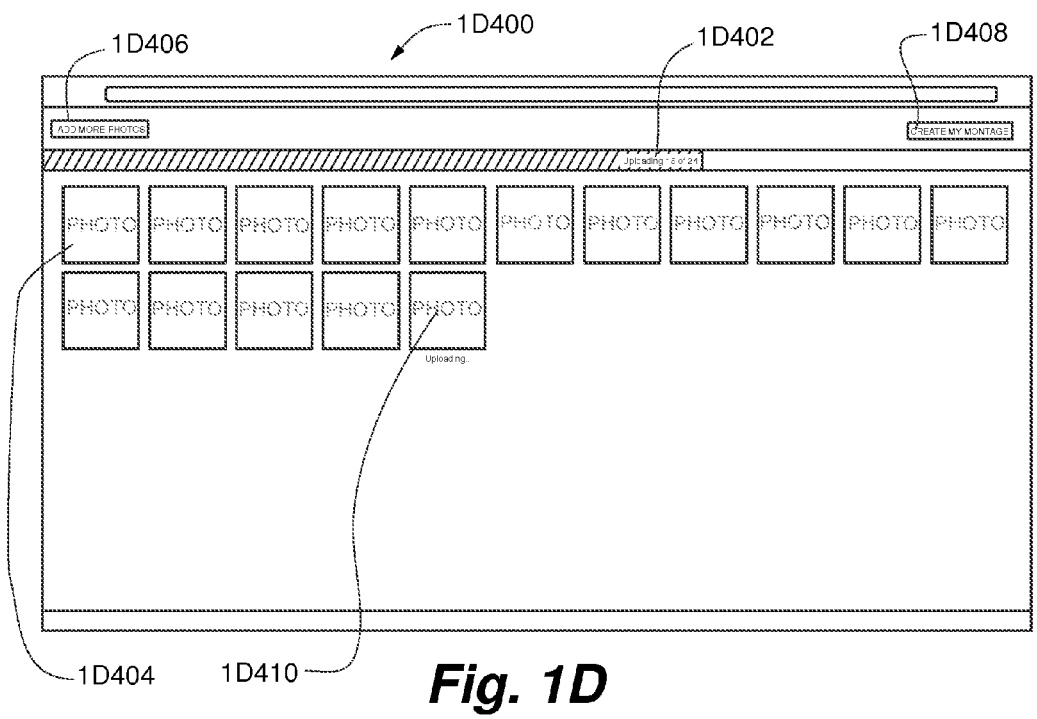
FIG. 1D is a diagram showing a method of uploading media files, according to one embodiment of the invention.

FIG. 1D is a screenshot embodiment 1D400 showing an upload of original images to a workspace of a user-device after the user-device selects or picks images. A workspace at a user-device is also called an editor. A progress bar 1D402 shows the number of images uploaded or uploading to the workspace. An uploaded image 1D404 is displayed in the workspace. The embodiment 1D400 also shows an uploading image 1D410 when the image is being uploaded. The embodiment 1D400 demonstrates client-side resizing of original image files. The image 1D404 is a resized image that is smaller than the original image. A button 1D406 allows the user to add more images. After the selected images are uploaded to the workspace of the client-device, the user can click a button 1D408 to create a design of a photobook using the uploaded photos in the workspace. The button 1D408 reads "create my Montage," where MONTAGE is a trademark name, but not a functional name, of the button 1D408.

Figure 1E:
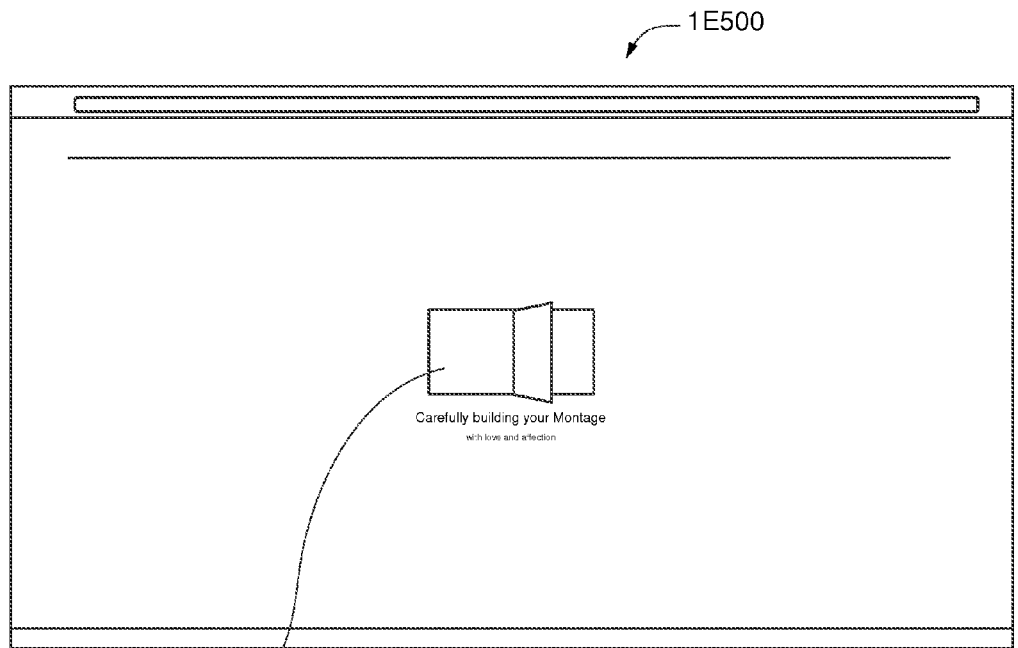
FIG. 1E is a diagram showing a method of building a media-based project, according to one embodiment of the invention.

FIG. 1E is a screenshot embodiment 1E500 in which the present invention does an analytical work or analysis work to build a photobook. An exemplary symbol 1E502 teaches that the present invention is building a photobook by performing the analytical work or analysis work, such as an image or video analysis.

Figure 1F:
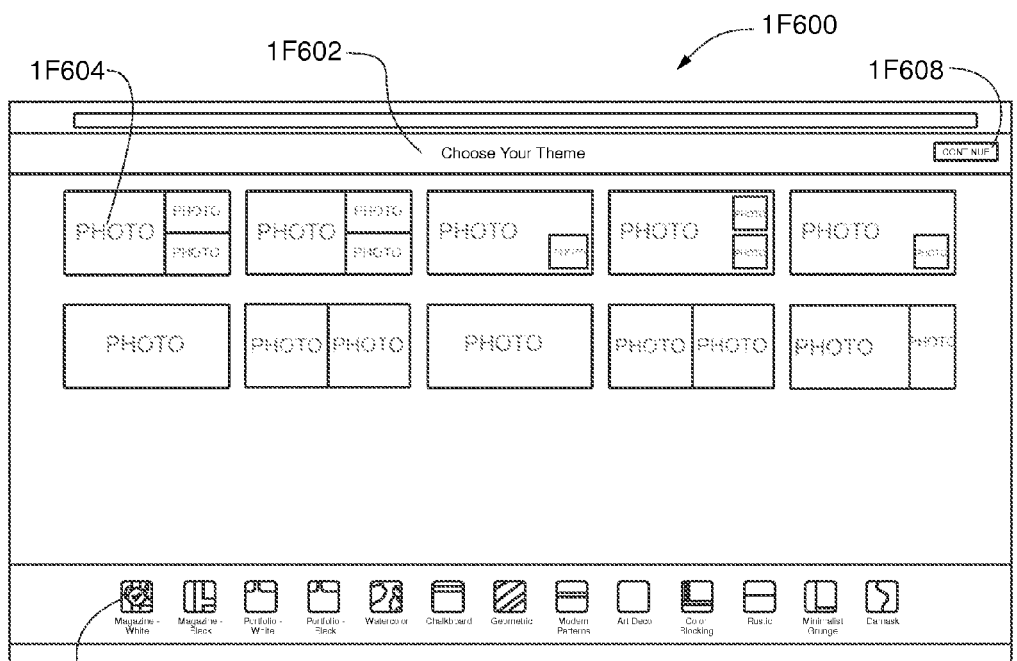
FIG. 1F is a diagram showing a method of selecting a theme, according to one embodiment of the invention.

FIG. 1F is a screenshot embodiment 1F600 that displays a theme selection of a project or photobook after images are uploaded to the workspace (editor) of a user-device. All pages of the photobook are displayed in the workspace. In a page 1F604 of the photobook, an arrangement of the images is shown. This arrangement is auto-populated by the present invention after an image analysis. The server performs the image analysis for auto-populating the arrangement. For auto-populating the design of the book, the server may use features such as, cropping, zooming, relevant images grouping, and other image editing processes. The embodiment 1F600 allows the user to select a theme 1F606. The instruction at 1F602 allows the user to select or choose the theme 1F606. Once the user is satisfied with the theme and arrangement of the images in all pages of the photobook, the user can click the button 1F608 to continue to the next step of the present invention.

Figure 1G:
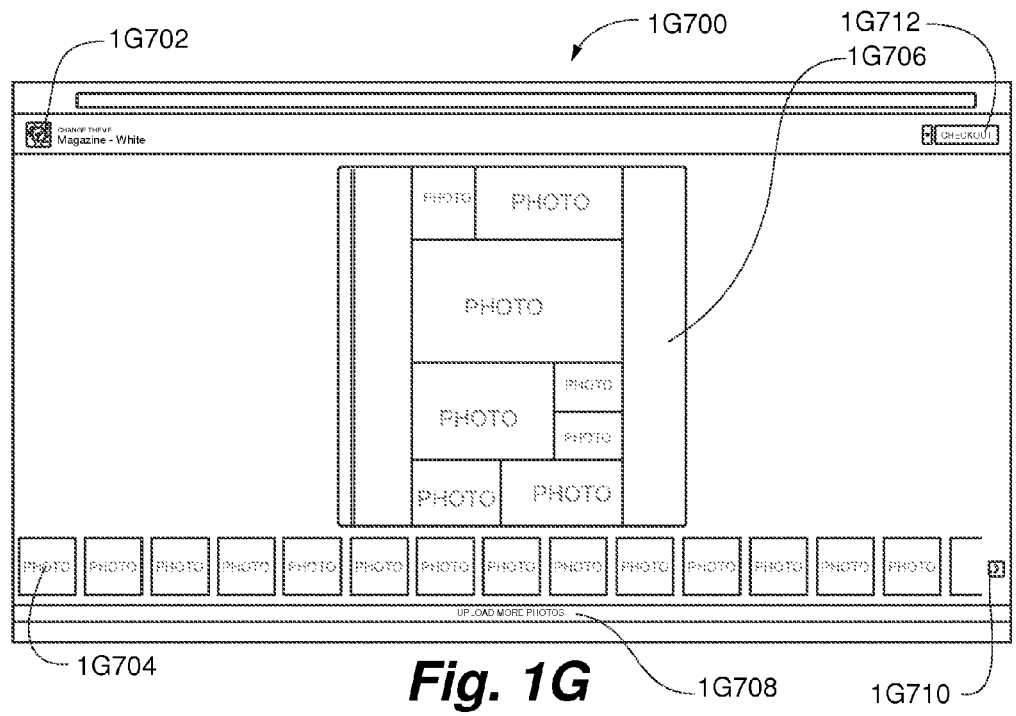
FIG. 1G is a diagram showing a method of designing a cover sheet, according to one embodiment of the invention.

FIG. 1G is a screenshot embodiment 1G700 that shows a cover page of a photobook and an arrangement of images therein. The cover page 1G706 uses at least an image 1G704. A plurality of images can be used in the cover page 1G706. A server auto-populates a first design of the cover page 1G706. The user has an option to further customize the cover page 1G706 by using any of the uploaded images. Standard image editing features may be applied in customizing each image on the cover page 1G706 of the photobook. The workspace displays the theme of the design at 1G702. The workspace further allows the user to upload more photos at 1G708. The button 1G710 allows the user to scroll the uploaded images. A checkout button 1G712 allows the user to order and print the photobook.

Figure 1H:
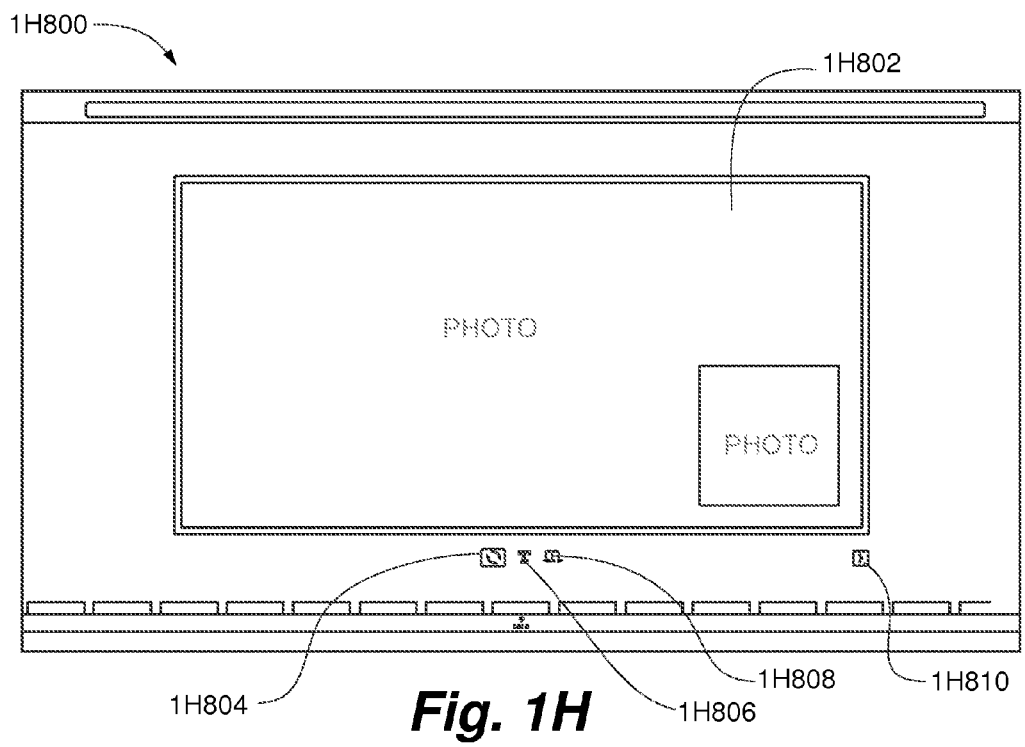
FIG. 1H is a diagram showing a method of arranging text and images, according to one embodiment of the invention.

FIG. 1H is a screenshot embodiment 1H800 that shows a page of a photobook for rearranging text and images therein. The page 1H802 shows an arrangement of the uploaded images on the page. The user can shuffle images on the page 1H802 by using a shuffle button 1H804, insert text on the page 1H802 by using a insert-text button 1H806, and rearrange pages of the book by using a rearrange button 1H808. The user can additionally use one or more of the uploaded images to customize the design of the page 1H802. The user can flip to a next page of the book by clicking or pressing an arrow button 1H810.

Figure 1J:
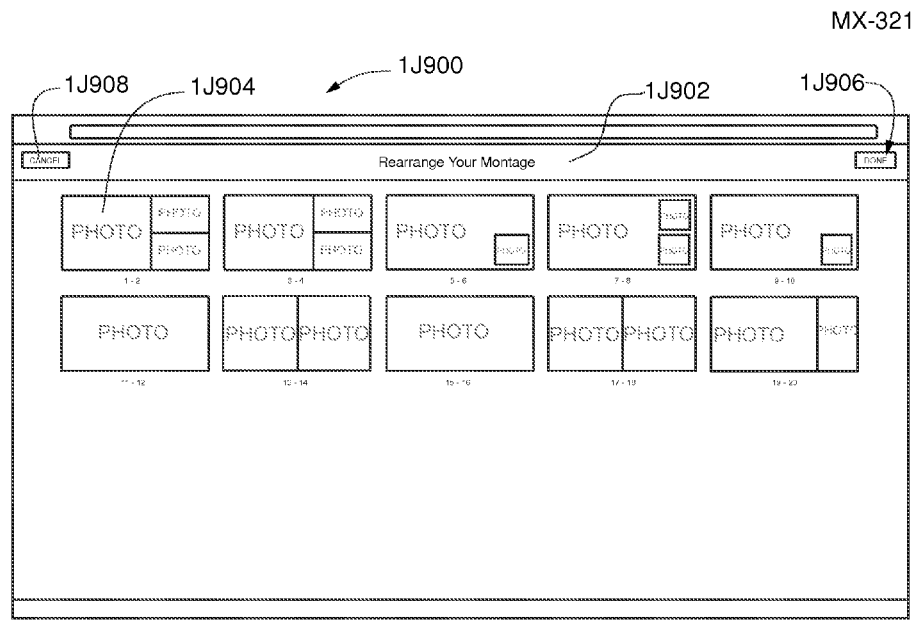
FIG. 1J is a diagram showing a method of previewing a design, according to one embodiment of the invention.

FIG. 1J is a screenshot embodiment 1J900 showing a method of previewing and rearranging design pages of a photobook. A design page 1J904 has a theme and at least an image. A plurality of images can be used in the design page 1J904 and the theme is selected by the user. In the embodiment 1J900, the design page 1J904 comprises page 1 and page 2 of the photobook. The message at 1J902 explains that the workspace provides a method to rearrange the pages of the photobook. There is a cancel button 1J908 to cancel a rearrangement if desired. Once a rearrangement of pages is completed, the user can click a done button 1J906 to save the rearrangement.

Figure 1K:
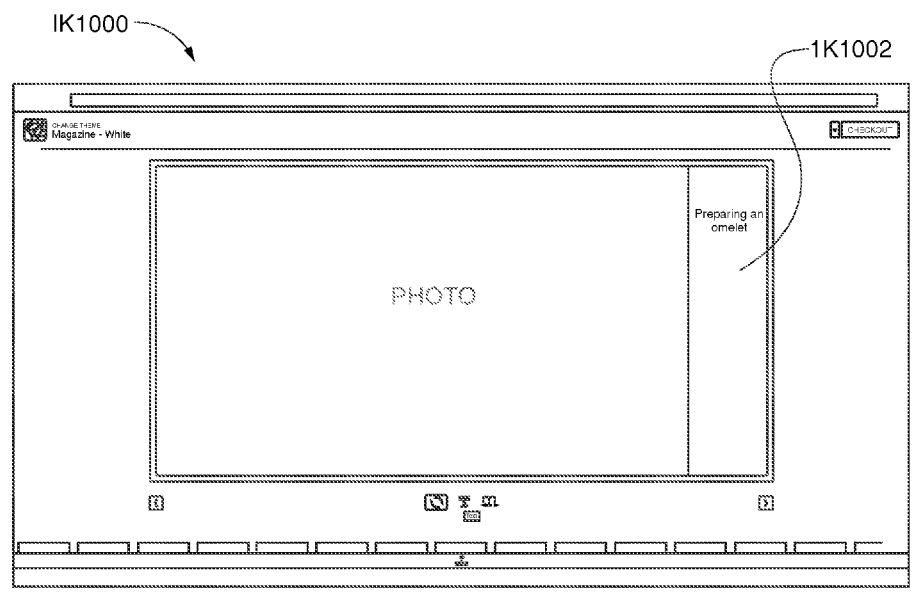
FIG. 1K is a diagram showing a method of inserting text, according to one embodiment of the invention.

FIG. 1K is a screenshot embodiment 1K1000 showing an insertion of text to describe an image. Text can be inserted into a page of the photobook to describe an image or a group of images. A storyline or narrative of work may be added with images using text. A narrative can be added as shown in the region 1K1002.

Figure 1L:
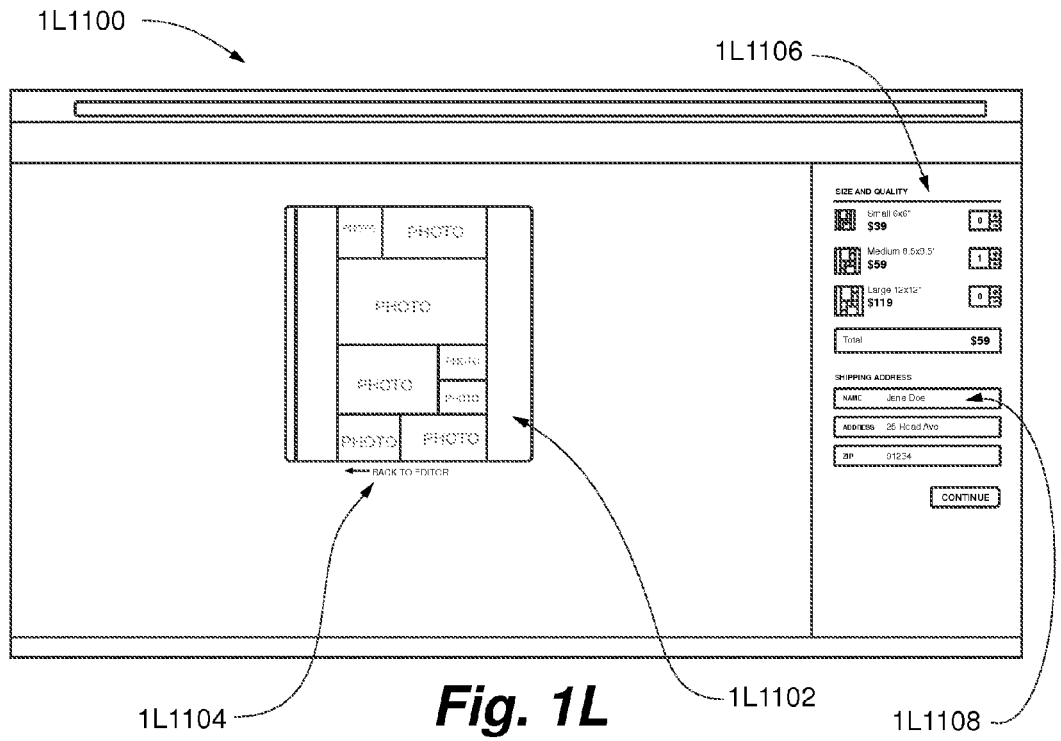
FIG. 1L is a diagram showing a method of ordering a photobook, according to one embodiment of the invention.

FIG. 1L is a screenshot embodiment 1L1100 showing a method of ordering a project or photobook. Once a photobook 1L1102 is customized and ready to order, a user can select a specification of the project to order. If the user is not happy with the customization of the photobook 1L1102, the user can go back to the editor or workspace by clicking 1L1104 to further edit/customize the pages of the photobook. A specification may be a size or dimension of the photobook. A sample specification of the project by size or dimension is shown at 1L1106. Each specification may have a different price for order. When the user agrees to a price, the user can enter a shipping address as shown at 1L1108. The user can further continue with payment options and order a printed photobook. A standard payment-processing gateway may be implemented in the present invention to order a printed copy of the photobook.

Mosaic Embodiments

Figure 1M:
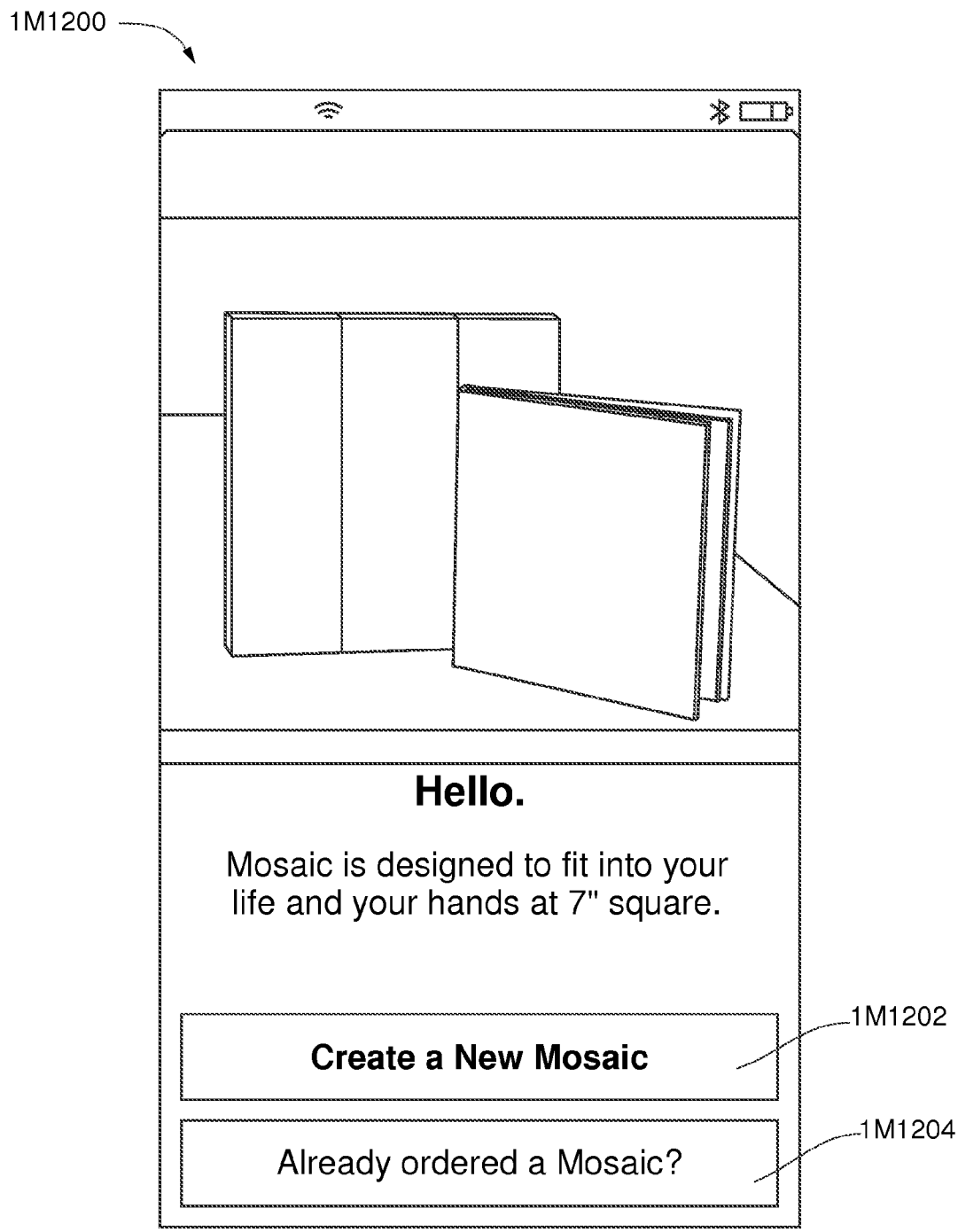
FIG. 1M is a diagram showing a mobile embodiment of a login screen of the present invention, according to another embodiment of the present invention (this embodiment sometimes known as "MOSAIC").

FIG. 1M is a screenshot embodiment 1M1200 showing a login screen at a handheld device or mobile device, such as, a smartphone (this embodiment is sometimes known as "MOSAIC"). A user can create a new user account by clicking a button 1M1202. Existing users can login to create a new project by clicking a button 1M1204. In the embodiment 1M1200, the word MOSAIC is a trademark name of an embodiment of the present invention, but not a functional name to describe a method or process.

Figure 1N:
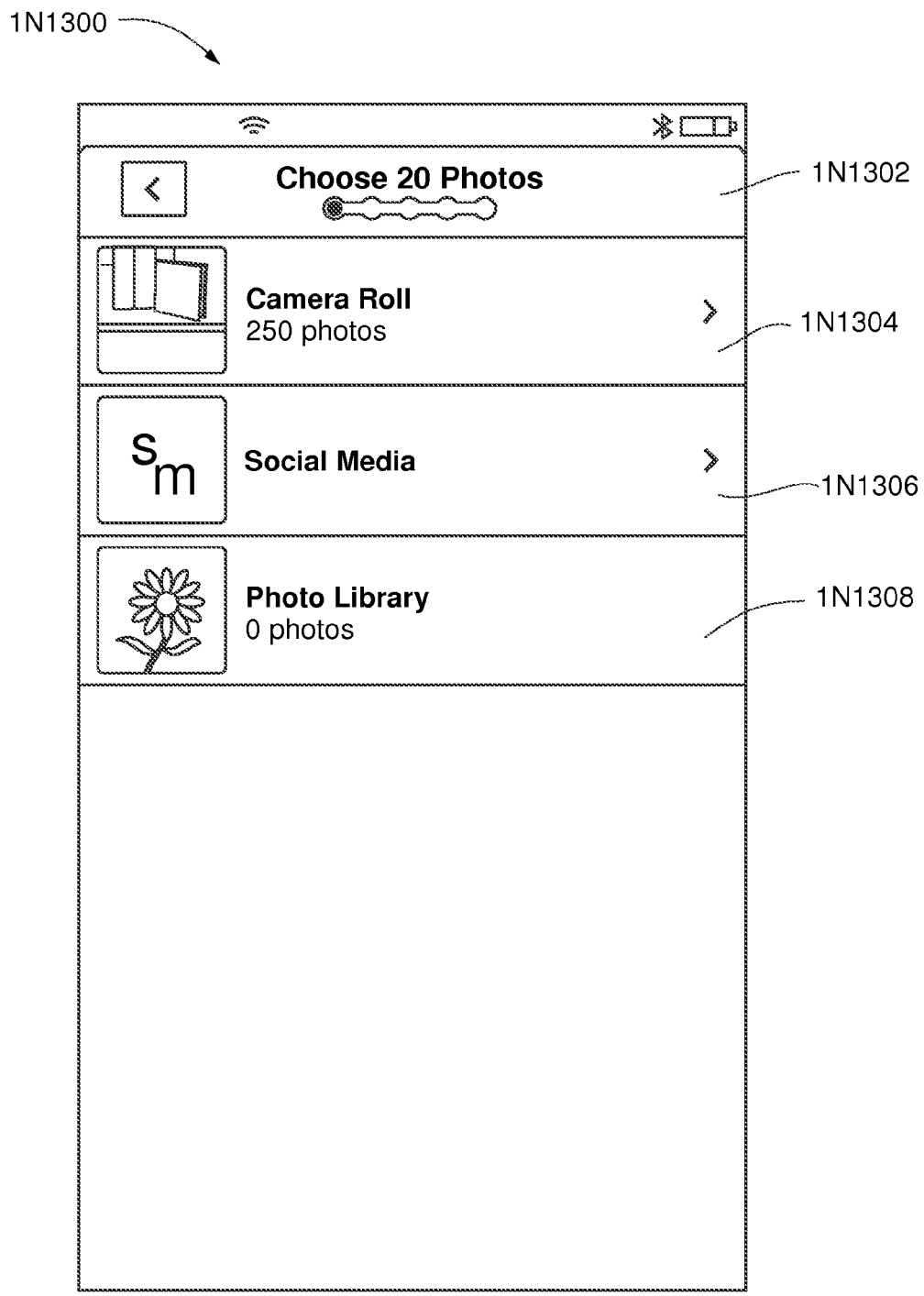
FIG. 1N is a diagram showing a method of media file selection at a mobile device, according to one embodiment of the invention.

FIG. 1N is a screenshot embodiment 1N1300 showing a method of selecting image files from multiple sources at a handheld or mobile device for creating a project. A method of selection 1N1302 shows a listing of sources where media files may be located. Image files or media files may be selected from a folder camera roll 1N1304, from a social media 1N1306, or from a photo library 1N1308. Camera roll 1N1304 is a file folder where images taken by a camera of the mobile device are stored. Social media 1N1306 comprises outside websites where image or media files are stored, such as, but not limited to, FACEBOOK, TWITTER, and LINKEDIN. Photo library 1N1308 is a file folder where the user can store image files at the mobile device.

Figure 1P:
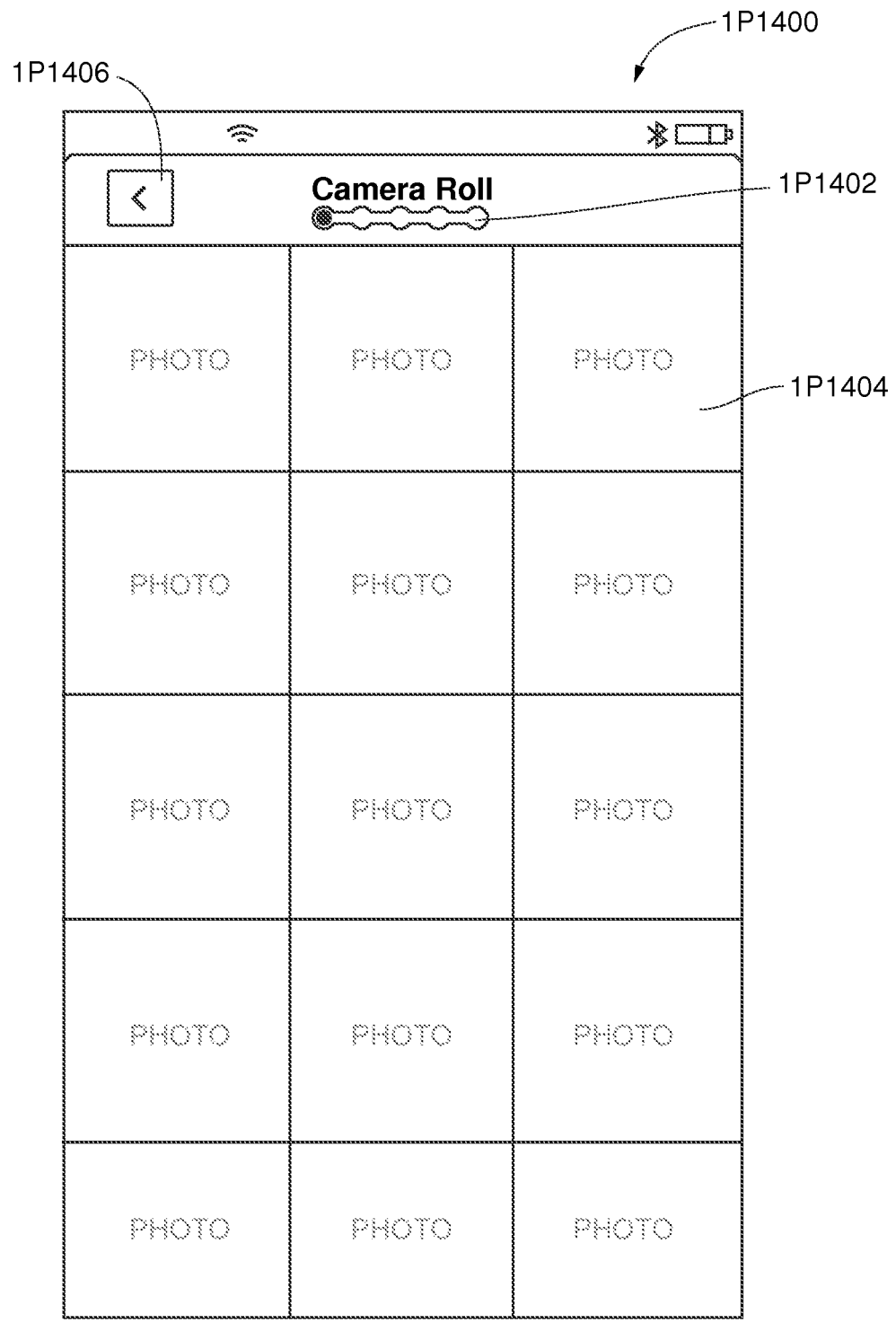
FIG. 1P is a diagram showing a preview of images at a mobile device, according to one embodiment of the invention.

FIG. 1P is a screenshot embodiment 1P1400 showing a preview of an image file folder at a mobile device. The folder 1P1402 with an exemplary name of camera roll, when selected by a user, the mobile device will show a preview of all images stored in the folder. An image 1P1404 is a preview of an original image. The user can go back to a different file folder at the mobile device by clicking or pressing a back button 1P1406.

Figure 1Q:
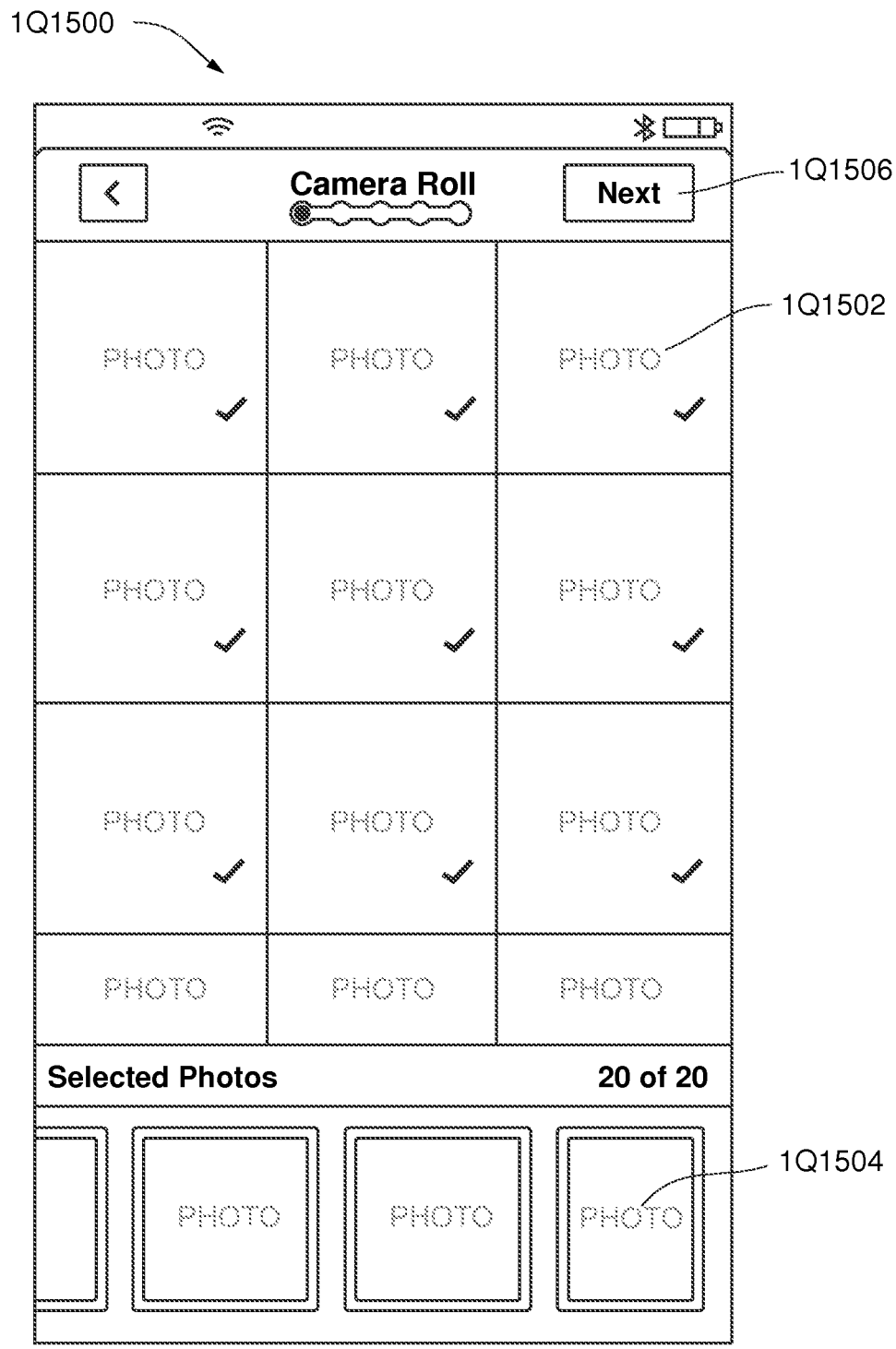
FIG. 1Q is a diagram showing image selection at a mobile device, according to one embodiment of the invention.

FIG. 1Q is a screenshot embodiment 1Q1500 showing images selected by a user at a mobile device. The user may select an image 1Q1502 by touching, pressing, or clicking the image 1Q1502. Once the image 1Q1502 is selected, the selection is confirmed by a check mark as shown within the image 1Q1502. A preview 1Q1504 of the selected image is generated once the image is selected. Once images are selected for building a project, the user can press a next button 1Q1506 to build the project.

Figures 1, 1R:
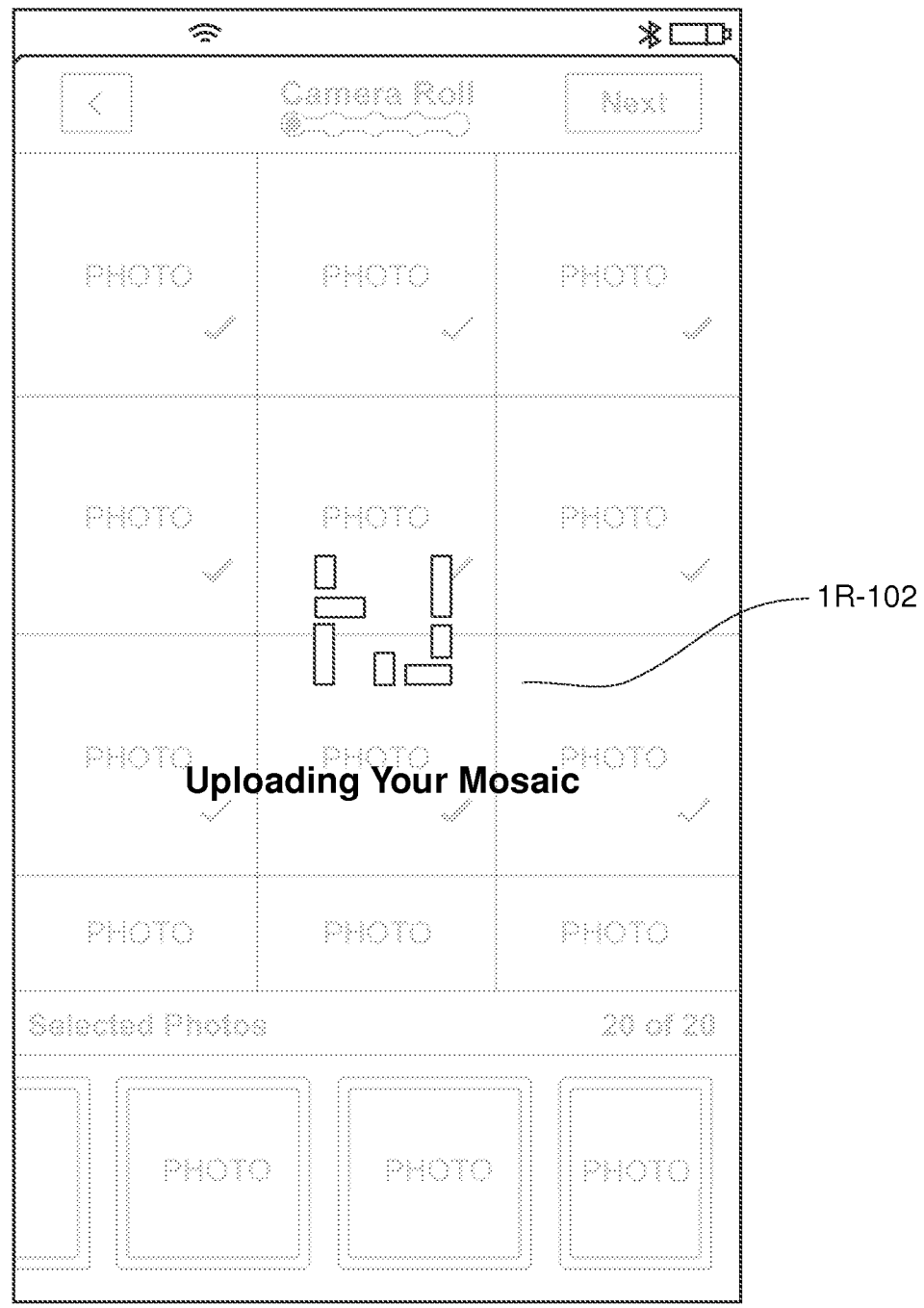
Figures 1, 1R, 2:
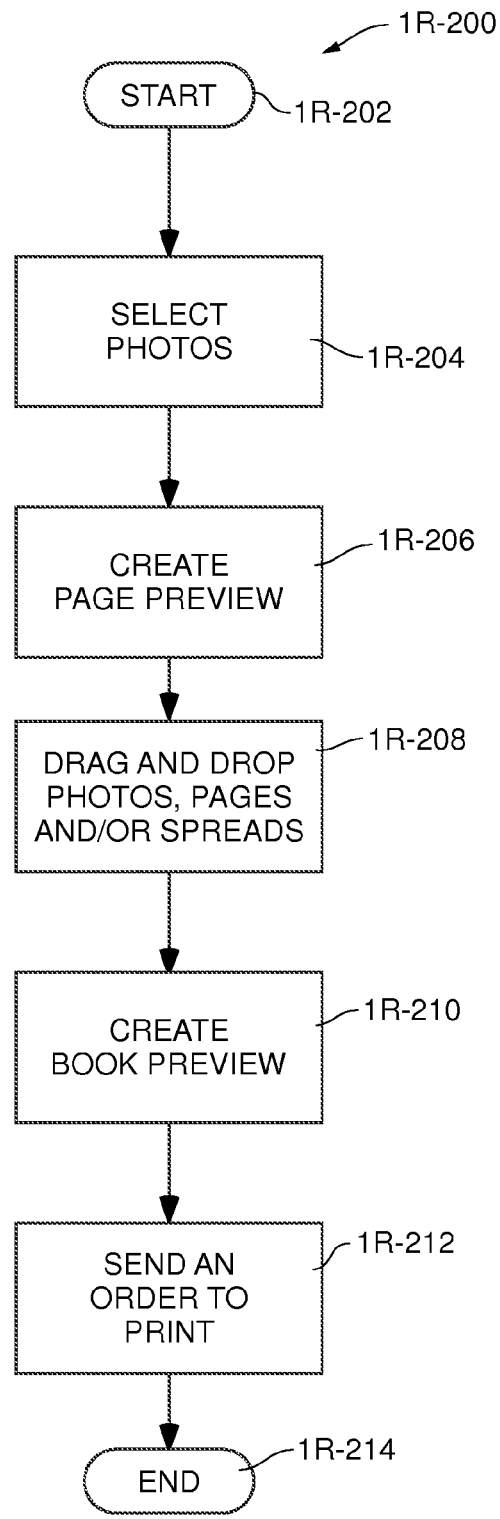

FIG. 1R-1 is a screenshot embodiment 1R-100 showing an uploading process of photos in a mobile device. Once photos are selected for an upload, the mobile device uploads the images to a server. While the images are uploading to the server, the mobile device displays a message 1R-102 in a form of graph or text showing that image or photo uploading is in progress.

FIG. 1R-2 is a flow diagram showing an embodiment 1R-200 of a process to create a photobook using a mobile device (or a space-constrained device). The process starts at step 1R-202. At step 1R-204, a user of the mobile device selects photos at a display or screen of the mobile device. Once the photos are selected, the present invention at step 1R-206 creates a page preview of the selected photos. The page preview displays all pages and spreads of the photobook, in which the pages or spreads comprise selected photos, along with a theme and a design. The theme and the design may be automatically populated. A use case for the photobook may be automatically selected. While on the page preview, the user is provided at step 1R-208 book customization options. The book customization options comprise dragging and dropping of photos, pages, and spreads. When a photo, a page, or a spread is dragged from one location and dropped to a next location, the user can create a desired pairing arrangement of photos, pages, and spreads. Once the desired pairing arrangement is achieved or the book customization options are completed, a book preview is created at step 1R-210. In the book preview, the user can see a virtual manifestation of a photobook that is printable and shippable. The book preview is also a bird's eye view of a deliverable photobook that the user is expected to receive in the mail after an order to print the photobook is received. In the book preview, the user can view the design of a front cover of the book or even customize the cover. The user can further virtually flip the pages of the book, and view the design of each page or spread in the book. When the user is satisfied with the book preview, an order to print the book is placed at step 1R-212. The process ends at step 1R-214.

FIG. 1R-3 is a screenshot embodiment 1R-300 showing a page preview of a photobook at a display of a mobile device. After a user selects photos in a display 1R-308 of a mobile device, a page preview is shown to the user in the same display. The page preview comprises pages and spreads. A spread consists of two opposite, or opposing, pages. For example, a page 1R-302 and a page 1R-304 together make a spread. A placeholder gap of a page or spread behaves in the same manner like a placeholder gap of a photo. A long tap by a finger or stylus at a page or spread will cause the page or spread to pop out. Once the page or spread pops out, the page or the spread can be dragged along the direction of the finger or stylus that is being used on the touch screen display (touch interface) of the user device. Once the user is happy with the page preview, the user can click the soft "done" button 1R-306 to end the page preview.

When tapping the soft "Rearrange Photos" button, the user is presented a spread-based grid of prior-selected pictures. In one embodiment, horizontal spacing between spreads is smaller than the vertical one. This is to communicate a correct order in which photos are arranged, which is from left to right, and not from top to bottom. This way, for example, a top-left spread contains a first and a second photo, and a next spread to its right contains a third and a fourth photo, and so on.

A long tap will cause a tapped photo to pop-out (move up, so that the user can see the photo s/he selected under his/her finger) and leave a square shadow placeholder gap at its initial position. A shadow placeholder gap is a non-interactive element that shows the position where a selected photo is going to land if dropped or released by the finger. After being selected, a photo can be moved around the display screen or touch screen to a different position. When brought close to the edge of another photo in the grid, that another photo will slide to a side (left or right depending on its index) revealing a new shadow-placeholder gap (while the initial placeholder gap fades away) where it is going to land if dropped.

In one embodiment, when a selected photo is hovering over the center of a spread, only one photo in that spread will slide and reveal a placeholder gap, and when the selected photo is moved to a side of a spread, both photos in that spread will slide to a side and reveal a placeholder gap.

Releasing a photo will result in it "landing" on the placeholder gap. The placeholder gap will fade out in the process, the photo taking the position in the gap, and triggering an animation of all photos between the placeholder and the initial position of the selected photo to move (rearrange).

In one embodiment, a user can drag and drop a page. In another embodiment, the user can drag and drop two opposing pages or a spread. A page may be configured to comprise more than one photo. A spread may be configured to comprise more than two photos. A spread (two opposing pages) may just comprise one photo.

FIG. 1R-4 is a screenshot embodiment 1R-400 showing dragging of a photo in a mobile device. A mobile device 1R-402 shows a page preview of a photobook, in which the page preview displays all photos in the photobook. Using a touch interface in the display of the mobile device, a finger 1R-404 can drag a photo 1R-408. Before dragging, the photo 1R-408 was initially located at the placeholder gap 1R-406.

FIG. 1R-5 is a screenshot embodiment 1R-500 showing a photo before being dragged in a mobile device. In a mobile device 1R-502, a photo 1R-506 is dragged by a finger 1R-504. Dragging is initiated by a long tap on the photo 1R-506 using the finger 1R-504 at the display of the mobile device. A long tap causes the photo 1R-506 to pop out. Once the photo 1R-506 pops out, the photo moves along the direction of the finger 1R-504 as the finger 1R-504 moves around the display. Once a rearrangement of photos is completed, a user can press a soft "Done" button 1R-508.

FIG. 1R-6 is a screenshot embodiment 1R-600 showing a photo before being dropped in the display of a mobile device. A photo 1R-606 is dragged from the placeholder gap 1R-604 by using a finger 1R-602. Dragging is initiated by a long tap on the photo. A long tap causes the photo 1R-606 to pop out. The finger when released from the touch display causes the photo 1R-606 to drop.

FIG. 1R-7 is a screenshot embodiment 1R-700 showing a photo after being dropped in a display screen of a mobile device. After a photo 1R-702 is dropped, a vacant placeholder gap of the photo is closed by sliding left or right of adjacent photos. Photos 1R-704 and 1R-706 slide along with other photos, to close the placeholder gap of the photo that was dragged and dropped.

FIG. 1R-8 is a screenshot embodiment 1R-800 showing a completed project (virtually manifested photobook) in a mobile device. A virtual photobook is flappable. A virtual photobook 1R-802 is created after a user finishes book customization options including dragging and dropping of photos, pages, and spreads. The user can shuffle photos in the cover page of the photobook by using a soft "Shuffle Cover" button 1R-804. After the user is satisfied with the design of the virtual photobook 1R-802, the user can proceed to order the photobook by pressing a soft button "Place Order" 1R-806. If the user is not satisfied with the design of the photobook, the user can go back to drag and drop photos, pages, and spreads by using the soft arrow button 1R-808.

FIG. 1R-9 is a screenshot embodiment 1R-900 showing an opened cover page of a photobook in a mobile device. In a mobile device 1R-902, a virtual photobook is produced. The virtual photobook resembles a photobook that will eventually be produced by printing and binding after an order is received. A finger 1R-908 can flip a cover page 1R-904. The cover page 1R-904 may be designed in a way that shows a glimpse of what photos are inside the book. Miniature photos can be shown through the openings in the cover page, in a manner that the next page 1R-906 shows all miniature photos. A cover page is a matter of design choice. The photos can be re-arranged by using the soft "Rearrange Photos" button 1R-910, returning the user to FIG. 1R-4. Once the user is satisfied with the design of the book, the user can press the soft "Next" button 1R-912 to place an order to print the book.

FIG. 1R-10 is a screenshot embodiment 1R-1000 showing a manifested virtual photobook with flappable pages and spreads. The manifested virtual photobook resembles a photobook that will eventually be produced by printing and binding after an order is received. The actual photobook may be received via the mail after an order is placed to print the book. The virtual photobook as shown in a display of a mobile device is flappable to see all pages and spreads in the book, and the associated photos and design. A user can use a finger to flip pages. The user can view, such as, a page 1R-1004 that comprises a photo, turn another page 1R-1006 using the finger, and view a next page 1R-1002. After the user is satisfied with the contents and design of the book, the user can place an order to print the book by pressing the soft "Place Order" button 1R-1008.

Figures 1, 1R, 2, 3:
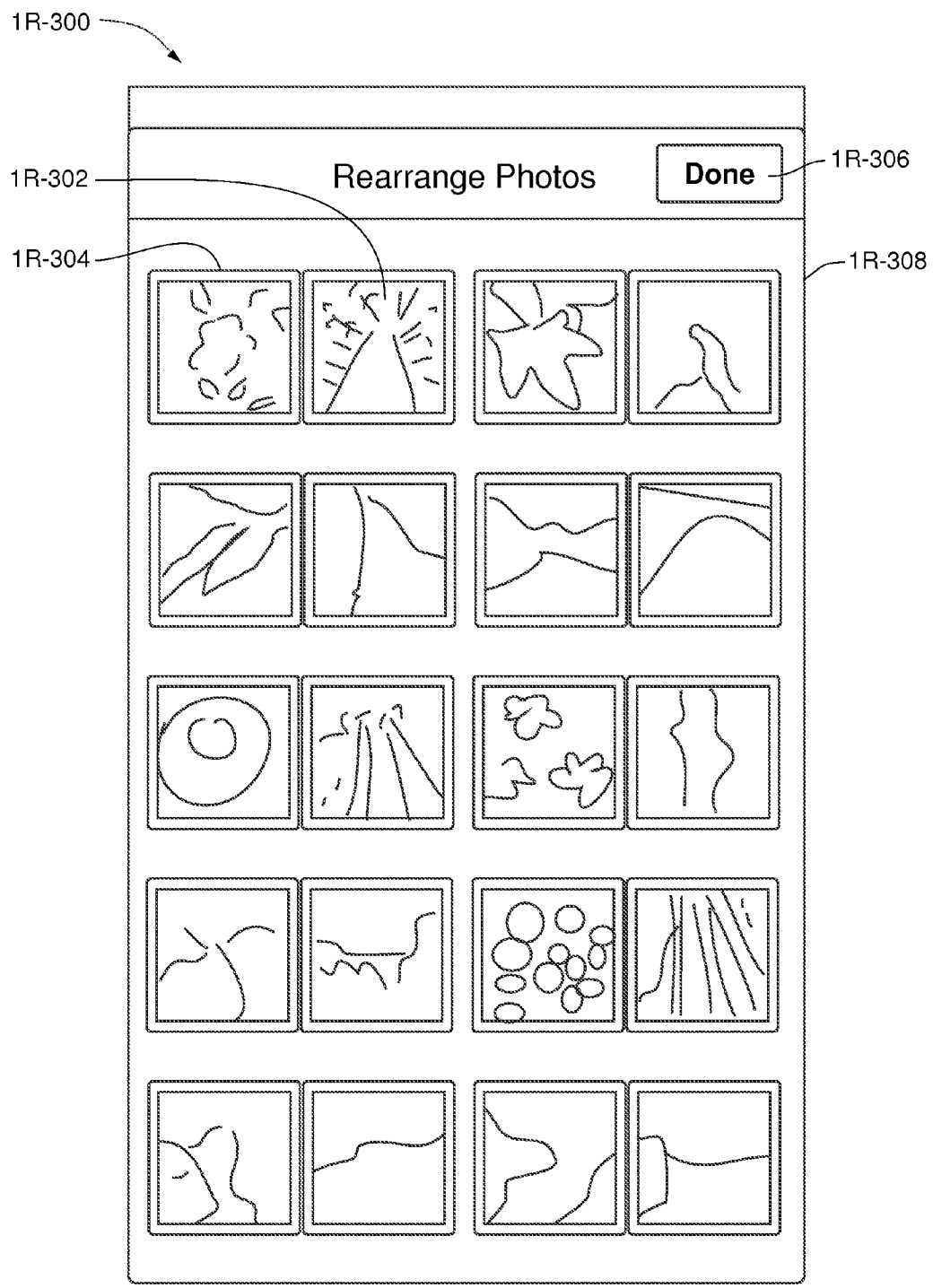
Figures 1, 1R, 2, 3, 4:
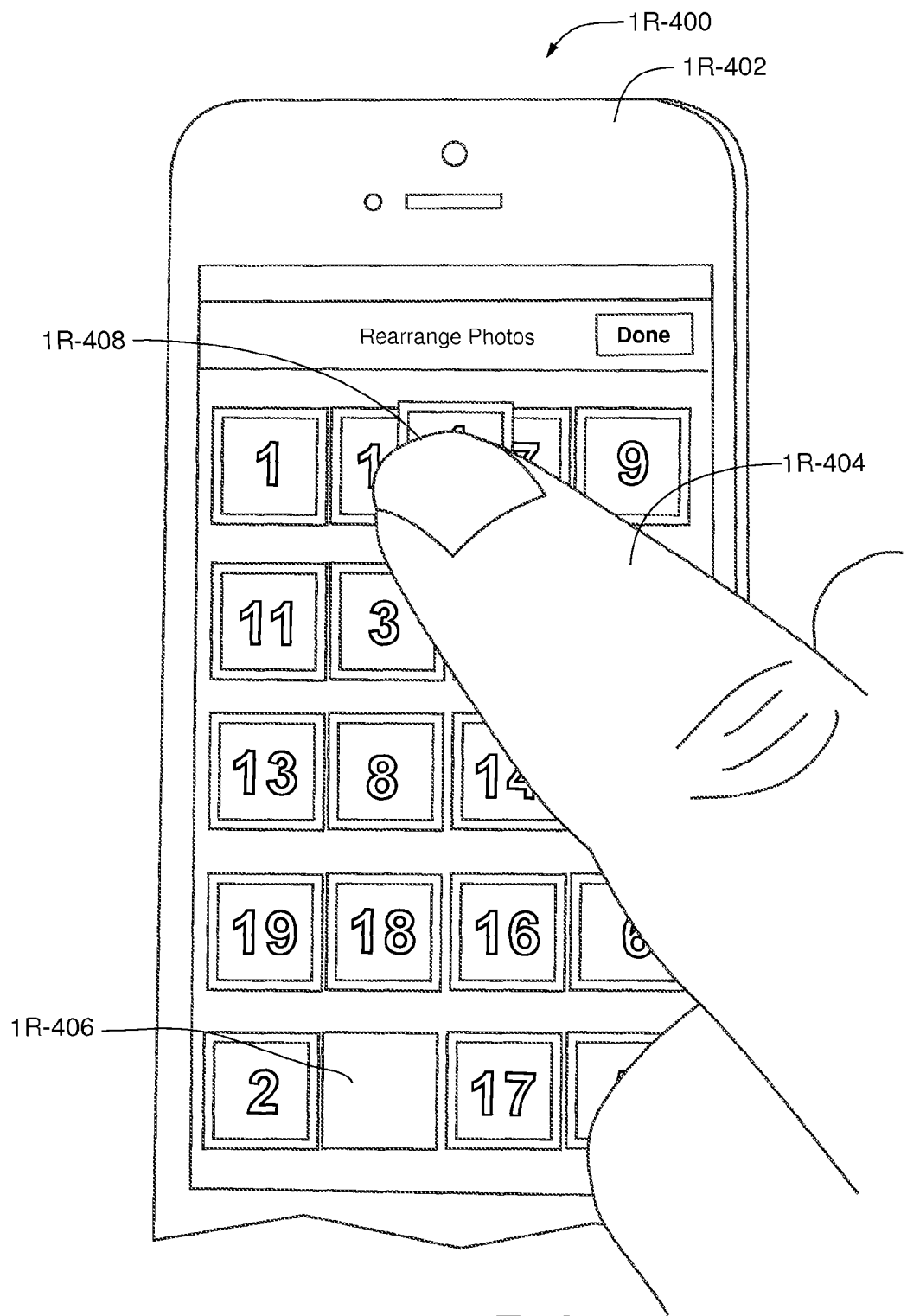
Figures 1, 1R, 2, 3, 4, 5:
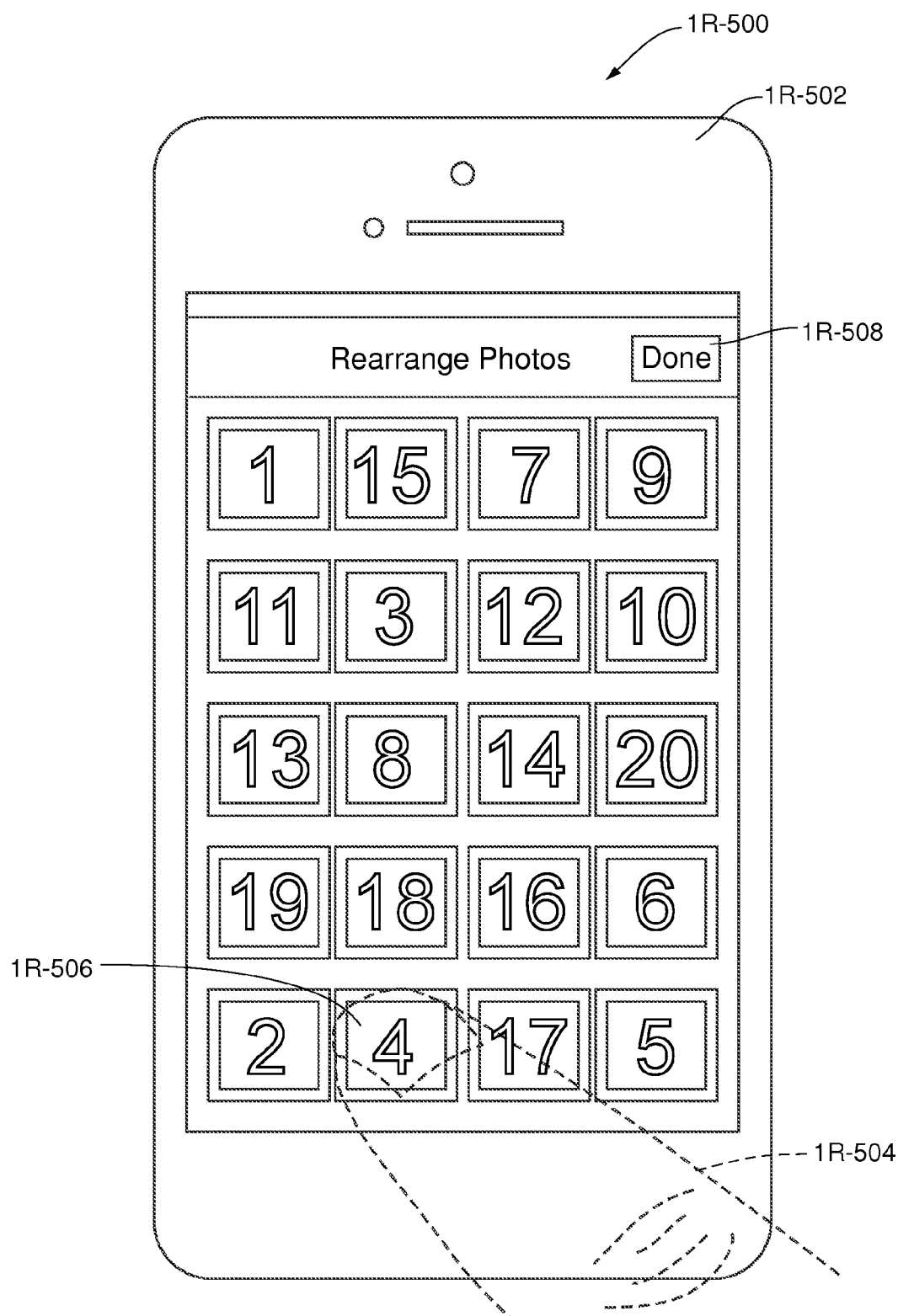
Figures 1, 1R, 2, 3, 4, 5, 6:
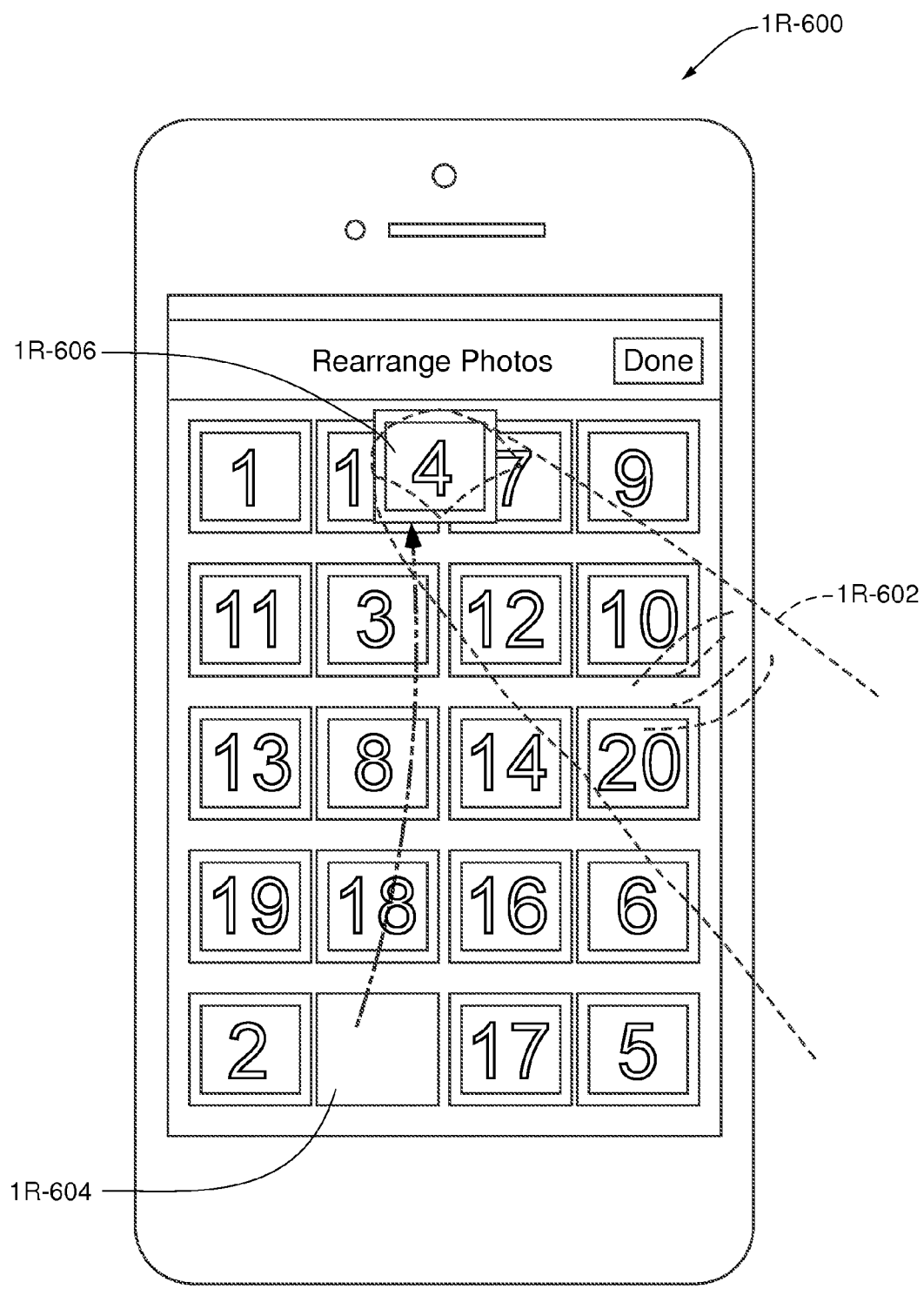
Figures 1, 1R, 2, 3, 4, 5, 6, 7:
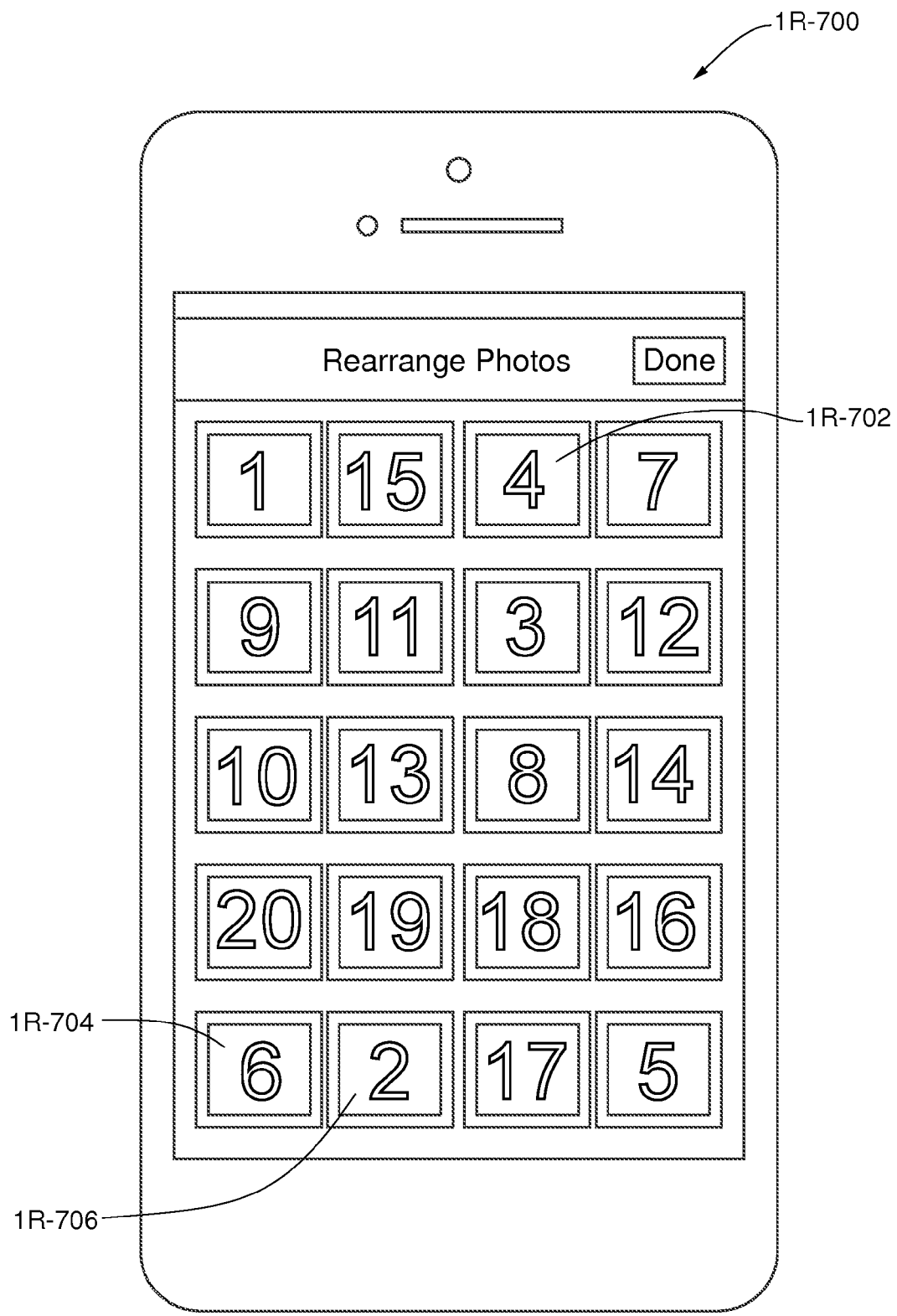
Figures 1, 1R, 2, 3, 4, 5, 6, 7, 8:
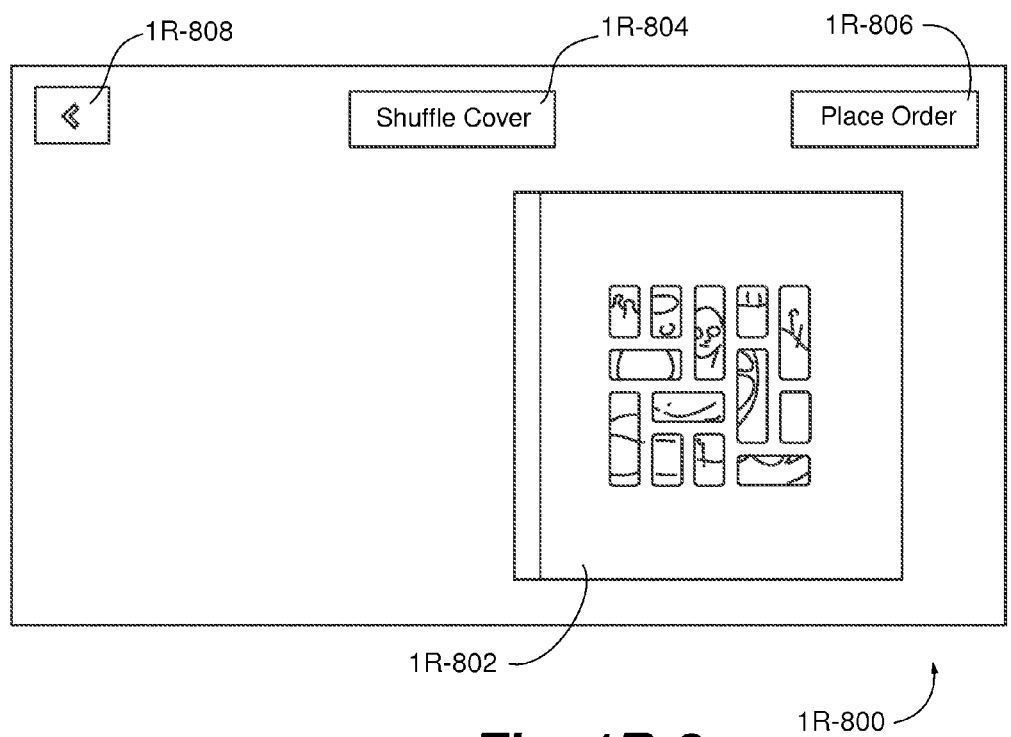
Figures 1, 1R, 2, 3, 4, 5, 6, 7, 8, 9:
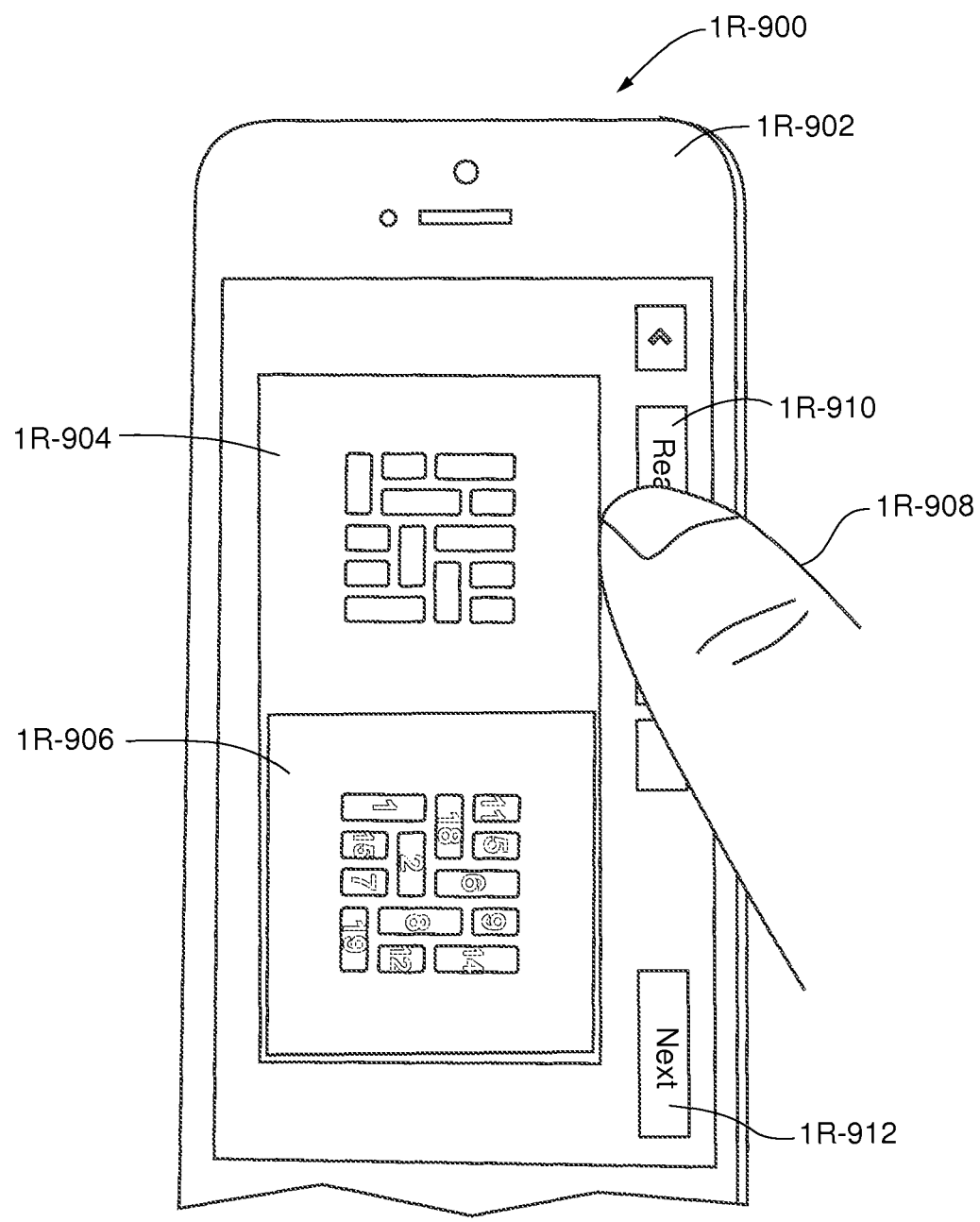
Figures 1, 1R, 2, 3, 4, 5, 6, 7, 8, 9, 10:
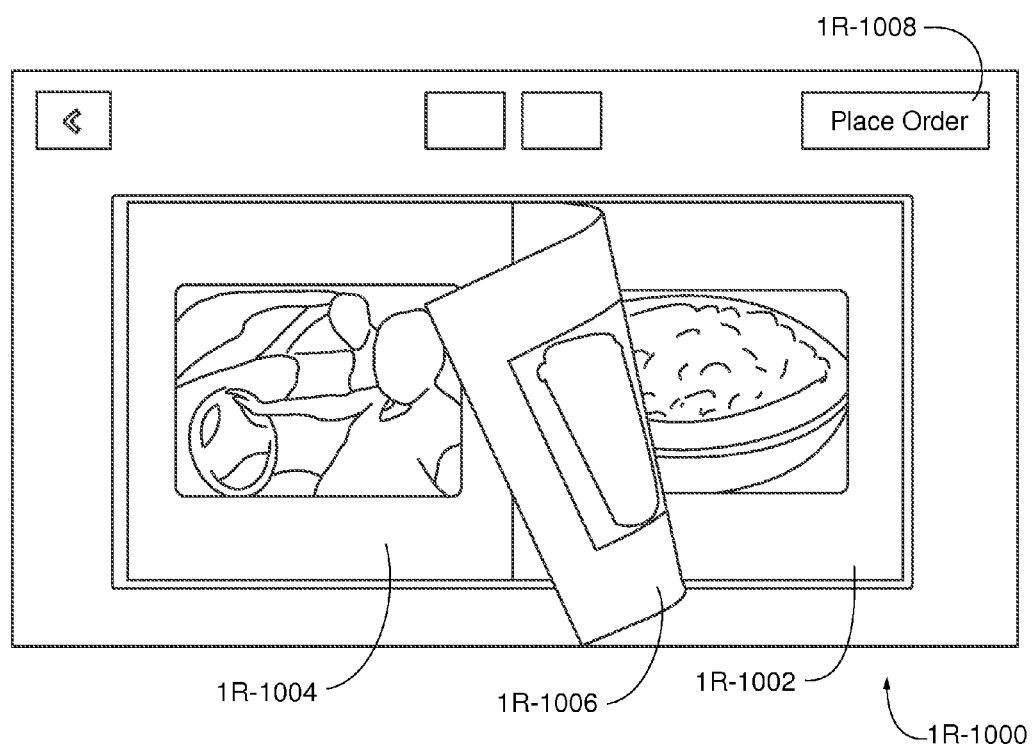
Figure 1S:
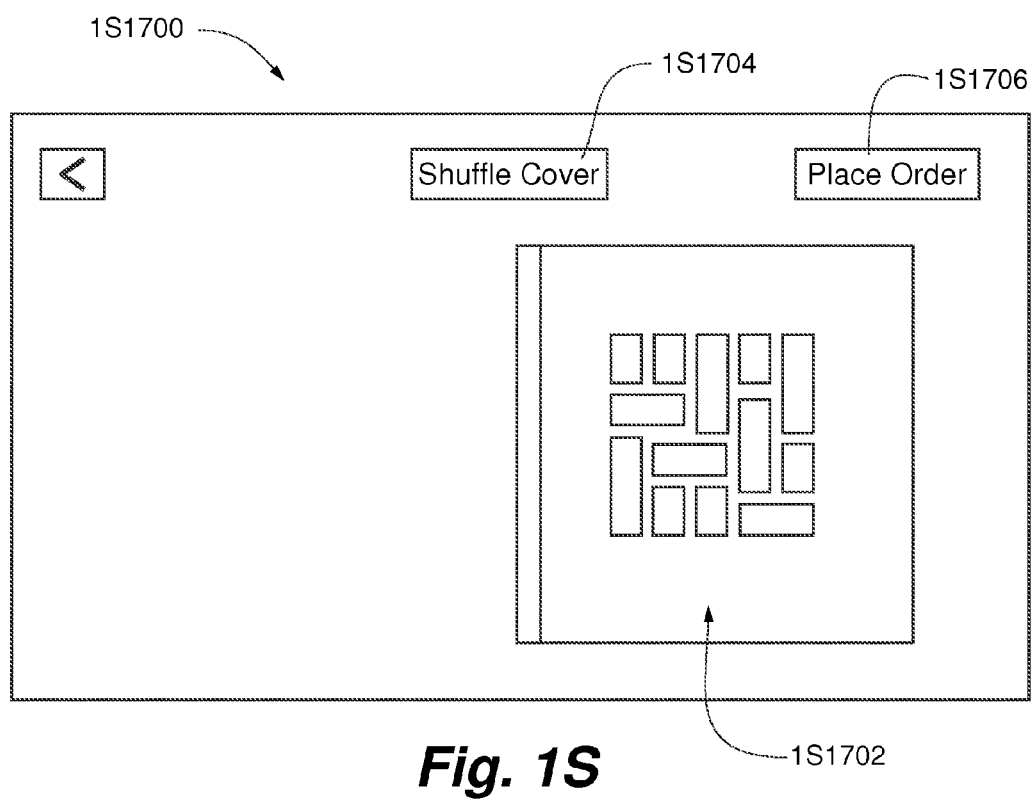
FIG. 1S is a diagram showing a completed project (photobook) in a mobile device, according to one embodiment of the invention.

FIG. 1S is a screenshot embodiment 1S1700 showing a completed photobook (project) at a mobile device, identical to that shown in FIG. 1R-8. A design of a photobook 1S1702 is virtually manifested on the display of a mobile device. A user can shuffle images on a cover design (cover page) by using a soft "Shuffle Cover" button 1S1704. The present invention populates a design of every page or spread of the photobook 1S1702. The photobook 1S1702 is virtually flappable. The user may customize every page of the photobook 1S1702 by using image editing tools provided by the present invention. The user-device or a server may provide image editing tools to the user. Image editing may also be performed by the server as a part of image analysis. After book customizations are completed, the user can proceed to order the photobook by pressing a soft button "Place Order" 1S1706.

Figure 1T:
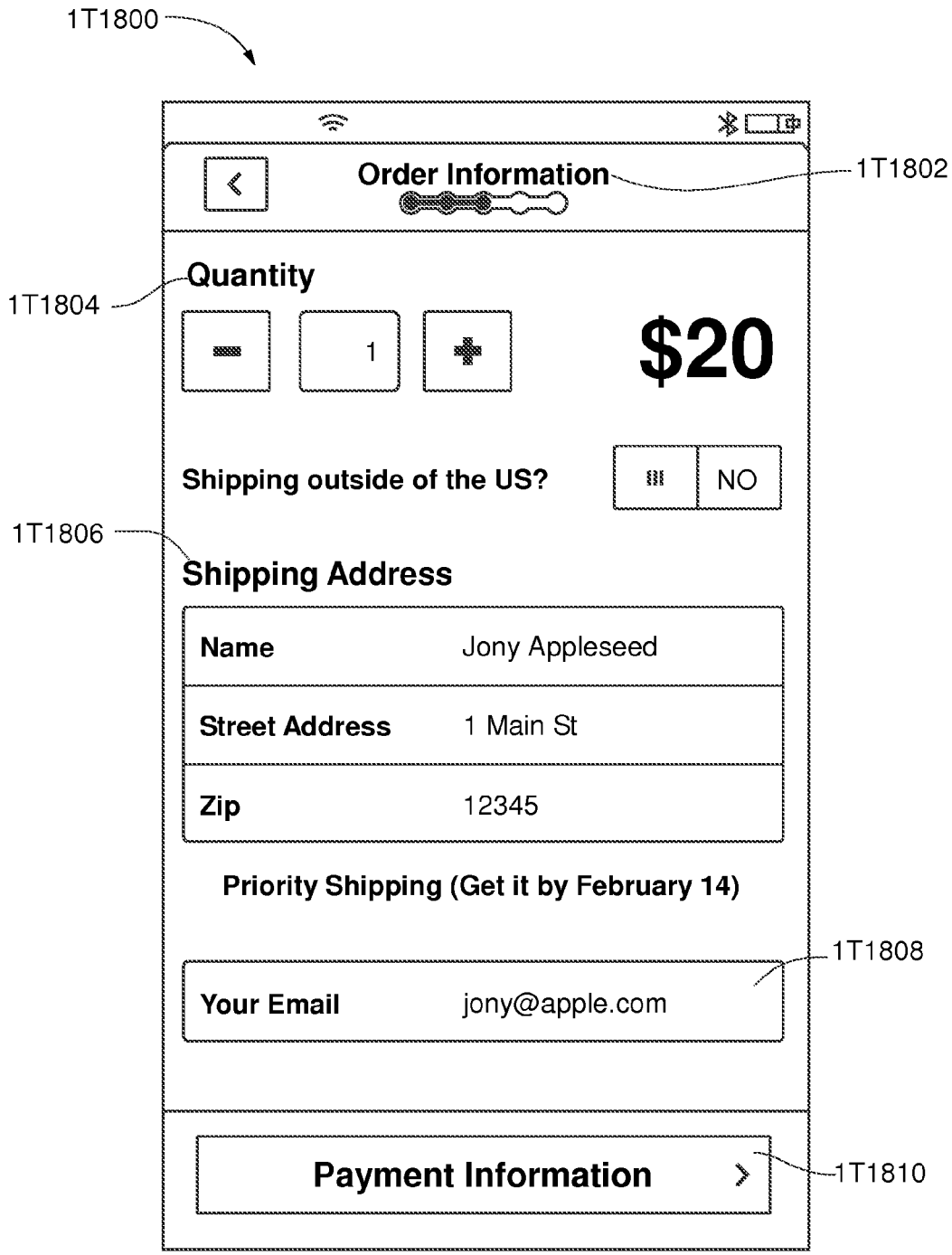
FIG. 1T is a diagram showing a method of ordering a media-based project at a mobile device, according to one embodiment of the invention.

FIG. 1T is a screenshot embodiment 1T1800 showing a method of ordering a project (photobook or book) at a mobile device. Once a user completes a customization of a photobook, an order information 1T1802 is displayed at the mobile device. The user can specify a quantity of the order at the quantity area 1T1804. Price information is also included with the quantity information. The user can enter a shipping address in the area 1T1806, and an email address in the area 1T1808. The user continues a processing of payment for the order by pressing a button payment information 1T1810. The button payment information 1T1810 directs the user to a payment-processing gateway to complete the order.

Figure 1U:
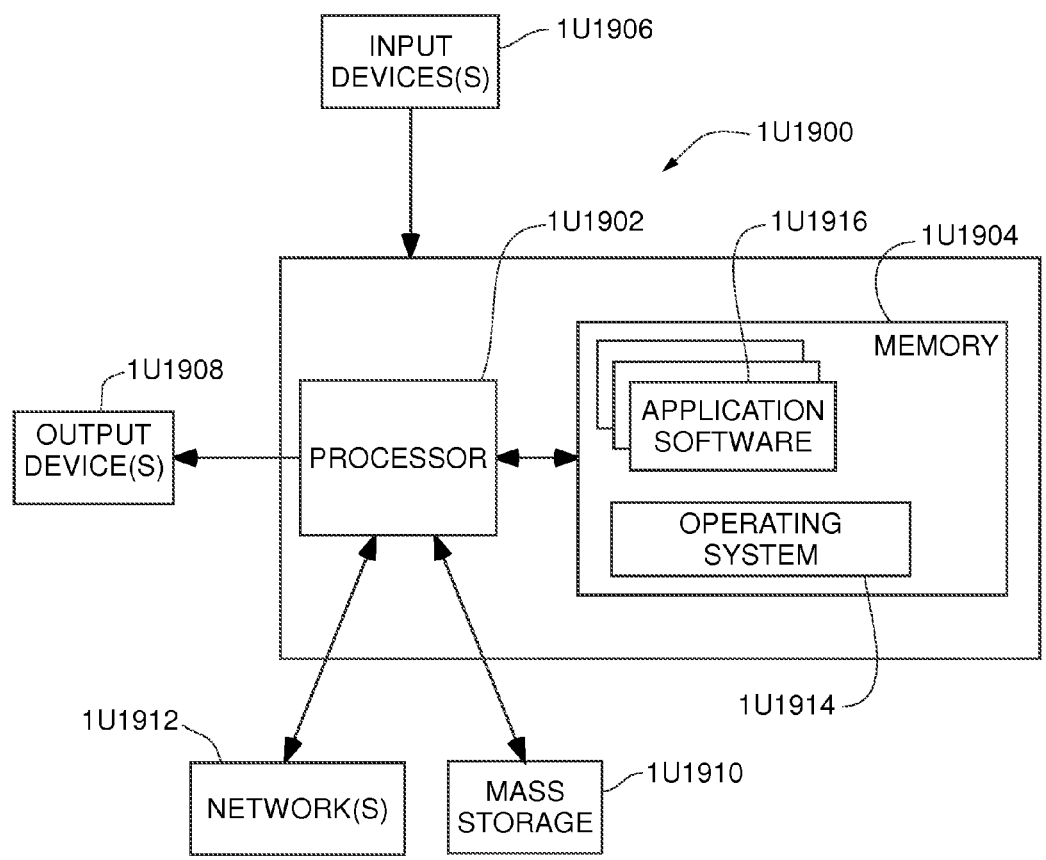
FIG. 1U is a schematic diagram of a user-device, within which the invention may be embodied, according to one embodiment of the invention.

FIG. 1U is an embodiment of a user-device wherein the invention may be practiced. A user-device comprises a processor 1U1902, an operating system 1U1914, an application software 1U1916, a memory 1U1904, at least one input device 1U1906, at least one output device 1U1908, a mass storage device 1U1910, and a network 1U1912. The network 1U1912 comprises a wired or wireless network to communicate to remote servers and databases via the Internet.

Figure 1V:
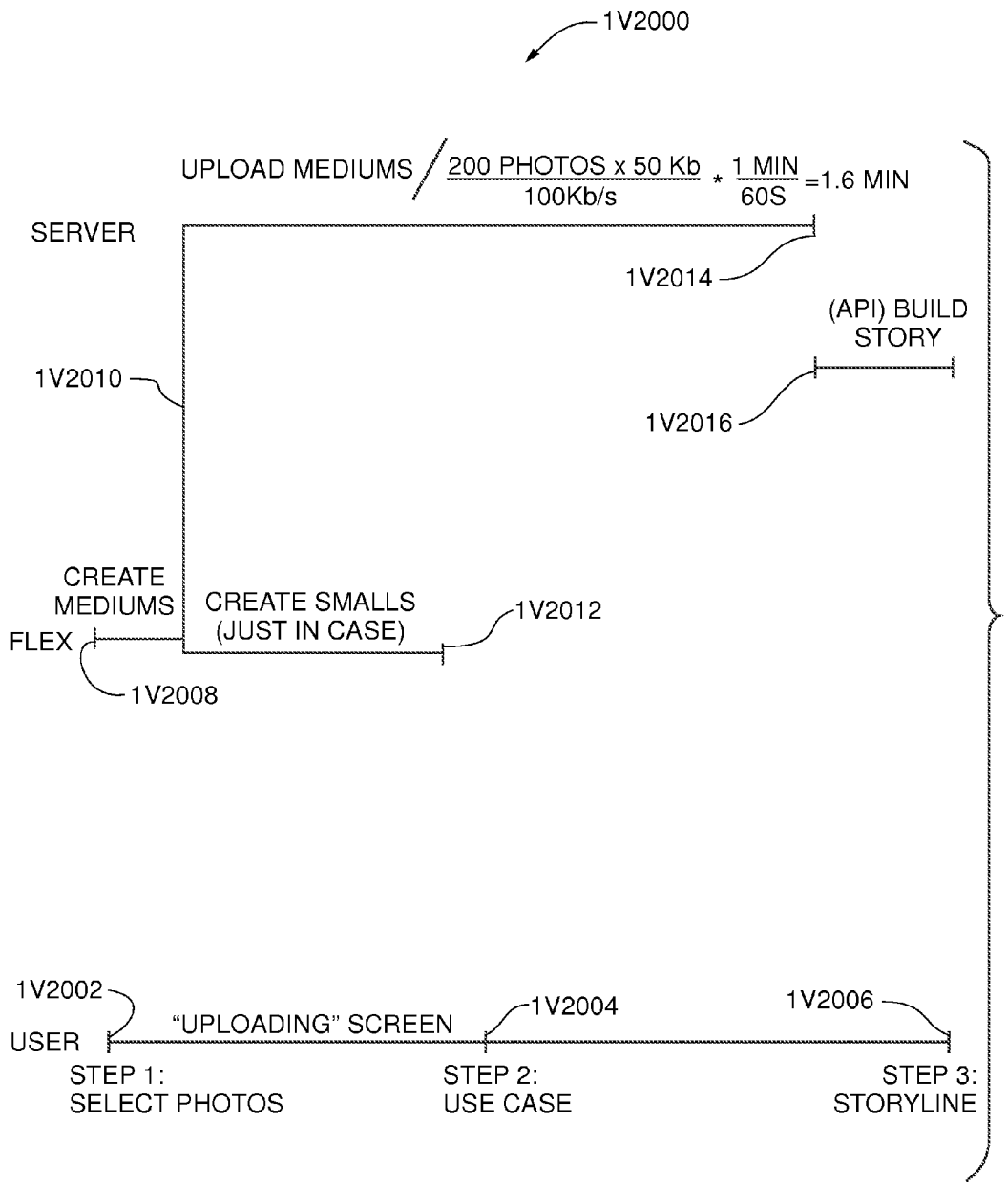
FIG. 1V is a timing diagram showing a timeline of image uploading, according to one embodiment of the invention.

FIG. 1V is a timing diagram 1V2000 showing a method of background uploading of media files. Steps in the embodiment 1V2000 are shown using timelines or progress bars. A user at step 1V2002 selects original photos or images for an upload. Once photos are selected, an uploading screen appears acknowledging the user that the upload is in progress. At step 1V2004, a use case is created to build a project. The use case is created by a server after performing a server-side image analysis. At step 1V2006, the user can further customize the project by adding a storyline or narrative of the project. A person of ordinary skill in the art of image uploading and editing can implement FLEX technology at step 1V2008. FLEX comprises photo-resizing libraries. In one embodiment, once original photos are selected, FLEX creates medium sized photos by resizing the original photos. However, FLEX may also create small sized photos from the original photos. Both the medium sized photos and the small sized photos are uploaded to the server at the step 1V2010. An upload of small sized photos completes at step 1V2012. An upload of the medium sized photos completes at step 1V2014. The small sized photos are uploaded faster than the medium sized photos. Once the upload of medium sized photos completes, at step 1V2016 the FLEX API builds a story or use case. Once a use case or story (by grouping of similar photos) is built, the user can add a storyline or narrative to the project. FLEX and the FLEX API are an exemplary technology that maybe used to implement the embodiment 1V2000 of the present invention. The methods of the present invention are not restrictive to FLEX and the FLEX API.

A use case may be built by feature or object identification of images, geo-location data, and meta-data. For example, when a plurality of images is selected by a user for building a book, images are grouped together by similarity of objects or features. For example, wedding pictures may be grouped together from a plurality of random pictures by identifying the features of wedding, such as a wedding cake or an altar. Facial recognition is another example of feature or object identification that allows a formation of a use case or grouping of pictures together by facial similarity. A use case of a book can allow the program to better prepare a template for the book, for example, a wedding book.

Mixbook Embodiments

Figure 1W:
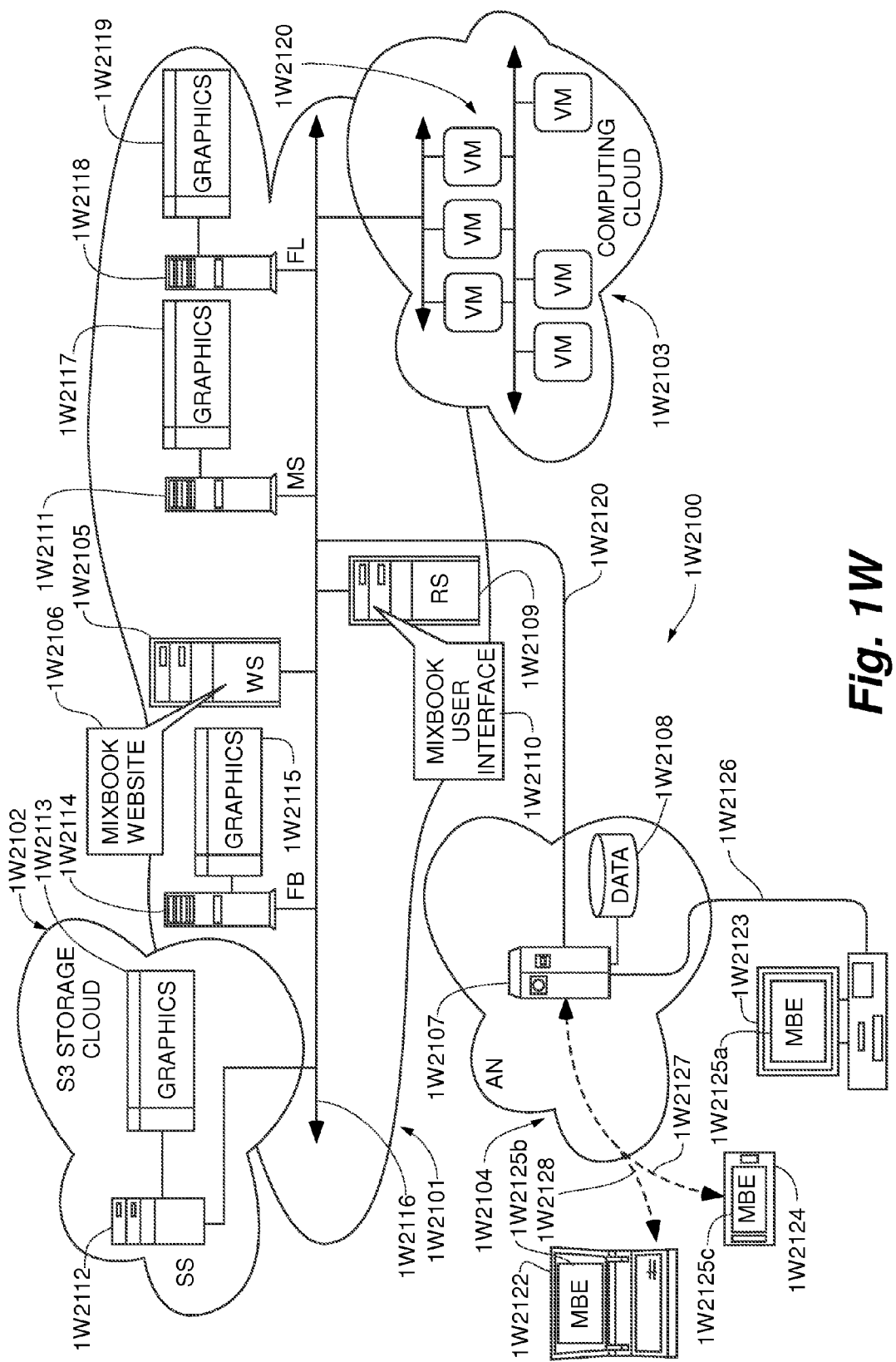
FIG. 1W is an architectural overview of a communications network supporting network-based graphics manipulation and production of media-based products, according to other embodiments of the present invention (these embodiments sometimes known as "MIXBOOK").

FIG. 1W is an architectural overview of a communications network 1W2100 supporting network-based graphics manipulation, and production of media-based products according to embodiments of the present invention (these embodiments sometimes known as "MIXBOOK"). Communications network 1W2100 includes a wide-area-network (WAN). WAN 1W2101 may be a private, corporate, or publicly accessible data network. WAN 1W2101 may be referred to as the Internet 1W2101. The Internet 1W2101 is further illustrated by way of a network backbone 1W2116, which represents all of the lines, equipment, and access points that make up the World Wide Web (WWW) as a whole including any connected sub-networks. Therefore, there are no geographic limits to practice of the present invention.

The Internet backbone 1W2116 supports a web server (WS) 1W2105. It is noted herein that all network-capable computing appliances such as physical computers, servers, and other computing machines discussed in this specification shall be assumed to contain, be coupled to, or otherwise have accessible thereto, one or more digital mediums adapted to contain the data and software required to support and enable the primary function or functions (in the case of multi-task machines) of the computing appliance.

WS 1W2105 is an electronic information server connected to the Internet 1W2101 and adapted to server information pages or web pages as they are known in the art. WS 1W2105 may be maintained by a third party that provides a website hosting service. In one embodiment a service provider providing the service of the present invention owns and maintains WS 1W2105. WS 1W2105 hosts a website 1W2106, through which, users may access elements of the present invention. Website 1W2106 is adapted to provide authenticated access to users who create, publish, print, and purchase media-based products such as photo-books, photo-cards, photo-calendars, photo-posters, video-books, video-calendars, video-cards, and related products.

Communications network 1W2100 also includes an access network (AN) 1W2104, which may represent any data network adapted to provide access to the Internet network 1W2101. 1W2104 may be a public-switched-telephone-network (PSTN) or some other public or private telephony network. AN 1W2104 may be a local wireless network, a cellular time division multiple access (CDMA) network, a wireless fidelity (WiFi) network, or any other candidate access network through which one may access the Internet 1W2101.

A user may access WS 1W2105, more particularly MIXBOOK website 1W2106, through the Internet access facility 1W2107 in access network (AN) 1W2104 and an Internet access line 1W2120. The Internet access facility 1W2107 may be maintained and operated by an Internet service provider (ISP) or by a wireless Internet service provider (WISP), whichever is appropriate for any particular Internet connection. Users who might access WS 1W2105 are represented herein as network-capable computing appliances, more particularly, a laptop computer 1W2122, a desktop computer 1W2123, and a smart telephone 1W2124. Each mentioned appliance may be assumed to be Internet-capable by way of one or more network browsing applications residing thereon and executable there from.

Desktop computer 1W2123 is connected to an Internet-connection server 1W2107 by way of an Internet access line 1W2126. Desktop computer 1W2123, once connected, may access website 1W2106 hosted on WS 1W2105. Desktop computer 1W2123 has one or more input devices (not illustrated) coupled thereto such as a keyboard, a mouse, and a microphone for (Speech-to-Text Commands). Smart phone 1W2124 may connect wirelessly via a wireless link 1W2127 to an Internet service provider (also represented by machine 1W2107) that establishes a wireless Internet connection like public WiFi for example. Smart phone 1W2124 may or may not include a keyboard input device. In one embodiment smartphone 1W2124 has a touch-screen display. Laptop 1W2122 is illustrated as connected wirelessly to the Internet 1W2101 via WISP 1W2107 using wireless link 1W2128. Laptop 1W2122 includes a keyboard and/or other input devices as may be appropriate.

Laptop 1W2122, desktop 1W2123, and smartphone 1W2124 each include an Internet browser application (not illustrated) for accessing and navigating network 1W2101. Backbone 1W2116 supports a runtime server (RS) 1W2109 adapted to host a MIXBOOK user-interface 1W2110. User interface 1W2110 is accessible to all website visitors for the purpose of creating, manipulating, and printing media-based products such as a photo collage book, for example. Users accessing website 1W2106 who are ready to create a product may be re-directed to RS 1W2109.

Each user authorized to create and publish a media-based product using the site may receive a small download containing a compact editing package known as the MIXBOOK editor ("MBE") in some embodiments. MBE 1W2125a is installed as a browser-based extension or plug-in in one embodiment on desktop computer 1W2123. Laptop 1W2122 has an instance of MBE 1W2125b installed as a browser-based extension or plug-in. Smartphone 1W2124 has an instance of MBE 1W2125c installed as a browser-based extension or plug-in. An instance of MBE may be customized for any computing appliance that may access the Internet and through which a user may see and edit content. Therefore, MBE instances 1W2125 (a-c), though the same basic extension or plug-in, may contain differences based on host requirements. In one embodiment of the present invention there are no software downloads required in order to practice the present invention. In this case the MIXBOOK editing SW may be server hosted only. In another embodiment, the MIXBOOK editing SW may be ported to a desktop application such as ADOBE AIR and thus be operated as a desktop application. In one embodiment the SW is included as an add-on feature to any suitable desktop application and may be installed on a computing host with that desktop application from a removable medium such as a CD ROM, for example.

Service provider facility 1W2107 includes a connected data repository 1W2108. Data repository 1W2108 contains all of the customer contact and billing information for the Internet service provider. One with skill in the art will appreciate many possible Internet connection schemes. It is preferred in most embodiments that users have a high speed Internet connection for the purpose of manipulating and editing graphics, which can be bandwidth intensive. The inventors provide one or more innovative solutions for saving bandwidth while editing images and image products online making the entire experience more efficient and easier for users practicing the invention.

The MIXBOOK website 1W2106 establishes a community-based portal and social interaction site that revolves around creating, editing, sharing publishing, printing, and purchasing media-based products created online by one or more user working in collaboration together. Users such as those operating appliances 1W2122-1W2124 connect online and navigate to WS 1W2105 to access website 1W2106.

When any user determines to create a media-based product like a photo album, for example, the user is directed to an appropriate portal server like RS 1W2109 hosting MIXBOOK user interface (UI) 1W2110. UI 1W2110 is adapted to provide all of the assets needed to create and publish complete image and/or text-based products. Media-based products created through website 1W2106 include products containing images uploaded by one or more authorized users. Any work in progress or completed is termed a project. A project may be initiated by one user whereby other users are then invited by the initiating to join the creative experience in collaboration, and those users may contribute their own photos to the project. Such a project may be published for viewing by all or some of the community. Finished projects may be printed and distributed as "hard products" available for purchase by members of the community.

In one embodiment, a persistent storage of graphics uploaded by community members to be included into projects is obtained (leased) through a third-party storage provider. In this example, a simple storage service (S3) data storage cloud 1W2102 is illustrated and made available for use by a third-party service provider such as AMAZON. A storage server 1W2112 is illustrated within S3 cloud 1W2102 and has connection to the Internet backbone 1W2116. SS 1W2112 may be one of many servers including associated mass data repositories connected to SS 1W2112 such as repository 1W2113 contained within storage cloud 1W2102. In this logical representation all of the graphics (images or photos) that are uploaded to insert into projects are stored in a repository such as repository 1W2113 in storage cloud 1W2102. Repository 1W2113 may be an optical, magnetic, or some other type of data storage facility. In one embodiment, mass computations required for real-time and transparent editing and collaborating on multiple projects are performed by virtual machine instances 1W2120 in a computing cloud 1W2103. In another embodiment, the service host may maintain one or more powerful computing machines and storage devices for performing computations and for storing graphics for users of the service.

In use of the present invention a user operating one of computing appliances 1W2122-1W2124 connects online and accesses MIXBOOK website 1W2106 and logs into the site. If the user has already registered and created a project, a web page personalized to that user is served that includes all of that user's projects in the latest states of progress. The user may enter any project for which she or he has authorization to contribute to, and may review, edit, or otherwise work the project. Photos uploaded by the user to include into projects may be stored in cloud 1W2102 and served to the projects when needed by the system. Any computing such as editing, resizing, alterations, and so on may be handled in cloud 1W2103. A user may, through website 1W2106, authorize other users registered with the service of the invention to collaborate on a project initiated by that user. In one embodiment, a user having a project initiated may invite other potential users to the site so they may, with permissions, enter the site and collaborate with that user.

In one embodiment of the present invention, photos that are stored on the Internet can be represented in any online project provided the user has authorized access to those photos. For example, a user who has one or more accounts to third-party social interaction networks like FACEBOOK, MYSPACE, PHOTOBUCKET, FLICKR, or similar sites may use photos of registered friends that they are allowed to access in their own personal projects. These photos do not have to be uploaded to the service of the present invention. Rather, these photos can be accessed from their present storage locations anywhere on the Internet provided that the storage system is online.

The Internet backbone 1W2116 supports a FACEBOOK server (FB) 1W2114 coupled to a data repository 1W2115 for storing images and other graphics. The Internet backbone 1W2116 supports a MYSPACE server (MS) 1W2111 coupled to a data repository 1W2117 adapted to store images and other graphics. Backbone 1W2116 supports a FLICKR server (FL) 1W2118 coupled to a data repository 1W2119 adapted to store images and other graphics. Any of these images can be served to an active project by the respective servers directly from their storage locations. Any of these images that are altered during project work or collaboration may be subsequently saved to third-party S3 storage cloud 1W2102 in repository 1W2113 controlled by SS 1W2112.

In one embodiment of the present invention, MIXBOOK website 1W2106 includes or has working access to a SW print engine (not illustrated here) that is adapted to render any MIXBOOK project for professional printing. In one embodiment, printing is performed by a third-party provider who may also ship and/or distribute finished products for a price. In one embodiment, a user may access the service through Website 1W2106 and may initiate and complete a project that will be printed for that user for a static price for that particular product.

It is noted herein that a project created on MIXBOOK may be efficiently gathered for print in virtually any print format. Likewise, content originally laid out in one format or aspect ratio may be efficiently converted to another layout before printing in an automated process that incorporates the typical size and layout changes necessary to convert from one layout to another automatically. Furthermore, content assembled for a particular layout and product type may be automatically converted for print output in another layout and product type.

The disclosed embodiments improve upon the problems with the prior art by providing a system that allows for quick and easy creation of media-based projects over a communications network. The disclosed embodiments leverage the reduced costs of processing units in most servers and computers to provide various functions over a communications network to automate, either fully or partially, the process of creating a media-based project over the Internet. The disclosed embodiments automate the processes normally undertaken by users creating photo-based projects online, such as sorting through photos, removing the photos that are not adequate or properly focused, choosing the correct photos, grouping photos together by topic or location, ordering the photos by chronological order, and cropping or focusing photos on the relevant portions of the photos. Thus the disclosed embodiments reduce the amount of time required by users to create a photo-based project. Further, the disclosed embodiments automate the corrections or modifications normally performed by users creating photo-based projects, such as correctly orienting photos, re-coloring photos or performing a color correction on the photos, removing red-eye from the eyes of photo subjects, and correcting the photos for brightness or contrast. This eliminates the requirement that the user must open a special program or app to perform the correction or modification, thereby removing the time-consuming and frustrating nature of these steps when performed manually. The disclosed embodiments are further beneficial because, due to their timesaving nature, they reduce the number of users that drop off or discontinue the photo-book creation process before completing a purchase.

Auto-Creation of Projects Utilizing Use Case Data

Figure 2A:
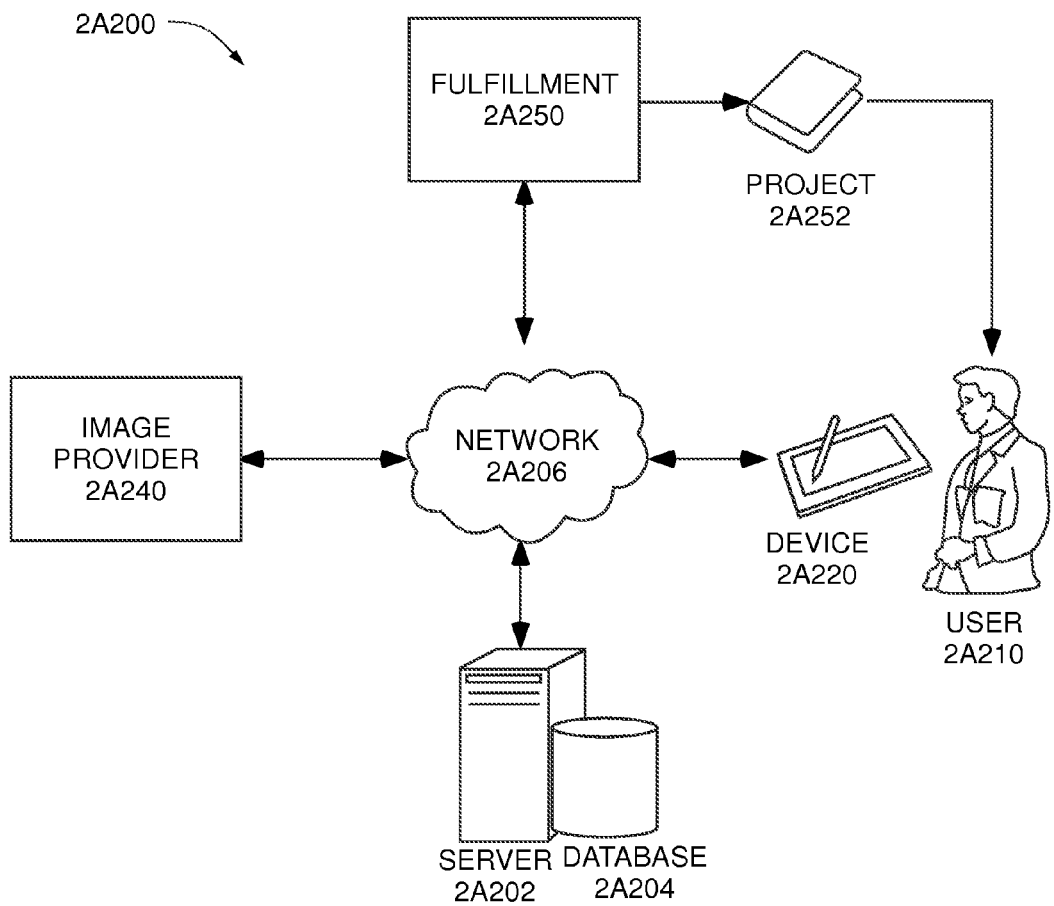
FIG. 2A is a block diagram illustrating a network architecture of a system for facilitating a creation of photo-based projects over a communications network, in accordance with one embodiment of the present invention.

FIG. 2A shows an illustration of a block diagram showing a network architecture of a system 2A200 and method for facilitating the creation of photo-based projects over a communications network in accordance with one embodiment. FIG. 2A shows various components coupled with network 2A206, which can be a circuit switched network, such as the Public Service Telephone Network (PSTN), or a packet switched network, such as the Internet or the World Wide Web, the global telephone network, a cellular network, a mobile communications network, or any combination of the above. A prominent element of FIG. 2A is the server 2A202 associated with a data repository or server-side database 2A204 and further coupled with network 2A206. Server 2A202 collects, processes and manages data from the users 2A210 and further manages the server-side database 2A204, which holds the master copy of data that is served to fulfillment entity 2A250 and client device 2A220. FIG. 2A further includes user 2A210 and his or her client computing device 2A220, which may be a desktop computer, a common computer terminal, or mobile computing devices such as smart phones, mobile phones, tablet computers, handheld computers, laptops, or the like.

FIG. 2A shows an embodiment of the present invention wherein networked client computing device 2A220 interacts with server 2A202 and server-side database 2A204 over the network 2A206. Server 2A202 may comprise one or more servers, workstations, desktop computers, computer terminals, workstations, mainframes, mobile computing devices, smart phones, mobile phones, handheld computers, laptops, or the like. Server 2A202 and client computing device 2A220 include program logic comprising computer source code, scripting language code, or interpreted language code that may be compiled to produce an executable file or computer instructions, or that may be interpreted at run-time, wherein the computer source code performs various functions of the present invention. Server 2A202 may include a software engine that executes applications as well as delivers applications, data, program code, and other information to networked computing devices, such as device 2A220. FIG. 2A further shows a database or repository 2A204, which may be a relational database comprising a Structured Query Language (SQL) database stored in a SQL server. The repository 2A204 serves data from a database, which is a repository for data used by server 2A202 and device 2A220 during the course of operation of the invention. Database 2A204 may be distributed over one or more nodes or locations that are connected via network 2A206. The database 2A204 may include user account records, user records, and multimedia records that include images, video, audio and like.

It should be noted that although FIG. 2A shows only one server 2A202, one database 2A204, one client device 2A220, and customer 2A210, the system of the present invention supports any number of servers, databases, client devices, and customers connected via network 2A206. Also note that server 2A202 is shown as a single and independent entity; in one embodiment, the functions of server 2A202 may be integrated with another entity, such as one image provider 2A240, fulfillment entity 2A250, device 2A220, and/or the database 2A204. Further, server 2A202 and its functionality, according to a preferred embodiment, can be realized in a centralized fashion in one computer system or in a distributed fashion wherein different elements are spread across several interconnected computer systems.

FIG. 2A further shows fulfillment party 2A250, which performs product fulfillment or order fulfillment services, i.e., the process of fulfilling the obligation of server 2A202 (or the entity represented by server 2A202) to send user 2A210 one or more photo-based project products 2A252 that the customer has ordered, purchased, or requested from the server 2A202 (or the entity represented by server 2A202). Fulfillment party 2A250 may receive orders for the photo-based project products, print the photo-based project products, bind the photo-based project products, package the products, and then ship the ordered products 2A252 to the end customer, such as user 2A210. In the course of a transaction, the server 2A202 may interface with fulfillment party 2A250 to effectuate the delivery of purchased products to the customers after payment has been effectuated. Note that although fulfillment party 2A250 is shown as a single and independent entity, in one embodiment of the present invention, the functions of fulfillment party 2A250 may be integrated with another entity, such as server 2A202. Further, the functionality of fulfillment party 2A250 may be realized in a centralized fashion in one computer system or in a distributed fashion wherein different elements are spread across several interconnected computer systems.

Figure 2B:
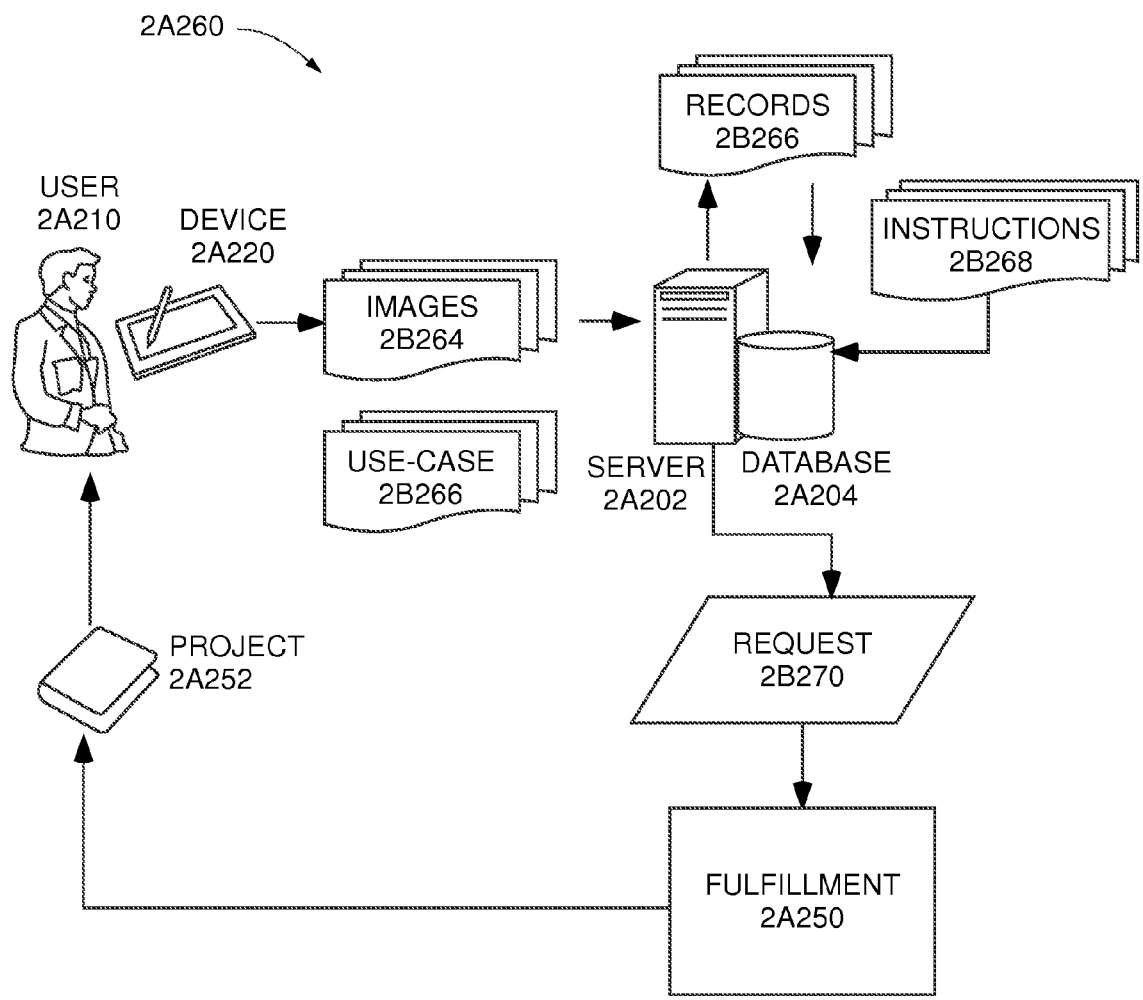
FIG. 2B is a block diagram illustrating a data flow of the system for facilitating the creation of photo-based projects over a communications network, in accordance with one embodiment of the present invention.
Figure 2C:
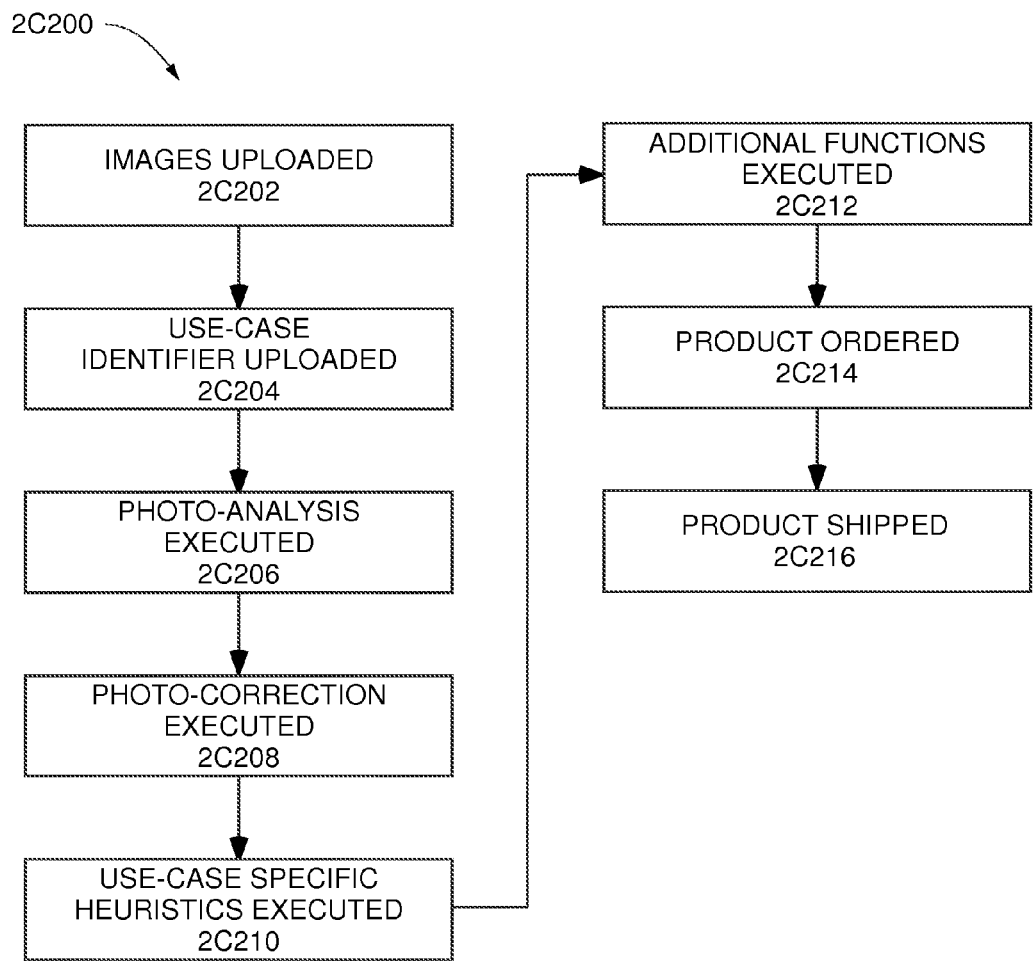
FIG. 2C is a flowchart depicting a general control flow of the process for facilitating access to a large data store over a communications network, according to an embodiment of the present invention.

FIGS. 2B to 2C depict, among other things, the data flow (2A260) and control flow (2C200) in the process for facilitating the creation of photo-based projects over a communications network 2A206, according to one embodiment. The process 2C200 of the disclosed embodiments begins with step 2C202, wherein the user 2A210 provides, via his or her device 2A220 over the network 2A206, at least a plurality of images or photos 2B264 to the server 2A202 for storage in the database 2A204. In one embodiment, the images or photos 2B264 are provided to server 2A202 via a graphical user interface executing on the device 2A220. In another embodiment, the images or photos 2B264 are provided to server 2A202 for storage in the database 2A204 via TCP/IP and/or HTTP over network 2A206. Subsequently, server 2A202 stores the images or photos 2B264 in the database 2A204 as records 2B266. In one embodiment, the records 2B266 are stored in association with an identity for user 2A210 or in association with a user record for user 2A210.

Next, in step 2C204, the user 2A210 provides, via his device 2A220 over the network 2A206, a use-case identifier 2B266 to the server 2A202 for storage in the database 2A204. In one embodiment, the use-case identifier 2B266 is provided to server 2A202 via a graphical user interface executing on the device 2A220. In another embodiment, the use-case identifier 2B266 is provided to server 2A202 for storage in the database 2A204 via TCP/IP and/or HTTP over network 2A206. Subsequently, server 2A202 stores the use-case identifier 2B266 in the database 2A204 in association with records 2B266. In one embodiment, the use-case identifier 2B266 is stored in association with an identity for user 2A210 or in association with a user record for user 2A210.

In the following step 2C206, various photo analysis processes may be executed on the images or photos 2B264 stored in the database 2A204 as records 2B266, at the direction of the user 2A210 via input provided via a graphical user interface executing on the device 2A220. The photo analysis processes comprise identifying similar images, identifying faces in the images, identifying objects in the images, identifying undesirable images, and identifying relevant portions of the images. The identification of faces and objects may be accomplished via object recognition and face recognition libraries. The identification of similar images may be accomplished via an analysis and comparison of color, focus, brightness, faces, objects and the like in each image, as described in greater detail below. The identification of undesirable images may be accomplished by identifying images that are out of focus or contain too little light for a proper exposure. For blurry photos, edge detection may be used to detect any sharp edges, if any. The identification of the relevant portions of an image may be accomplished by identifying the relevant portions of an image, such as faces and objects that may have been recognized. By applying saliency filters, a bounding box may be drawn around a focus of an image. Thus, if the relevant faces or objects are located on the sides of the image, the image may be zoomed or cropped to highlight the identified relevant area. The photo analysis processes may further include identifying images with an incorrect orientation, identifying images with incorrect color, brightness or contract, and/or identifying images with red-eye.

In the following step 2C208, various photo correction processes may be executed on the images or photos 2B264 stored in the database 2A204 as records 2B266, at the direction of the user 2A210 via input provided via a graphical user interface executing on the device 2A220. The photo correction processes comprise: orienting images that have been identified as having an incorrect orientation to an appropriate orientation, adjusting images that have been identified as having an incorrect color, brightness or contract to the correct color, brightness or contract, and removing red-eye from images that have been identified as having red-eye.

In the following step 2C210, various use-case specific heuristics may be executed on the images or photos 2B264 stored in the database 2A204 as records 2B266, based on results of said photo analysis, at the direction of the user 2A210 via input provided via a graphical user interface executing on the device 2A220. The use-case specific heuristics comprise: grouping images that have previously been found to be similar, grouping images having identical or similar faces (based on the faces that were previously identified), grouping images having identical objects (based on the objects that were previously identified), removing undesirable images (based on the images that were previously identified as undesirable), and cropping images to highlight relevant portions of said images (based on the relevant portions of images that were previously identified).

In executing the use-case specific heuristics, heuristics that correspond to the use-case identifier 2B266 are utilized. Different use-cases may require different heuristics. For example, a use-case identifier 2B266 that identifies a wedding would result in heuristics that: group images having the faces of the bride and groom (based on the faces that were previously identified), group images having the wedding cake or the altar (based on the objects that were previously identified), and crop images to highlight portions of said images having the faces of the bride and groom (based on the relevant portions of images that were previously identified). Instructions 2B268 in database 2A204 may instruct server 2A202 on which heuristics correspond to each potential use-case identifier 2B266 provided by user 2A210.

As an example, with regard to grouping images having the faces of the bride and groom (based on the faces that were previously identified), using face detection, identifiers may be applied to each face to determine, for example, that person A shows up in 85% of the photos, person B shows up in 73% of the photos, and person C shows up in 20% of the photos. Therefore, person A and B are most likely the bride and groom.

In the following step 2C212, various additional functions may be executed on the images or photos 2B264 stored in the database 2A204 as records 2B266, at the direction of the user 2A210 via input provided via a graphical user interface executing on the device 2A220. The additional functions may comprise: reading embedded date or location metadata from the images, performing a lookup of additional location data based on the embedded location metadata, and generating text boxes to be printed below said images upon creation of the photo-based project 2A252. The additional functions may also include ordering the images or photos 2B264 stored in the database 2A204 in chronological order, based on the time the images were taken or created.

In one example of the execution of the process of step 2C212, the server 2A202 reads an image in EXIF format, a standard that specifies the formats for images and ancillary tags used by digital cameras (including smartphones), scanners and other systems handling image files recorded by digital cameras. The EXIF format may store date and time information of the image, camera settings of the image, thumbnails of the image, descriptions of the image, and copyright information for the image. In this example, the server 2A202 may read the location for the image from the file and generate a text box reflecting said location to be printed below said image upon creation of the photo-based project 2A252. In another example, the server 2A202 may read the location for the image from the file (in a GPS coordinate format), perform a lookup to find a corresponding text string that matches the GPS coordinate, and generate a text box having said text string to be printed below said image upon creation of the photo-based project 2A252. In this example, the server 2A202 may read the date and time for the images from their files and place the images or photos 2B264 in chronological order, based on the time the images were taken or created.

In the following step 2C214, the creation process is concluded and the resulting photo-based project product is ordered, at the direction of the user 2A210 via input provided via a graphical user interface executing on the device 2A220. In this step, the server 2A202 sends a request 2B270 to the fulfillment party 2A250 for the photo-based project product 2A252. In the following step 2C216, the fulfillment party 2A250 receives the request 2B270 for the photo-based project product 2A252, prints the photo-based project product, binds the photo-based project product, packages the product, and then ships the ordered product 2A252 to the end customer, such as user 2A210.

Figure 2D:
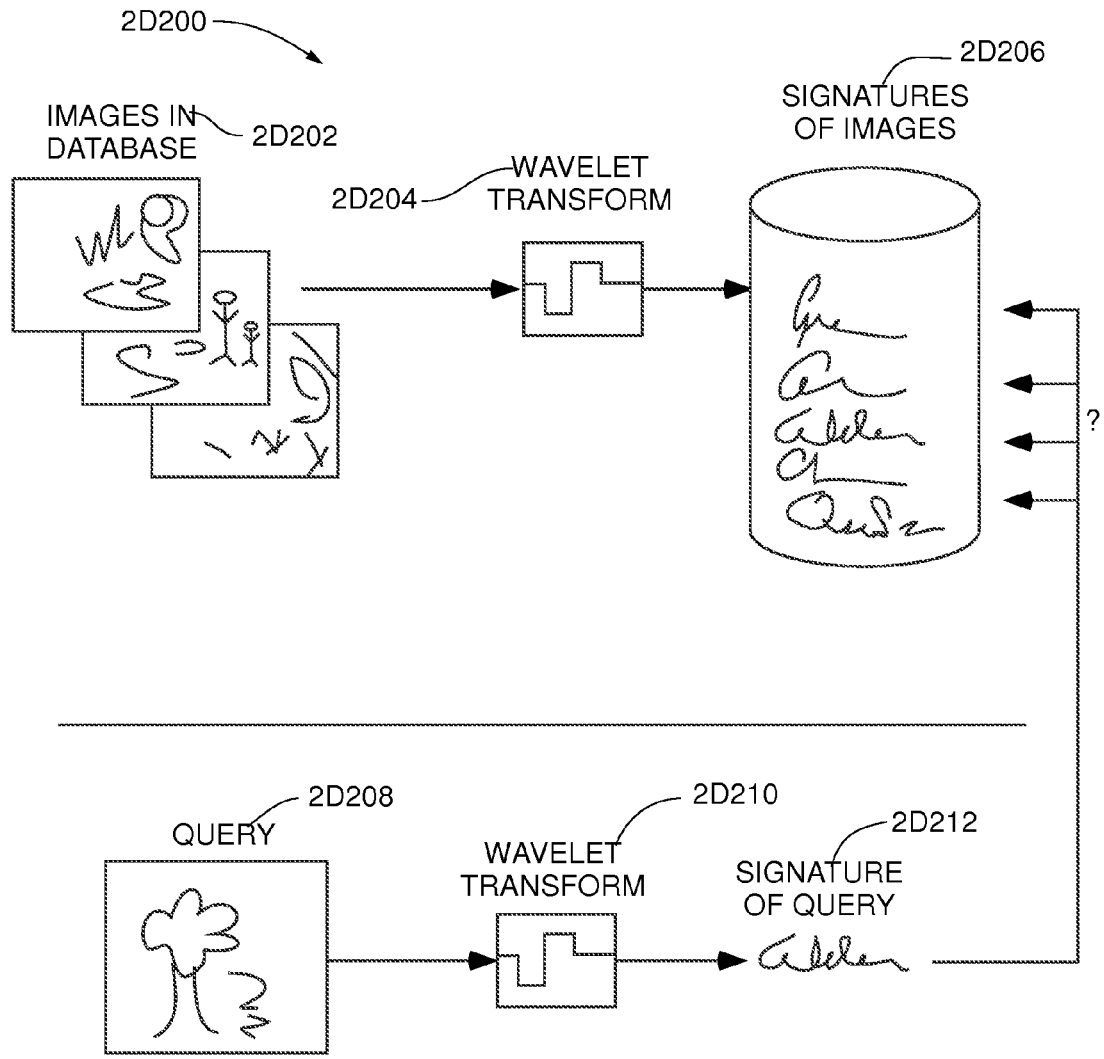
FIG. 2D is an illustrative flowchart of an image analysis process, according to one embodiment of the present invention.

FIG. 2D shows an illustrative image analysis or photo processing process according to one embodiment of the invention. The image analysis process shown in FIG. 2D is illustrative only, and is not intended to be limiting. Various other image analysis processes, some of which are described later, are also within the scope of the present invention. This image analysis process describes an image similarity detection process, as illustrative of the image analysis processes that are useable with the present invention.

In one illustrative image analysis process shown in FIG. 2D, the process 2D200 examines the images for similarity by expressing a query to the image database 2D202 (all of the images) by requesting images that are similar to one of the images (query image 2D208). The process considers basic shape and color information of the photo when looking through the database for potential matches of similar photos. Several factors make this matching process difficult. The query image is typically different from the target image, so the retrieval method must allow for some distortions. Since these are natural photos taken in natural environments, the photos may suffer artifacts such as color shift, poor resolution, dithering effects, and mis-registration. Furthermore, it is important to perform the retrieval fast enough to not hamper user experience of the media-product creation process.

When the images are first received by the server, a wavelet transform 2D204 is performed on every image in the image database 2D202. By collecting just the few largest coefficients from this transform, the process distills a small "signature" for each of the images. These signatures are saved in a signature database 2D206 so that it is computationally efficient to compare them all to each other.

When the process 2D200 requires photo(s) of similarity to a given query image 2D208, the process performs a wavelet transform 2D210 on the query image 2D208 to produce a signature 2D212 for the given query image 2D208. This query signature 2D212 is compared to the signatures of the database images 2D206, and the best matches are retrieved by the process 2D200 for use in automatically creating, organizing, and presenting the media-based project to the user.

The wavelet transform is used to analyze functions at different levels of detail; it is somewhat similar to the Fourier transform, but encodes both frequency and spatial information. By saving the few largest wavelet coefficients for an image (and throwing away all of the smaller coefficients), it is possible to recover a fairly accurate representation of the image. This property may be exploited for efficiency gains to optimize image similarity comparisons. For example, a wavelet transformed image ("signature") that incorporates 400 coefficients would require about 3% as much disk space as the original image. In one embodiment, it is possible to take a wavelet transform and keep just a few (for example, 20) coefficients for each color channel and distill from them a small "signature" for each image. Because the signature is so small, it permits very fast searching in the database.

Additional Mixbook Embodiments

Figure 2E:
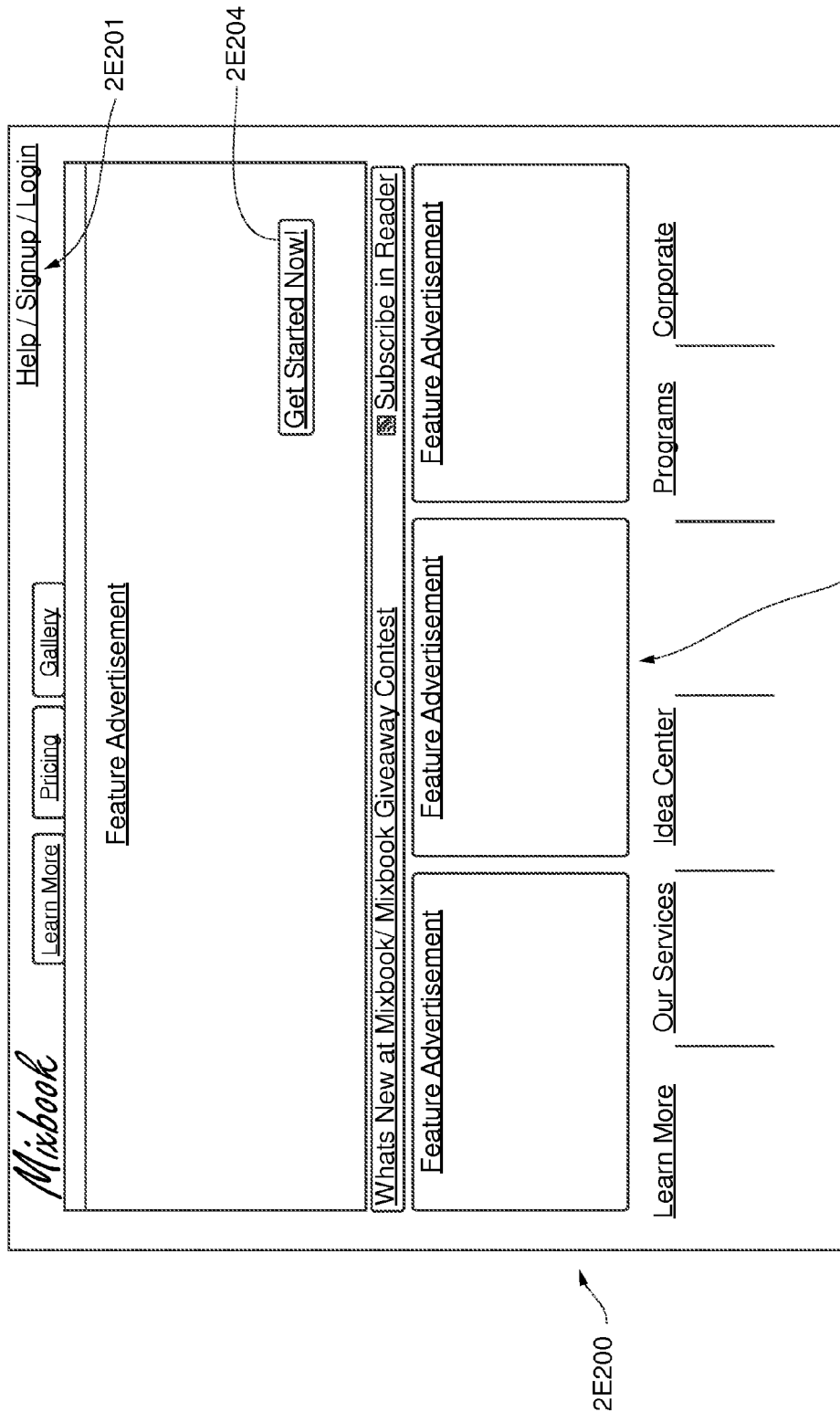
FIG. 2E is an exemplary screen shot of an introduction page of the website of FIG. 1W, according to an embodiment of the present invention.
Figure 3:
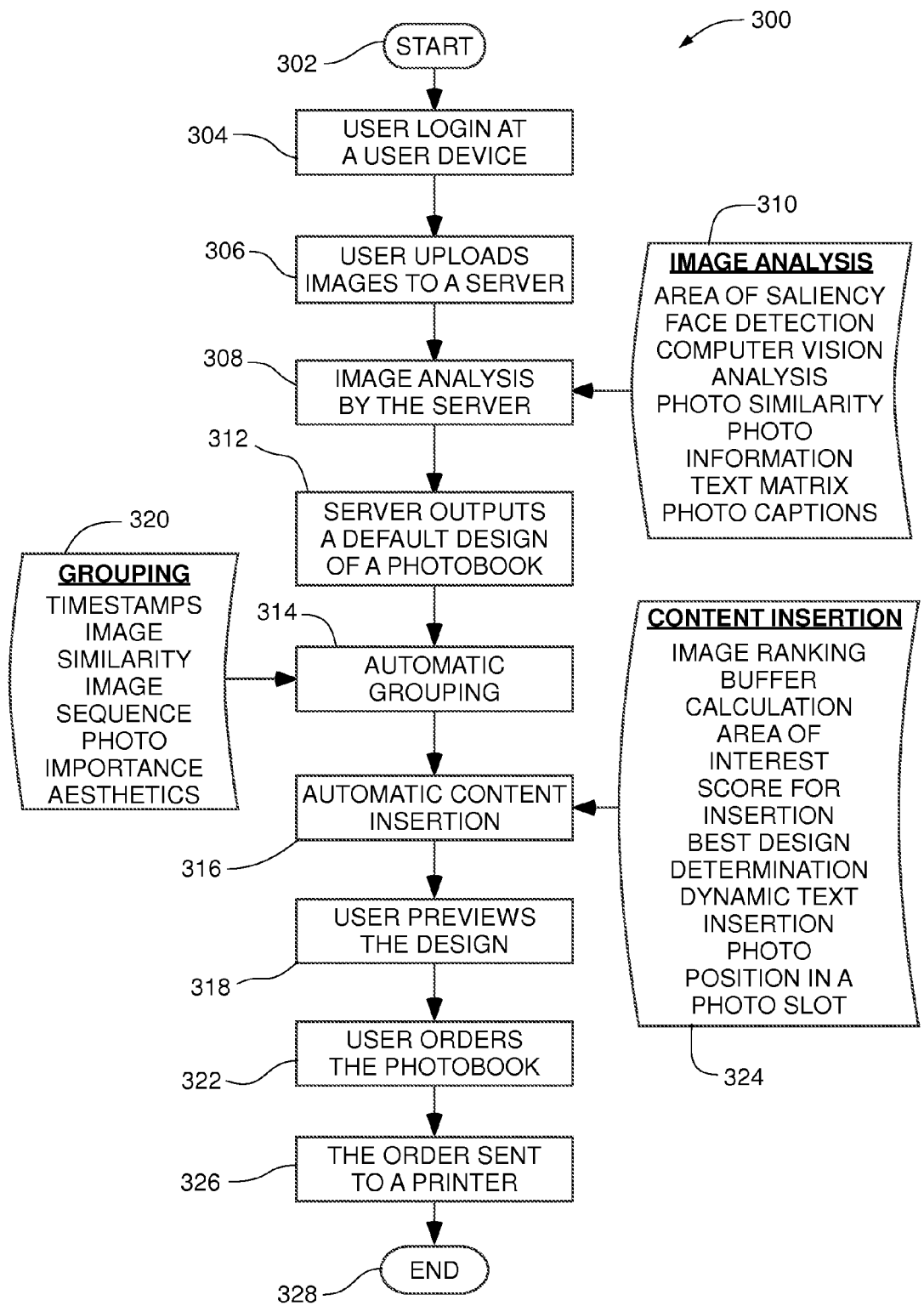
Figure 4:
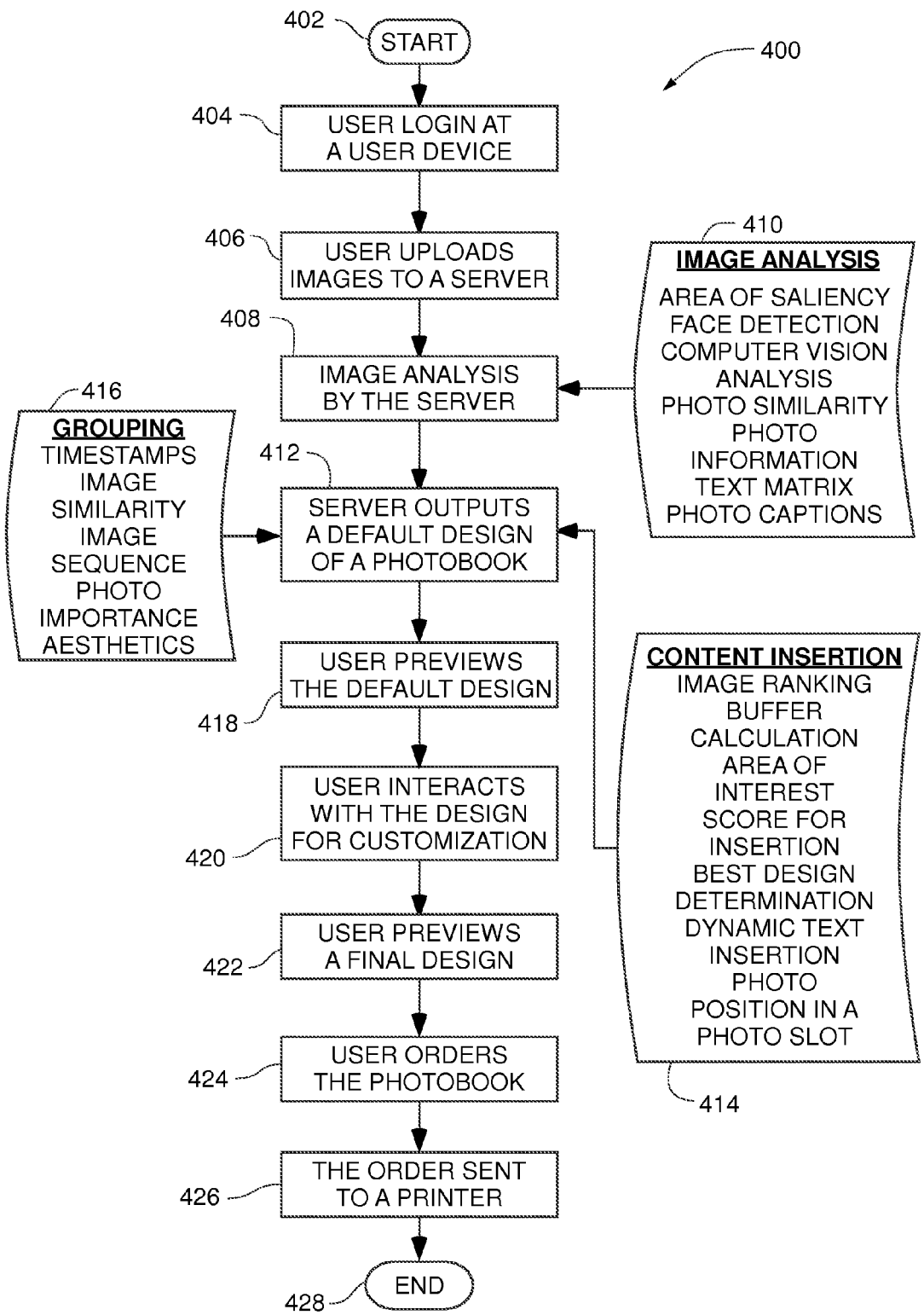
Figure 5:
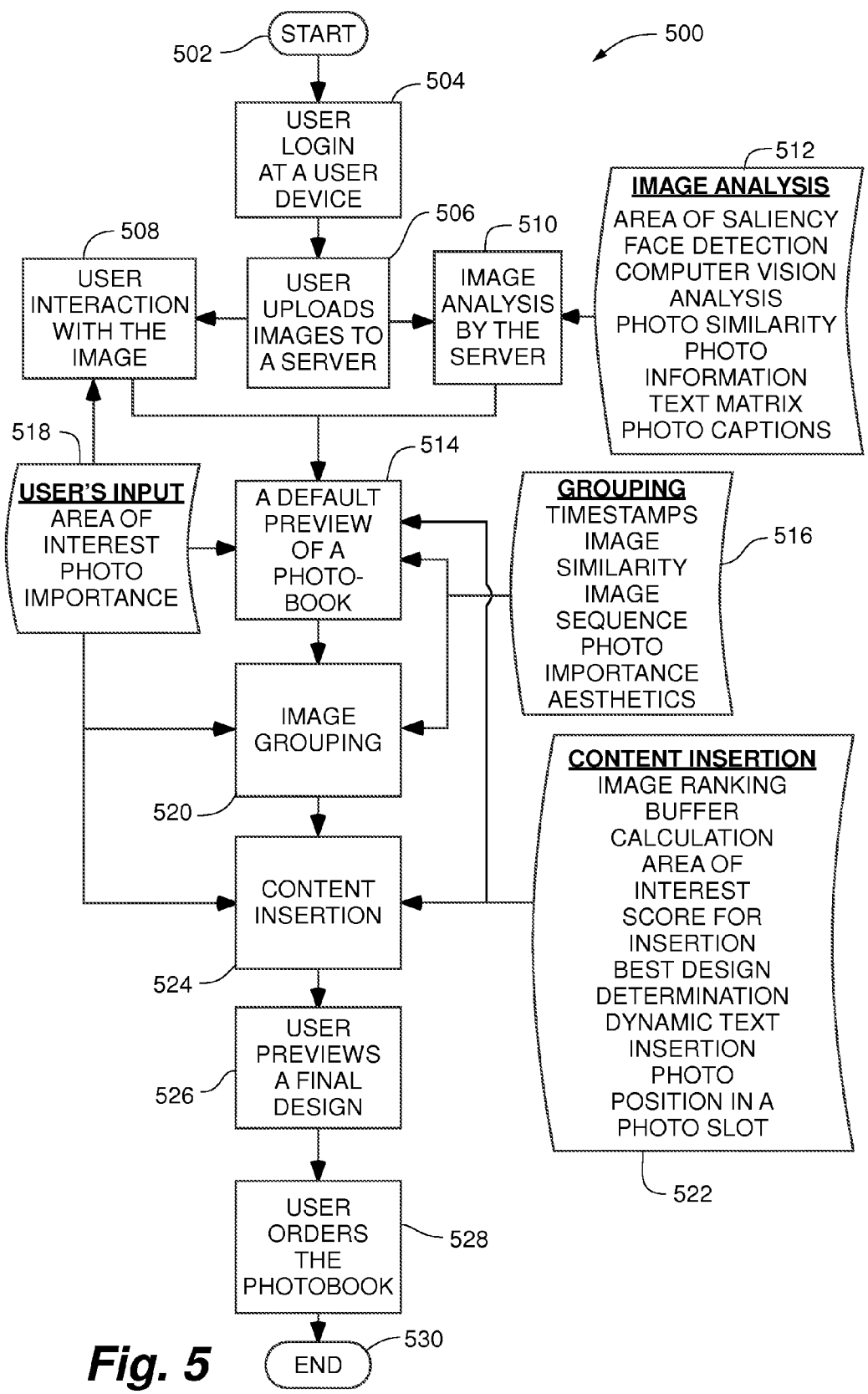

FIG. 2E is an exemplary screen shot of an introduction page 2E200 of website 1W2106 of FIG. 1W according to an embodiment of the present invention. Introduction page 2E200 includes interactive indicia 2E201, which includes an option for retrieving help, signing up for service, and for logging into the service. On the same title bar containing the interactive indicia 2E201 for signing up or signing into the process, there are the navigation options Learn More; Pricing; and Gallery. The option "learn more" leads to additional information about the services provided, such as product quality, use cases, etc. The pricing option brings up one or more complete pricing structures for the available products that can be created and printed. The option Gallery is an option that provides access to completed projects authorized for public viewing.

Page 2E200 contains more than one feature advertisement 2E203. Each feature advertisement may comment or provide some input, access to, or information about a feature of the service or fact about the providing company. In the first feature advertisement (center top) there is an interactive option 2E204 for getting started now. Invocation of this interactive link may launch a registration or sign-up process followed by an opportunity to begin a MIXBOOK project. Hyperlinked information is provided on introduction page 2E200 under categories such as Learn More, Our Services, Idea Center, Programs, and Corporate.

In one embodiment, page 2E200 includes an option "try it now", which may be replace option 2E204. Invoking such an option may take the "guest" to a MIXBOOK EDITOR without requiring them to login or have an account with the site. Transparent to the user, the system creates a temporary account for them. If the new guest user attempts to save any work on the site they are asked to register as a user.

Automatic Insertion of Content into Projects

FIG. 3 is a flowchart 300 of an embodiment showing an automatic insertion of content into a design. Content may comprise photos or images, text, and user inputs from a user. At step 302, a user starts a process of automatic insertion of content by using a user-device. The user logs in at the user device at step 304. After log-in, the user enters a workspace, an editor, or a graphical user interface (GUI) at the user device. The user at step 306 selects images or photos from the user device and uploads them to a server. At step 308, the server performs an image analysis on the uploaded images. After the images are analyzed, the server derives automatic image information from the uploaded images. As shown in the list 310, automatic image information is derived by using computer algorithms that include, but are not limited to, one or more of detecting areas of saliency, face detection, computer vision analysis, photo similarity detection, and analyzing photo information, text matrix, photo captions, and so on. Automatic image information is also derived from image meta-data. After using the automatic image information derived by image analysis, the server at step 312 outputs a default design preview (an automated design) of a photobook. The design preview at step 312 also comprises a layout that is the basis for the design.

At step 314, the server performs automatic content grouping of the uploaded images. For automatic content grouping, the server utilizes, but is not limited to, one or more of the information in the list 320. The list 320 comprises timestamps, image similarities, image sequences, photo importance, aesthetics, and so on. At step 316, the server automatically inserts content into the design of the photo project by using, but not limited to, one or more of the items (computer algorithms) in the list 324. The list 324 comprises image ranking, buffer calculation, areas of interest in an image, scores for insertion, best design determination, dynamic text insertion, photo position in a photo slot, and so on.

The user previews the design at step 318. The preview at step 318 is populated after completing the automatic image information extraction of one or more of the items in the list 310, after step 314 of automatic content grouping, and after step 316 of automatic content insertion. The preview at step 318 is thus automatically populated by the server by using one or more of the items (computer algorithms) as shown by the lists 310, 320, and 324. After the user previews the design, the user can order the photobook at step 322. At step 326, the order is sent to a printer. The printer may be a third party printer, a social printer, or any industrial printer that is adapted to print photos on a photo quality paper. The ordered photobook may be printed on a preferred size of a photo paper. The ordered photobook may be a shippable product to the user. The printer may be further adapted to print a shipping label comprising the order information, and other relevant information. The process ends at step 328.

FIG. 4 is a flowchart 400 of an alternative embodiment showing a first insertion based on automatic image information and a second insertion based on observed image information of content into a design of a photo project. At step 402, the process starts at a user-device. The user logs in at the user device at step 404. After the log-in, the user enters a workspace, an editor, or a graphical user interface (GUI) at the user device. The user at step 406 selects images or photos from the user device and uploads them to a server. At step 408, the server performs an image analysis on the uploaded images. After the images are analyzed, the server derives automatic image information from the uploaded images. As shown in the list 410, automatic image information is derived by using computer algorithms that are relevant to areas of saliency, face detection, computer vision analysis, photo similarities, photo information, text matrix, and photo captions. Automatic image information is also derived from image meta-data. After using the automatic image information derived by image analysis, the server at step 412 outputs a default design preview of a photobook.

The default design generated at step 412 is based in part on step 416 of automatic content grouping and step 414 of automatic content insertion. At step 416, the server performs automatic content grouping of the uploaded images. For automatic content grouping, the server utilizes the information comprising timestamps, image similarities, image sequences, photo importance, and aesthetics. At step 414, the server automatically inserts content into the design of the photo project by using items (computer algorithms) comprising image ranking, buffer calculation, areas of interest in an image, scores for insertion, best design determination, dynamic text insertion, and photo position in a photo slot.

The default design at step 412 is based on a combination of computer algorithms in lists 410, 414, and 416. The user previews the default design created by the server at the user device at step 418. Furthermore, the user customizes the design at step 420 by adding user interactions or user inputs. User interactions or user inputs comprise area of interest selection, photo importance determination, and so on. User interactions or user inputs are performed manually by the user. By observing and monitoring the user interactions at the GUI of the user device, the system is able to collect observed image information, which the system can use to improve on the automatic image information obtained by the system from image analysis. The system can monitor for such user interactions as zooming, panning, swapping photos, adding captions to photos, and so on. After the customization by the user, a final recommended design based on the automatic image information and the observed image information is generated by the system, and can be previewed by the user at step 422. The user can then perform additional customizations to the final recommended design, and then order the photobook at step 424. At step 426, the order is sent to a printer as described previously. The process ends at step 428.

FIG. 5 is a flowchart 500 of an alternative embodiment showing an insertion of content based on automatic and observed image information. At step 502, the process starts at a user-device. The user logs in at the user device at step 504. After the log-in, the user enters a workspace, an editor, or a graphical user interface (GUI) at the user device. The user at step 506 selects images or photos from the user device and uploads them to a server.

At step 510, the server performs an image analysis on the uploaded images. After the images are analyzed, the server derives automatic image information from the uploaded images. As shown in the list 512, automatic image information is derived by using computer algorithms that are relevant to areas of saliency, face detection, computer vision analysis, photo similarities, photo information, text matrix, photo captions, and so on. Automatic image information may also be derived from image meta-data. While the user is uploading original images to the server, the user can interact with a layout and a design of a photobook, and thus contribute to creating user inputs or user interactions with the design. At step 508, the user interacts with the images that are already uploaded to the server. User interactions are also called manual interactions, manually observed information, user inputs, or user's behavioral observation. As shown in the list 518, user interactions comprise one or more of, but are not limited to, areas of interest in a photo, photo importance, panning, zooming, switching photos, and so on. Not every possible user interaction is shown in list 518 for simplicity of explanation. User inputs may also be called tweaks, and give rise to observed image information. By using user's manual inputs or user interactions (observed image information) along with the automatic image information derived though image analysis by the server, a default preview of the design (an automated design) is generated at step 514. The automated design is subject to manual edit by the user at any time before an order to print is placed and confirmed.

At step 520, automatic content grouping of images is performed by using both observed image information from the user and automatic image information from the server. Any errors made by the server in automatic content grouping is manually corrected by the user at step 520. For automatic content grouping, the server utilizes one or more of, but is not limited to, the items or information in the list 516. The list 516 comprises timestamps, image similarities, image sequences, photo importance, aesthetics, and so on. User inputs at step 520 come from, but are not limited to, one or more items on the list 518. At step 524, manual tweaks are performed to further customize content. The server automatically inserts content into the design of the photo project by using, but is not limited to, one or more of the items (computer algorithms) in the list 522. The list 522 comprises image ranking, buffer calculation, areas of interest in an image, scores for insertion, best design determination, dynamic text insertion, photo position in a photo slot, and so on. Manual tweaks come from the list 518, but are not limited to the items shown.

After performing manual tweaks at steps 520 and 524, the user previews a final recommended design of the photo project at step 526. When the user is happy with the final recommended design, the user can order a photobook at step 528. The order may then be sent to a printer as previously described. The process completes at step 530.

Figure 6A:
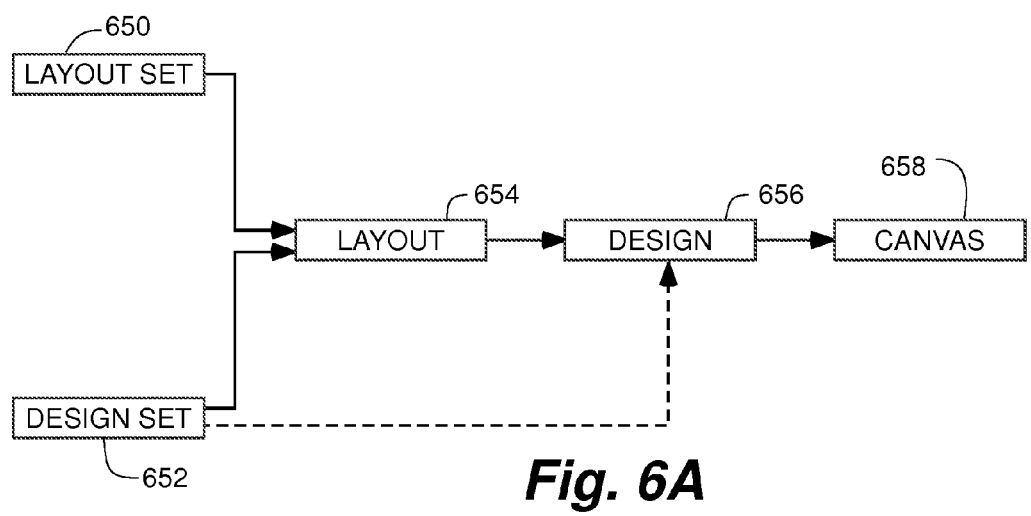
FIG. 6A illustrates a diagram showing a relationship between a canvas, a design, a layout, a designset, and a layoutset, according to an embodiment of the present invention.

FIG. 6A illustrates a diagram showing a relationship between a canvas, a design, a layout, a designset, and a layoutset, according to an embodiment of the present invention. A designset is linked to one layoutset. From one layoutset, there are many layouts. Each one of those layouts is then used to build one design for said designset. For example, if a layout set has 100 layouts, then a designset built from it will have 100 designs. A layoutset 650 gives rise to a layout 654, which itself gives rise to a design 656. The design 656 inherits from both a layout 654, and indirectly its layoutset 650. The design 656 is also selected from a designset 652. Each design 656 specifies a style and formatting of content in a layout 654 from which it depends, while each layout 654 specifies a location of photo slots and/or text slots without reference to styling. Each designset 652 is always tied to a layoutset 650 through its layout 654. Finally, the design 656 gives rise to a canvas 658 through an addition of content by a user, automatically by the server, or both. This inter-relationship of a canvas, a design, and a layout ensures system flexibility and efficiency whenever designs have to be modified.

Figure 6B:
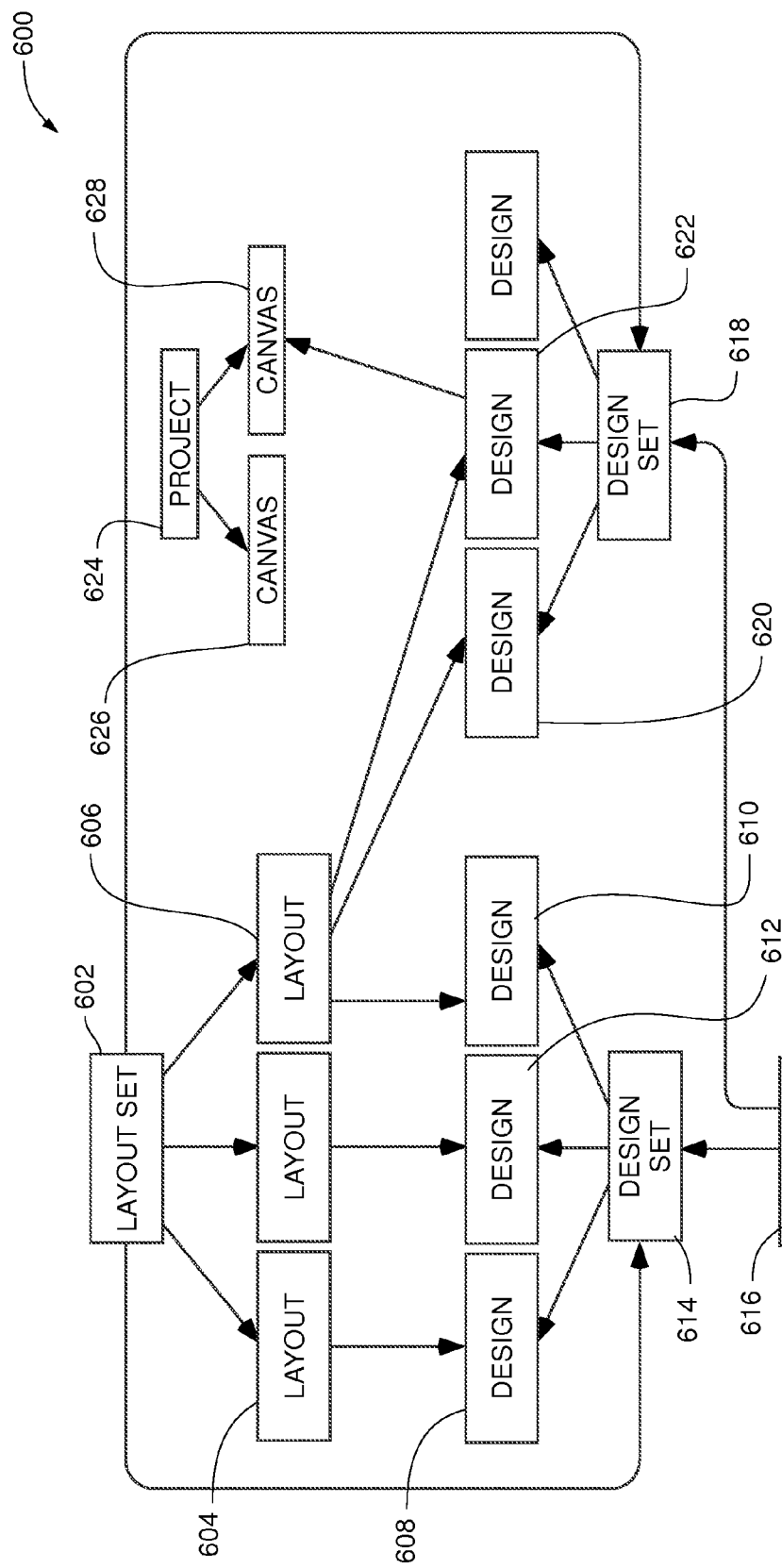
FIG. 6B illustrates a diagram showing an interrelationship of a theme, a layout, and a design, according to an embodiment of the present invention.
Figure 7:
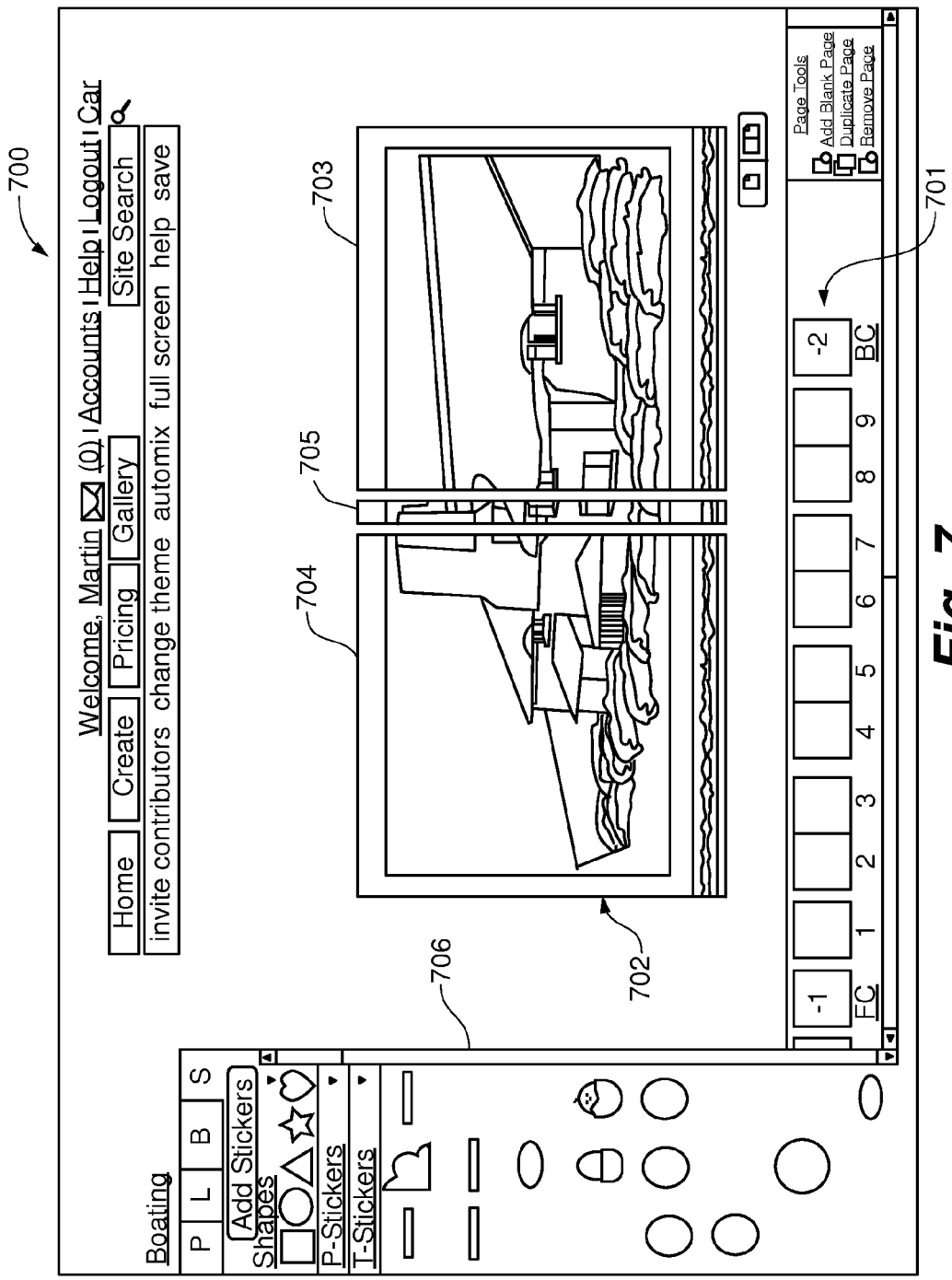
Figure 8:
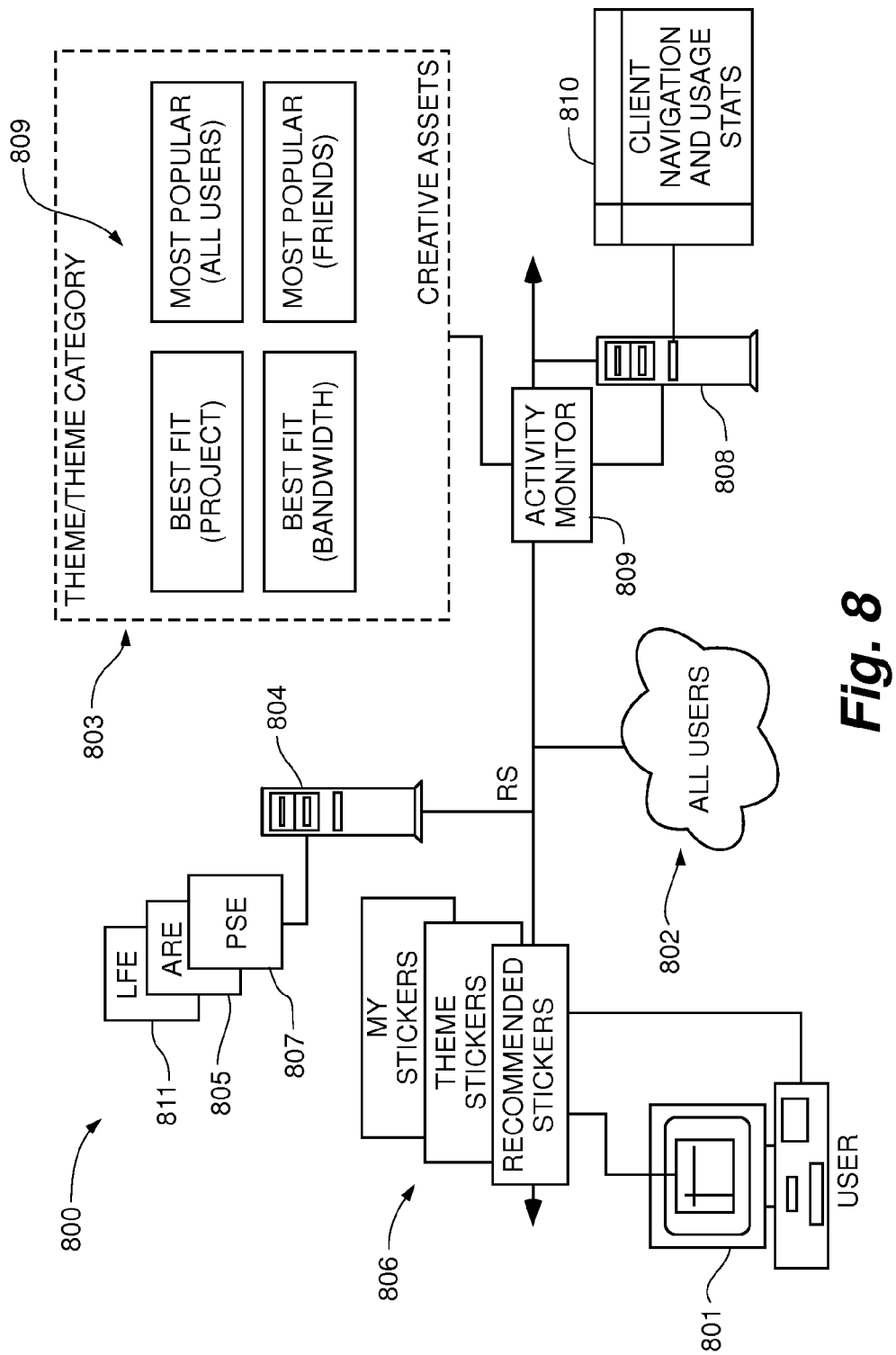
Figure 9:
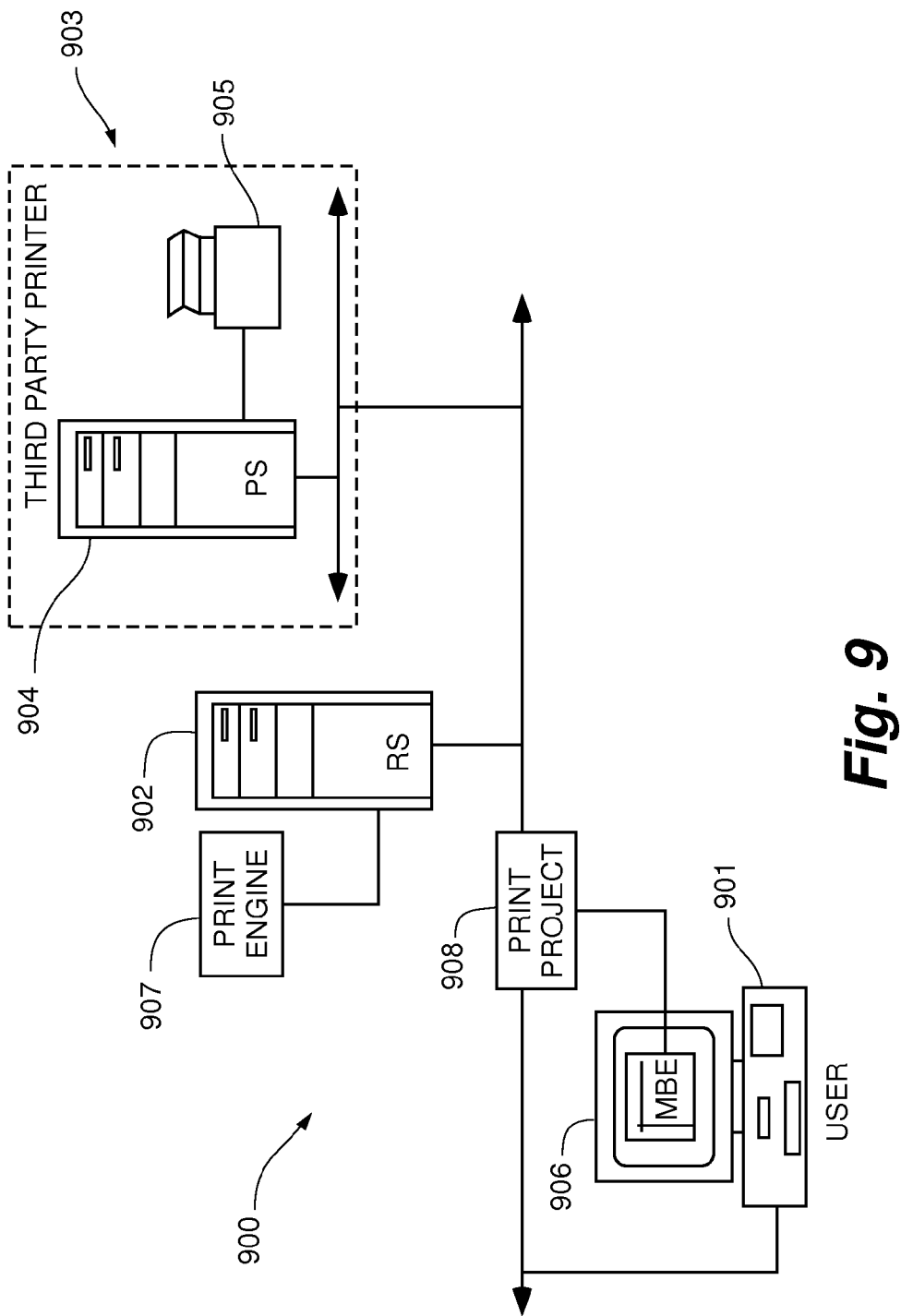
Figure 10:
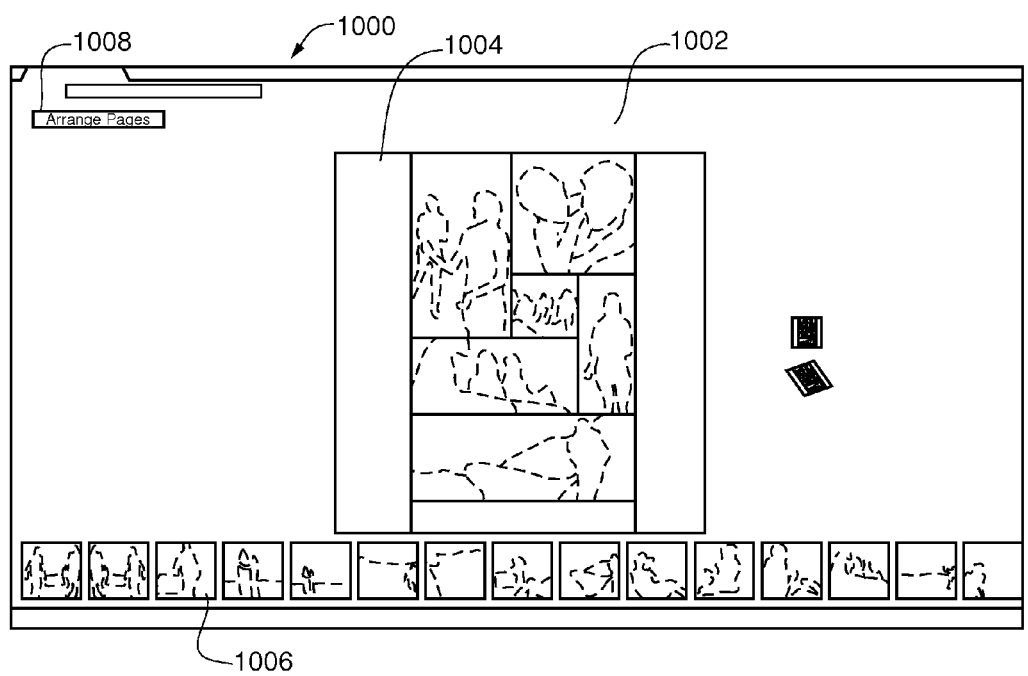

FIG. 6B illustrates a diagram 600 showing an inter-relationship of a theme, a layout, and a design, as well as their corresponding sets. To repeat, a designset is linked to one layoutset. From one layoutset, there are many layouts. Each one of those layouts is then used to build one design for said designset. For example, if a layoutset has 100 layouts, then a designset built from it will have 100 designs. As described previously, a user selects images to upload and build a photobook. Once the images are selected and upload begins, the user can select a theme 616. The theme 616 corresponds to designsets 614 and 618. Each designset is a collection of designs. For example, the designset 614 comprises designs 608, 610, and 612. Similarly, the designset 618 comprises designs 620, 622, and another design not numbered. Each design in turn depends on a layout. For example, the design 608 depends on a layout 604. Each layout depends on a layoutset. For example, the layout 604 depends on a layoutset 602. A layout can give rise to many designs. For example, layout 606 can give rise to designs 620, 622, and another design (not numbered). A design, in turn, may be presented in a canvas. A canvas represents how a design will be printed on paper. Finally, a project 624 can be represented by a plurality of one or more canvases, such as canvas 626 and canvas 628 in this example. For instance, the design 622 is reflected on canvas 628. Each layoutset serves as a basis for many designsets, and each layout serves as a basis for many designs. A theme 616 is consistent with a plurality of layouts as well as a plurality of designs that depend from the layouts, thereby maintaining an inter-relationship between a theme, a layout, and a design. Thus, this inter-relationship offers greater control for a responsive design update and for auto-flow/auto-fill algorithms, thereby saving time and labor in creating a photobook.

Other Exemplary Embodiments of the Present Invention

FIG. 7 is an exemplary screenshot of an editing interface 700 displaying a photo-spread including a front cover, back cover, and spine according to an embodiment of the present invention. Interface 700 has a storyboard display 701 that includes all of the pages of the photo book being created. The inventors provide a unique paradigm for relating items across multiple pages including special pages, in this case, the front cover 703, the back cover 704, and the spine of the book 705. When a user edits a spread that contains more than one page, the photos, shapes and stickers can be "overflowed" from one page to other pages within the spread. When the items are overflowing, they are linked together such that when an item changes on one page, its linked item gets updated reflectively on the other page.

In this example the related item is a single landscape photo 702 that is spread or wrapped around three special pages namely, front cover 703, back cover 704, and the spine 705. In the case of photo 702, it actively occupies all three designated special pages and editing of the photo from any of the special pages results in changes to the photo appearing on all three pages. For example, if a user pans photo 702 the results of positional change are seen on all of the pages that the photo occupies. If each of the pages has one or more related items that appear on all of the pages for example, and editing performed on one of the related items may be propagated to all of the related items on other pages automatically. The area 706 is an area in the interface that offers available resources for customizations, such as, stickers, shapes, and the like.

Related items may also be moved over to one page completely, so that original item is not showing whatsoever on the other page. When this occurs, the item will be removed from the page it is no longer visible on. In one embodiment a user may take an item that exists on a last page, for example, and may "sweep" the item off of that page to automatically create a next page with the same layout and theme that is hosting the related item.

In one aspect of the present invention, a page's position may be reflected using signed integers, which may also be used to model a special pattern. In this example, signed integers are used to describe positioning of the front cover 703 (signed integer −1) and back cover 704 (signed integer −2). Other special pages like foldable poster spreads (within a book) and inside cover jackets may also be positioned using signed integers. There may be a number of different position types to consider including number (any position value >0), special position, group position, pattern opposition, and function position.

It is duly noted herein that every product available to create at the service site like books, cards, calendars, and photo books, is a compilation of pages. A page is the fundamental canvas unit observed by the service although other unit definitions may be observed. A book is a collection of many pages. "Pages" is not just a reference to the insides of a book, but it can also refer to the cover pieces. The front cover, spine, and back cover are each pages which can be stitched together.

Many times in the process of creating a project, it makes sense to associate certain pages together. When a user edits a foldable card, for example, the user may want to be able to move an item from the bottom portion to the top part of the card. From the perspective of the back end data, the foldable card comprises two different canvas units pieced together.

FIG. 8 is a block diagram illustrating an asset recommendation system according to an embodiment of the present invention. In one embodiment of the present invention, asset recommendations are made to a user who is editing a current project using the MIXBOOK collage editor. System architecture 800 includes a user 801 that is currently online with runtime server 804 running an asset recommendation engine (ARE) 805. The system of the invention has access to all of the assets that have been designed by system designers, users whom may be registered as asset contributors, and any other user contributions to the system. Creative assets 803 include all of the stickers, shapes, backgrounds, layouts, photos, and any other accessible imagery.

When a user edits a project, and selects a theme, theme-based assets become accessible to that user's MIXBOOK editor. In the canvas-editing interface (MBE), one can create a hierarchical recommendation system for presenting users with content to use in their current and future projects. By using themes as the building blocks for this hierarchal asset recommendation system, we can then link a theme to a project and utilize the creative content of the project as the basis for the theme.

In one embodiment, a project can be used by the system as a basis for theme creation in order to facilitate creation of more projects based on the theme. This theme creation process can be leveraged by bundling all forms of creative assets from a user-created project into a theme. If the creator of the project so chooses, all of the assets in the project can serve as the basis for a theme, which then serves as the creative basis for creating future projects. For example, if a user creates a "Mother's Day" project in the form of a photo book, they can use this project as the basis for a theme called "Mother's Day Theme." This "Mother's Day Theme" can then serve as the basis for users across the site to create their own "Mother's Day" projects. They will be able to utilize the canvas pages and all other creative assets that were added to the original "Mother's Day" project that was used to create the theme.

In one embodiment, the assets are related to a specific theme a user has selected for a project. Creative assets like backgrounds stickers, layouts, and so on appear in the interface as thumbnails along with the user's photos, etc. In one embodiment asset recommendation engine 805 is adapted to list recommendations by relativity. For example, if a user like user 801 is working a project that is baby themed, then the stickers relating to that theme would appear in the user's editing interface. For example, hierarchical recommendation may take the form of sticker categories 806. Categories 806 include "My Stickers" as the top level of stickers (the first to appear in the interface). "My stickers" would include the stickers added directly to the project by contributors to the project. "Theme stickers" would next appear and would include the system-provided theme stickers that go with that particular theme. "Recommended Stickers" may include other theme stickers used in the projects from the themes that this project's theme shares a theme category with (Baby Themes).

Creative assets may be recommended on a contextual basis as well. For example, if a user is editing a specific page that has baby stickers on it and clicks the sticker tab other baby stickers will be shown to the user, including the ones used on that page. Other recommendation schemas may be practiced in accordance with the present invention without departing from the spirit and scope of the present invention.

A cloud labeled All Users 802 may represent all of the users currently editing projects, or all of the users registered with the system. Assets may be recommended to user 801 based on what all of the current users or based on what all of the users have determined to be the best or most used or most popular assets like theme-based stickers. If the asset is stickers, a recommendation might be the most popular stickers based on use count among all users. Another category might be the most popular stickers based on use count of only the friends of the user receiving the recommendation. Another category might be recommendation of the stickers that might best fit a specific project (contextual). Yet another category might be a recommendation of creative assets based on bandwidth considerations. There are many varied possibilities. Any type of creative asset might be considered for recommendation using contextual or hierarchical recommendation using ARE 805. Recommendations may be made to users according to analyzed usage counts, friend relationships among the content creators, and content characteristics like width and heights or content meta-data such as photo data.

In one embodiment, a single asset recommendation system analogous to ARE 805 is provided for recommending creative assets stored by the system to users editing a project or a project page. Assets may include but are not limited to the categories of stickers, shapes, backgrounds, layouts, and frames. In a preferred embodiment the asset recommendation system is implemented in software and integrated with the GUI for recommending creative assets. In one embodiment the asset recommendation engine is a back-end data process that works in the background to rank creative assets and serve relevant assets according to ranking order. In this case each creative asset considered has a score card that may reflect a final score or value based on one or more conditions or "weightings."

The system is adapted to receive server calls relative to user GUI activity and to parse information about creative assets stored for use. A ranking function is provided that ranks creative assets based on filtered and/or or unfiltered statistical data known about usage and characteristics of the asset input against one or more pre-set rules for ranking the appeal of that asset. The system includes a server function for serving the recommended assets into the GUI. In this way the most relevant assets may appear in the interface closer to the top followed by the lower ranked assets and so on per asset category. The process is driven by algorithm and may fire each time the user clicks on an asset category to browse available creative assets stored by the system of the invention.

Both hierarchical and contextual recommendations can be made in concert to users operating the GUI. When a user clicks on an existing project to resume editing, the project's creative assets are loaded into the project pages as described further above. These creative assets are also listed in hierarchical order in the asset selection interface, typically the sidebar area of the editing GUI. In one aspect the hierarchy is My Stickers, followed by Theme Stickers, followed by Recommended Stickers. The ranking portion of the engine ranks My Stickers or "Project Stickers" as being most relevant to the project because they are already established in the project by the project contributors. Therefore, these already used stickers will be stickers that have the greatest probability of being re-used in the project.

The ranking engine ranks theme stickers as the next level of importance because these stickers are designed to be used in the theme that the user's project falls under. Now, the ranking engine looks at stickers that are stored that have been used in other user-created projects sharing the same theme or belonging to the same theme category but that have not yet been used in the instant project. The system ranks these stickers according to a weighting algorithm that calculates the appeal of each qualifying sticker according to one or a combination of parameter constraints.

In one example, the recommended stickers sent to a user for display in the recommended stickers' window might be the highest ranking stickers based on a use statistic filtered by user type. For example, this user's friends prefer the following recommended stickers based on the number of times they have been used in projects sharing the same theme or even the same theme category. On the other hand, the system may rank the stickers based on some other preset condition that is relevant to the situation at hand or may rank stickers based on likeness to stickers already selected for use in a project or on a project page.

In one embodiment the asset recommendation requirements are a receiving function for receiving server calls relative to user GUI activity being monitored, a weighting function for ranking creative assets based on input against one or more rules for ranking asset appeal, and a server function for serving the recommended assets into a GUI. In simple practice of the invention includes (a) receiving an indication of a user selection of a project or project page for edit at an asset recommendation engine; (b) calculating or updating current scores for the assets that qualify for service based on project, project page, and theme-based characteristics; and (c) serving the assets into the GUI asset browsing windows with the most relevant assets based on analyzed score served first followed by lesser relevant assets.

In one embodiment, the system of the present invention can select one or more photos from a user's project for recommendation in a new product. The system stores the in-depth page positioning information for all of the items placed in a user's project. The metadata about each of the user's photos, for example, is persisted along with the in-depth positioning information with each item stored for use in the project.

The system may therefore make intelligent recommendations regarding the importance and relevance of photos and other assets to a user. Through this analysis, the system can make automated suggestions of single or multiple photo products that the user may have an interest in purchasing.

By analyzing asset usage information and other data the system can access the items stored for a specific project that may contain, for example, hundreds of photos and select one photo or a few photos that would qualify for application to single or multi-photo products like canvas prints, coffee mugs or mouse pads and so on.

Referring now back to FIG. 8, the system may use ARE 805 to make an assessment of which image or photo assets in a product are good candidates for isolation for a single or multi-photo product. The term multi-photo refers to a product with two to several photos, for example, where the user had many photos in the project pool. A coffee mug may include a photo wrapped around the mug or several photos positioned about the mug. There are many different possibilities.

The ARE may first access the creator's project photos stored in the database. Then the system might weigh data associated with each photo used in the project against one or more business rules. After weighing the results, ARE 805 may select one or more than one photo based on weighted score. In one aspect each item has a score card. The system may finally suggest or recommend one or more than one photo product as an up sell at such time the user wishes to make a purchase. A unique aspect of the recommendation is that the system may present one or more views of the suggested product already loaded with the creator's photos selected by the system.

ARE 805 analyzes any tags attributed to photos and the descriptions of and captions associated with those photos. ARE 805 might consider the actual size of images for certain product types like canvas prints, for example. If a photo is a background that spans two pages in a photo book, it may be a good candidate for a canvas print. ARE 805 can consider the number of times a photo is used in the same project. The recommendation may be updated as a user edits a project such that when a user is ready to purchase the project in print form the system might also recommend that the user purchase another product that can be displayed to the user through the GUI with the recommended photos in place on the product. The system might offer an up sell option of one or more than one product exhibiting the selected photos.

With reference to FIG. 8, ARE 805 may leverage a number of statistical genres to help prioritize creative assets that are presented to customers for possible inclusion into their projects. Network 800 supports a statistics server 808. Statistics server 808 includes at least one processor, data repository, and a transitory medium. Server 808 hosts SW 809, labeled Activity Monitor. Activity monitor 809 may be hosted on runtime server 804 and may be integrated with ARE 805 without departing from the spirit and scope of the present invention.

ARE 805 may also communicate with a separate activity monitor 809 as shown in this example distributed to server 808 to better aid discussion of separate functions. Activity monitor 809 is adapted to monitor activities of customers and non-registered site visitors for the purpose of gathering data to create useable statistics across multiple categories relative to the activities of customers and, in some embodiments, relative to the activities of non-service-registered friends and family members of those customers who may visit the site to look at projects or otherwise browse published projects created by those customers. Activity monitor 809 may monitor all of the activity occurring within the service domain, such as at the service Website (not illustrated), and during project creation, editing, and transaction processes through a graphics user interface (GUI).

Server 808 has connection to a data repository 810 adapted to contain, at least, client navigation and usage statistics. In one embodiment navigation and usage statistics may be gathered from non-registered users such as friends and family of registered users who visit the service domain such as a Website, portal, social interaction page, project publication page, and so on. Activity monitor 809, in this embodiment, works in the background independently from ARE 805 to monitor all users and to collect data about those users and activities they engage in at the service site domain. Activity monitor 809 includes a processing component for creating statistics formulated under several categories. One such category is usage of assets such as repetitively used content contributions, themes, stickers, frames, styles, etc. Another possible category of data relates to a user actively liking or disliking an asset or contribution. Site navigation patterns of users through the service domain represent another possible category for gathering data and forming statistics. Still another data category is sales data relative to projects created at the service, for example, the current best-selling themes.

Activity monitor 809 creates statistical information about data it has collected and store the information in data repository 810. As activity monitor 809 creates new statistics, the data in repository 810 is updated and older data that is obsolete under any category may be purged. A time window for keeping data may be imposed as some categories may fluctuate widely in the amount of and relevancy of statistics depending on season, trend factors, or other like factors of change. For example, the theme "Mothers Day" and related creative assets and usage statistics would not be relevant during the time just before "Fathers Day", but become relevant again around the next "Mother's Day" season.

In prioritizing creative assets, the system, which may leverage ARE 805, attempts to present to the customer the best-fit assets the system can offer for what the customer's goals are in the way of project creation. ARE 805 may run for each user who is actively creating and or editing a project. In one embodiment, ARE 805 may communicate with a customer, making pre-project recommendations before the customer initiates a project if there is some indication of the intent of the customer. When ARE 805 is called to recommend assets to a user, it may access data repository 810 to obtain statistics relative to a theme, theme category, layout, and associated individual assets like stickers, photos, etc. that may be presented in prioritized fashion for that user. If the best, most likely accepted items are presented to the user first, less work will be required of the user to create a project.

The system may determine, for example, which existing template would be best for the user by looking at statistics formed from sales data and numerical analysis. In one example, assume that there are two photos arranged on a user's page for remixing. A category for data gathering could be data about history of all purchased books having layouts with 2 landscape photos arranged on them. Candidate layouts then may be prioritized further to narrow the field down to a few layouts that would best serve the customer. Template or layout categories may be filtered further by narrowing the selection criteria based on related themes to the current project being worked on.

Prioritized assets may be presented to a user in a sidebar of the graphics user interface. Activity monitor 809 includes at least a function for assessing and recording the usage statistics of digital assets used by the overall client base. Activity monitor 809 also includes a function for monitoring and recording the navigation behaviors, usage patterns, and content contributions of all or individual ones of users operating through the at least one GUI or visiting the service domain. ARE 805 functions to gather the prioritized digital assets for presentation according to analysis of statistical data recorded by activity monitor 809.

In one embodiment, a layout fabrication engine (LFE) 811 is provided to run on RS 804. LFE 811 is adapted to dynamically create or remix the layout of a canvas based on input from asset recommendation engine 805. In this way, a user may see the recommended assets and a preview of what the layout will look like using the highest prioritized assets like background, photos, stickers, frames for photo slots, text box styles, and other items. One component of such an engine is a machine learning routine that learns from a library of prioritized assets including photos, stickers, and other prioritized assets and is adapted to study page layouts containing these assets. The routine aids layout fabrication by providing intelligence relative to how best to position those assets such as photos, for example, and how best to compliment those assets with other assets like stickers. One example of such an optimization is mining metadata from prioritized assets like photos to create relevant captions for those photos. In one embodiment, location data and time data might be leveraged to provide a relevant caption for a photo, for example, if a photo is taken in New York City at 12:00 PM, then a relevant caption might be "New York City at night", or "Midnight in New York City".

The system, in some embodiments, includes a physics simulation engine 807 for simulating motion dynamics for items placed in a canvas layout.

Finally, FIG. 9 is an architectural diagram illustrating a printing network 900 according to an embodiment of the present invention. Printing network 900 includes a user 901 connected online to a runtime server 902. Runtime server 902 is analogous to runtime servers previously described in this specification. Runtime server 902 includes a digital medium coupled thereto and adapted to contain all of the SW and data required to enable server function.

When user 901 is editing a project using a MIXBOOK editor (MBE) such as MBE 906, for example, the user is connected in session with server 902. As such, the user may decide to print a finished project such as a photo book by invoking a printing option such as print project option 908 illustrated in exploded view. Such an action invokes a printing engine 907 that is responsible for rendering the user's project in a ready state for printing according to a final end product selected by the user.

The printing engine sends output files for printing to a third-party printing service 903. Printing service 903 represents any online printing service. Third-party printer 903 includes a printing server 904 and a connected printer 905 representing printing capability. Printing engine 907 is a flash based that is enhanced to produce high resolution output files to print. Print engine 907 is a single print engine that is involved from the point of creating a project to the point of printing out the project.

A flash-based print engine has some drawbacks that need to be overcome in order to print larger high resolution files. Outputting large format prints for printing from a flash based editor is very difficult to do. The inventors provide enhancements that enable the system to take flash content and produce a near pixel-perfect reproduction of a user's work in the high resolution formats that professional printers normally require. Traditionally print systems take the back end data and then recreate the content for printing through a second engine such as a Java-based print engine or a C-application. Print engine 907 is a point for point engine and can re-create content at any dots per inch (DPI) required by the printer.

In one embodiment, gutter areas of printed products are optimized for view after print. In most situations, a traditional printed book having a gutter area will have content sucked into the gutter area where it is hard to view, or there will be a color strip applied to the gutter area whereby the color strip appears somewhat unprofessional. Print engine 907 functions to solve the above problems by optimizing the size of the gutter area and content displayed on a page before printing. In particular, the system of the invention implements a unique method of gutter size calculation and content display logic for printable products.

Based on other content optimization algorithmic results, a gutter calculation algorithm calculates the best size for the gutter based in part on the aspect ratio grouping. The gutter area is intelligently sized in order to minimize the amount of content that is not viewable on printed book products due to the glue that lies in the gutter between two pages on a given spread.

The gutter sizing algorithm works in conjunction with a content sizing algorithm to balance the two extremes, one being no gutter allowance, and the other being too much gutter allowance. No gutter allowance results in content hidden by the glued area in between pages. Too much allowance causes the area defined as gutter to be displayed visibly to the user.

Page and Spread Re-Arrangement Embodiments

FIG. 10 is an embodiment 1000 showing a printable photobook with a cover in a finished form. In an editing interface or workspace or editor (GUI) 1002, a photobook is displayed with a cover or cover page 1004. The cover may be a hard cover with a random or organized selection of some of the photos contained in the photobook. A user can select (add or delete) one or more photos from the cover. The totality of photos in the photo book may be displayed to the user to customize the cover. In customizing the cover, the user can select a photo 1006 and add the selected photo 1006 to the cover page 1004, by dragging and dropping. After the user is satisfied with the design of the cover, the user can click on the soft button "Arrange Pages" 1008 to customize each page or each spread one by one. Other methods to add photos to the cover and to the photobook are also within the scope of the present invention.

Figure 11:
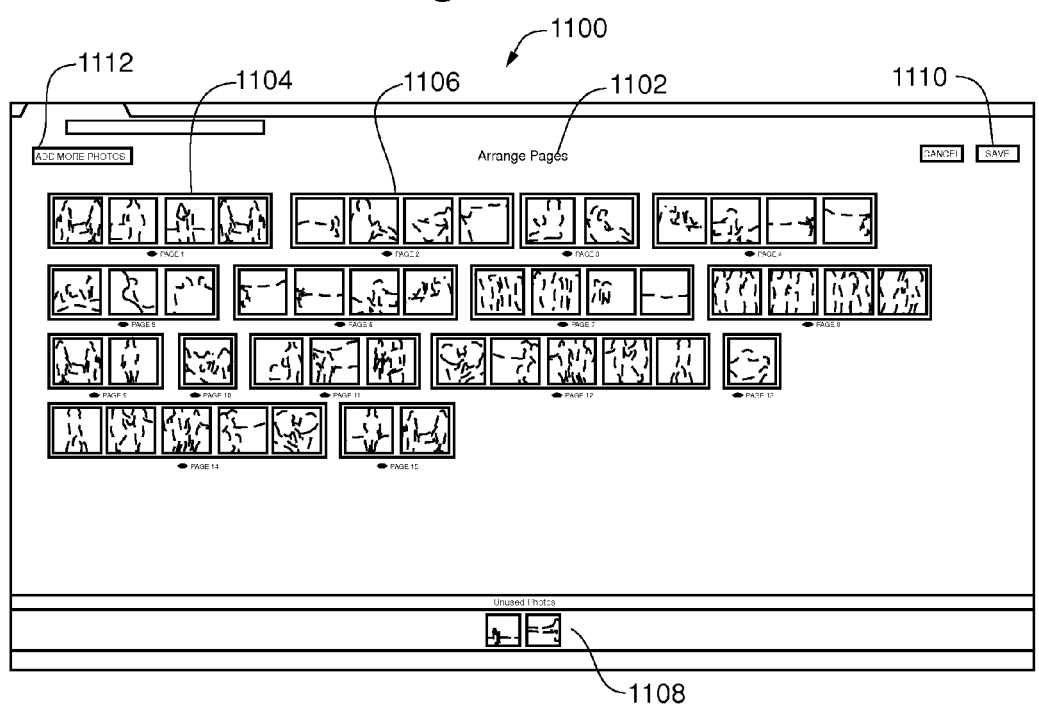
FIG. 11 is a diagram displaying pages or spreads of a photobook, according to one embodiment of the invention.

FIG. 11 is an embodiment 1100 displaying pages or spreads of a photobook. A first spread 1104 comprising photos and a second spread 1106 comprising photos is shown. The display of the embodiment 1100 or the arrangement of spreads as shown may be termed as a grid preview. A soft "save" button 1110 saves the arranged or customized pages and spreads as a soft copy of the entire project. Unused photos or an entire spread may be saved in a photo storage area 1108. The user can add additional photos to the photo editing area by pressing a soft button "Add More Photos" 1112, which takes the user to a location in which additional photos may be uploaded. Once the additional photos are added to the photo editing area, the user can press a soft button "Arrange Pages" 1102 to initiate an arrangement of pages and/or spreads with the additional photos, returning the user to this screen 1100.

Figure 12:
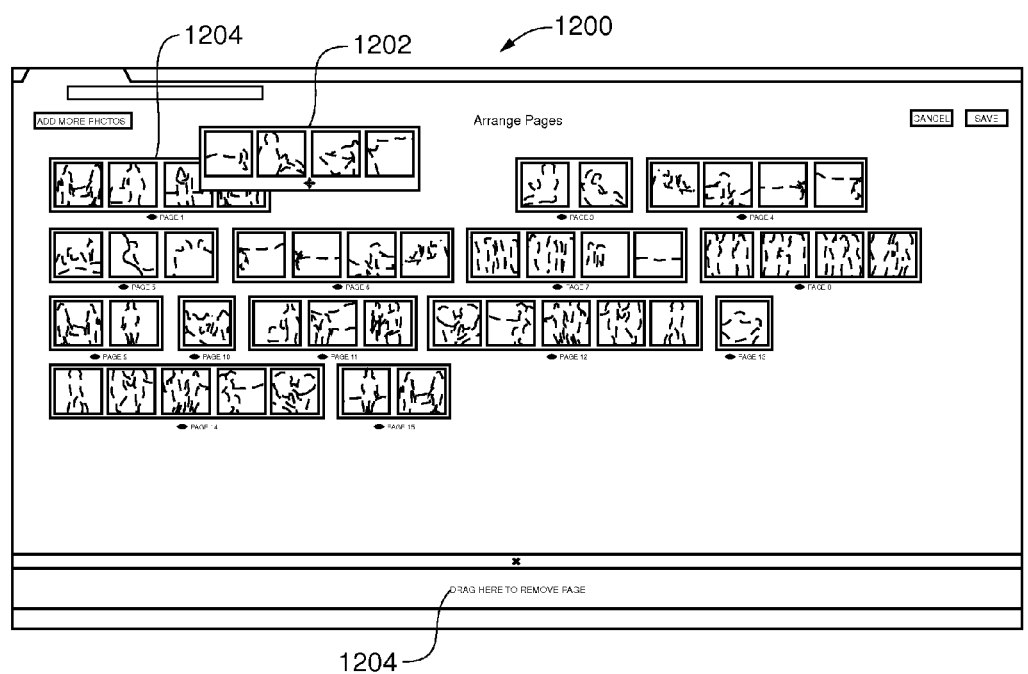
FIG. 12 is a diagram showing a dragging of a spread, according to one embodiment of the invention.

FIG. 12 is an embodiment 1200 showing a dragging of a spread. Two opposing pages can be referred to as a spread, and hence, the terms "pages" and "spread" may be used interchangeably, if the context requires it. A spread 1202 is dragged by using an input device of a computer, such as, a mouse, finger, stylus, and the like. The dragged spread 1202 is brought close to an adjacent spread 1204. The dragged spread 1202 is movable anywhere in the photo editor or workspace. The dragged spread 1202 may be dropped in between any other two spreads, or before the adjacent first spread 1204, or even after a last spread. The dragged spread 1202 may also be dropped in the temporary storage area 1204. A spread or a photo that is stored in the storage area 1204 may be used anytime later in the photobook customization process.

Figure 13:
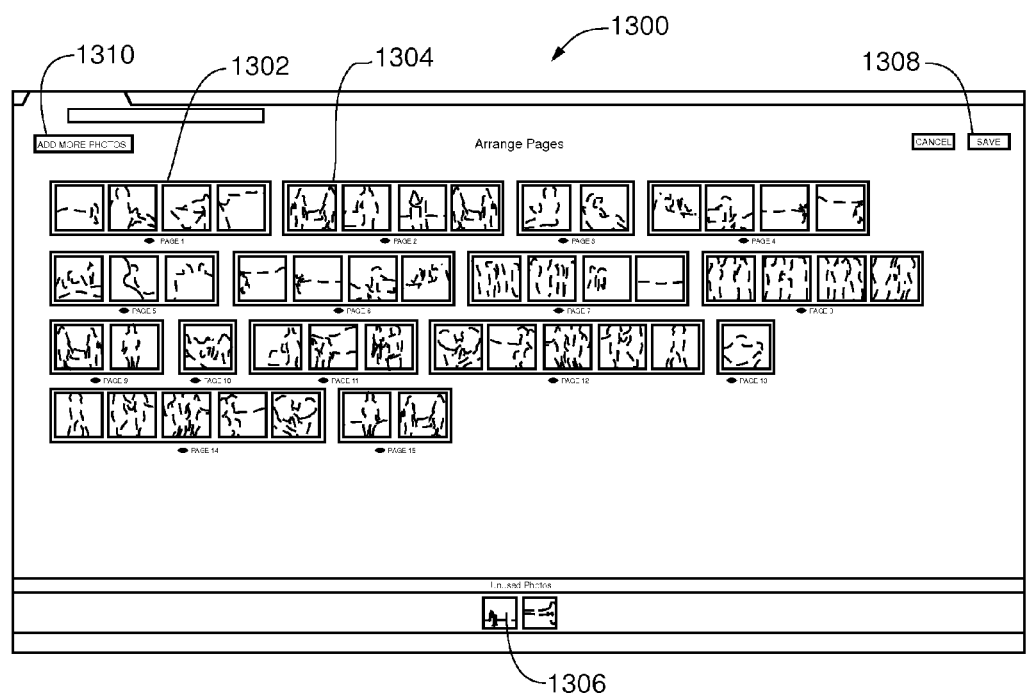
FIG. 13 is a diagram showing a swap of two spreads in a photobook, according to one embodiment of the invention.

FIG. 13 is an embodiment 1300 showing a swap of two adjacent spreads in a photobook. A swap of two adjacent spreads causes the location of the two spreads to switch. If the two spreads are not adjacent, then dropping the actively moved spread causes the other spreads to re-arrange. In the embodiment 1200, it is shown how one spread is movable in the photo editing area. In the embodiment 1300, it is shown how two spreads switch their locations after a swap. A swap is performed by dragging and dropping one spread adjacent to another spread. In the embodiment 1100, the spreads 1104 and 1106 are in original or auto-generated locations. In the embodiment 1200, the spread 1202 is being dragged. In the embodiment 1300, the spread 1302 is dropped before the spread 1304. Therefore, the embodiments 1100, 1200 and 1300, show how two spreads are swapped, or within the same meaning, how the locations of two spreads are swapped or moved or reshuffled. The user has an option to add more photos in the photo storage area or the editor by clicking on a soft button "Add More Photos" 1310. The project can be saved for later retrieval by clicking on the soft button "Save" 1308. An unused photo 1306 is stored in a photo storage area. The photo storage area can be anywhere in the editor or workspace, as a matter of design choice.

Figure 14:
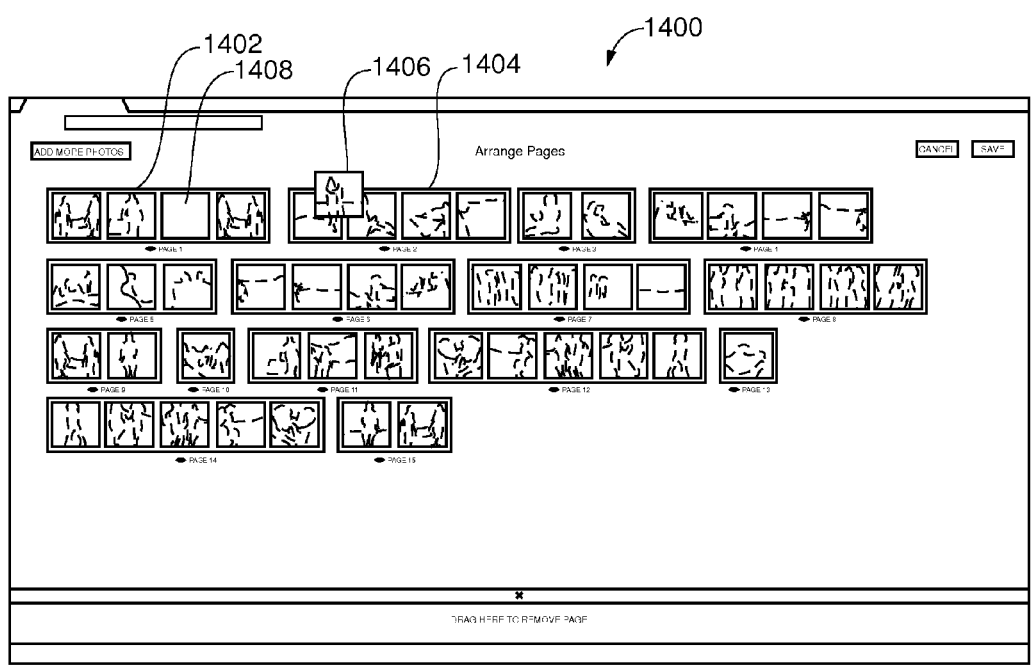
FIG. 14 is a diagram showing a pre-movement of a photo from one spread to another spread, according to one embodiment of the invention.

FIG. 14 is an embodiment 1400 showing a pre-movement of a photo from one spread to another spread. A user desires to move a photo 1406 from a first spread 1402 to a second spread 1404. The photo 1406 is movable by a drag of a mouse, a finger, a stylus, and the like. When the photo 1406 is moved, a placeholder (gap) 1408 is shown in the form of a shade to indicate where the photo 1406 was previously occupied. If the photo 1406 is not correctly dropped to a different location, the photo 1406 will automatically drop to its initial placeholder 1408, with no change in the location of the photo 1406 after a post-drag. In the embodiment 1400, the photo 1406 is dragged, by detaching the photo 1406 from the spread 1402, with the intention to merge the photo 1406 to the spread 1404.

Figure 15:
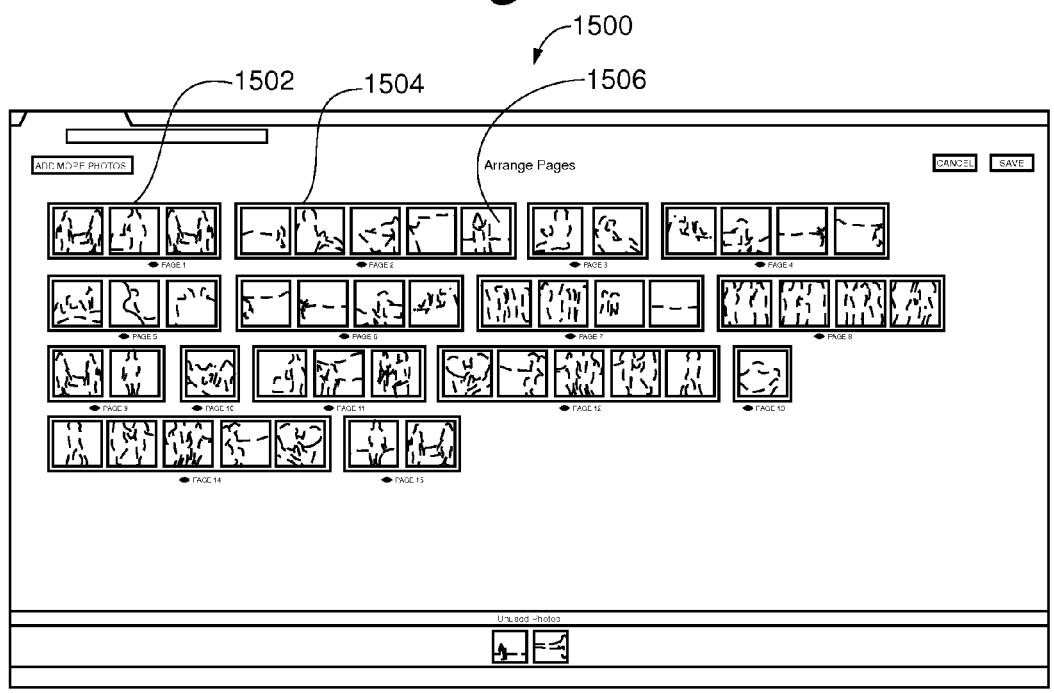
FIG. 15 is a diagram showing a post-movement of a photo from one spread to anther spread, according to one embodiment of the invention.

FIG. 15 is an embodiment 1500 showing a post-movement of a photo from one spread to anther spread. A photo 1506 is moved from a spread 1502 to a spread 1504. A pre-movement is shown by the embodiment 1400. The photo 1506 displays a post-movement of the same picture from the spread 1502 to the spread 1504.

Figure 16:
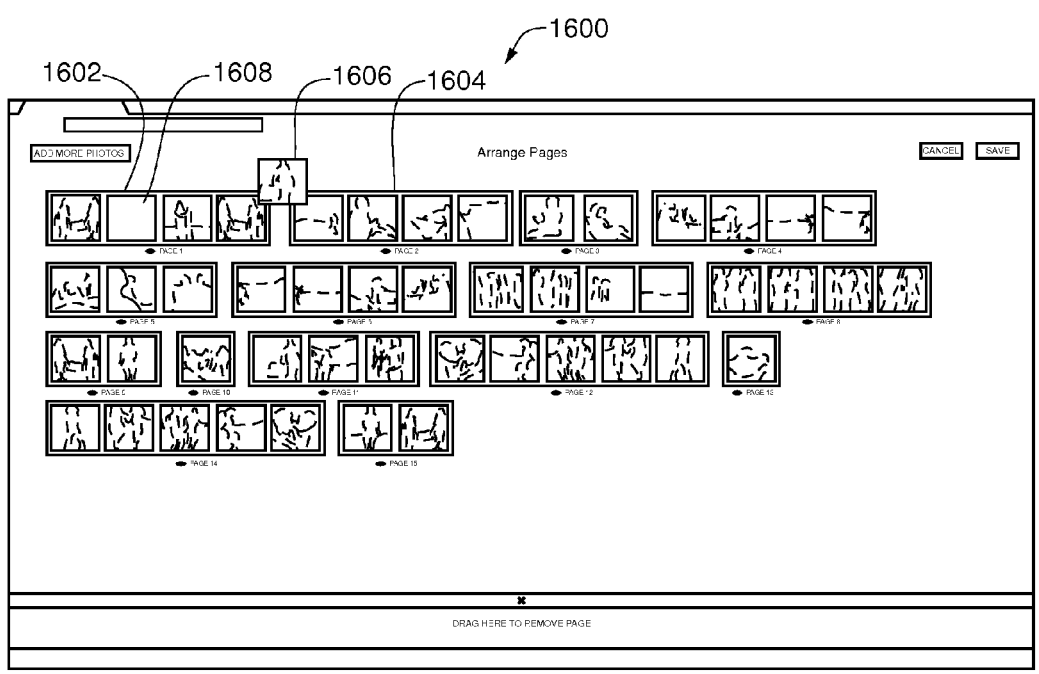
FIG. 16 is a diagram showing a new spread pre-creation by detaching a photo from an existing spread, according to one embodiment of the invention.

FIG. 16 is an embodiment 1600 showing a new spread pre-creation by detaching a photo from an existing spread. A photo 1606 is dragged from a spread 1602, and the dragged photo 1606 is dragged to middle of the spread 1602 and an adjacent spread 1604. After the photo 1606 is detached from the spread 1602 by dragging, a placeholder 1608 is displayed at the spread 1602 to indicate the original location (placeholder or gap) of the photo 1606.

Figure 17:
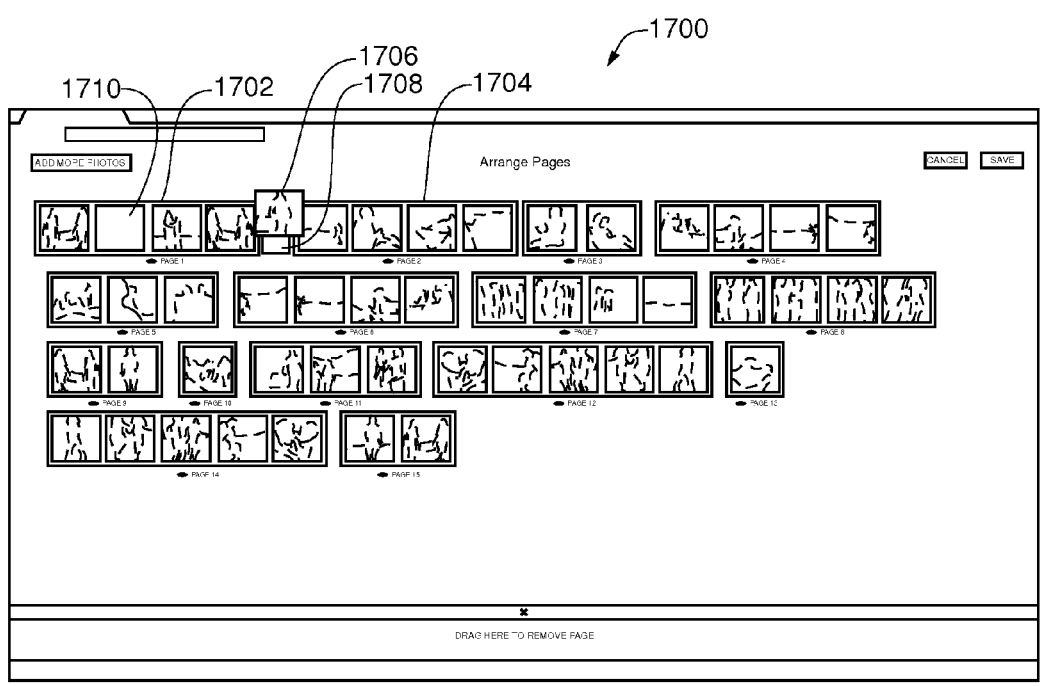
FIG. 17 is a diagram showing a new spread in-creation by detaching a photo from an existing spread, according to one embodiment of the invention.

FIG. 17 is an embodiment 1700 showing a new spread in-creation by detaching a photo from an existing spread. When a photo 1706 is about to be dropped between a spread 1702 and a spread 1704, an indication of a new spread creation is shown by a display of a new placeholder 1708. The old placeholder 1710 of the photo 1706 is displayed until the photo 1706 is actually dropped or released to the new placeholder 1708. The new placeholder 1708 is also a placeholder for a new spread. After the photo 1706 is dropped to the new placeholder 1708, the old placeholder 1710 disappears.

Figure 18:
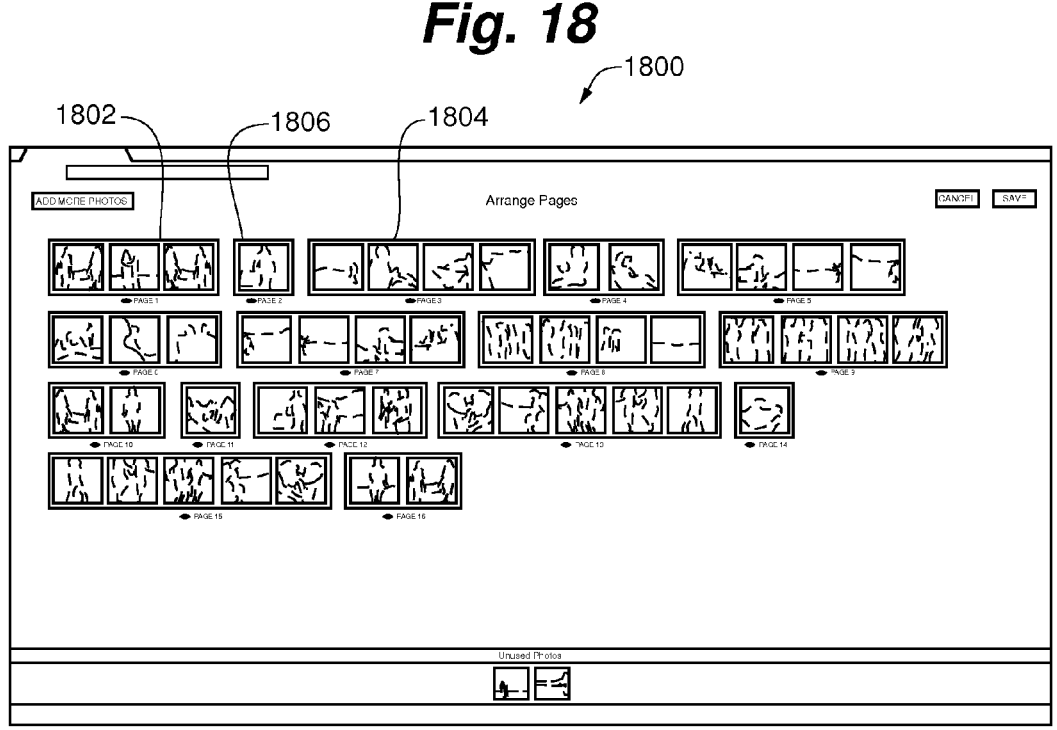
FIG. 18 is a diagram showing a new spread post-creation by detaching a photo from an existing spread, according to one embodiment of the invention.

FIG. 18 is an embodiment 1800 showing a new spread post-creation by detaching a photo from an existing spread. A photo 1806 is now on its own, newly-created spread, meaning a new spread having the one photo that was previously detached from an existing spread. When the photo 1806 is dropped between two spreads 1802 and 1804, creating now the new spread 1806 with a single photo, the adjacent spreads 1802 and 1804 will shift to the left or right, as appropriate, to adjust and accommodate a space for the new spread 1806 between the original spreads 1802 and 1804.

Although specific arrangements and specific movements were described in relation to FIGS. 10-18, it should be understood by one of ordinary skill in the art that these specific movements are merely illustrative, and examples of embodiments in which the present invention may be implemented, and are not intended to be exhaustive or limiting the manner in which the invention may be implemented. The photos, pages, and spreads may be moved about in various combinations, sub-combinations, orders, sequences, sub-sequences, and so on. One of ordinary skill will recognize that various combinations of movements, which are illustrated here, would be within the scope of the inventive embodiments.

Other Exemplary Embodiments for Illustrative Purposes

The language in the examples or elaborations below are context-specific embodiments, and should not be construed to limit the broader spirit of the present invention.

To help a user in creating a photo book, the present invention automatically inserts content into an automatically selected design for the user. Automatic insertion of content greatly helps in auto-flow/auto-fill algorithms and in design updates, without a need to re-start designing a book from scratch each time when a user wants to update to a new design. Content refer to photos, text and inputs from the user (user inputs, user interactions, behavioral observations, etc.).

Content is analyzed along with a selected layout and a selected design of a book. Content analysis uses (A) image information automatically derived by the system ("automatic image information"); and (B) image information derived though user's interactions or behavioral observations ("observed image information"), as discussed in greater detail below. Based on the information from (A) and (B), the system performs: (C) automatic photo grouping; and (D) automatic content insertion into designs.

A) Automatic Image Information

Image Information Derived by the System

A.1) Photos

For photos, the invention will analyze images to determine:

Saliency: Saliency is a most relevant part of an image as determined by image analysis or user's behavioral observations. By using saliency detection, the invention can store the areas of the photo that are of interest. These areas can utilize progressive reduction algorithm for saliency boxes. A saliency box is calculated by generating a saliency map, and searching an area that has a highest interest score. A searching box is adaptive. When a saliency area is small relative to a photo, the system relaxes the threshold to allow more contents in the area. When the saliency is large, the threshold is more strict.

Face: By using face detection, the system recognizes where faces are situated in a photo.

Computer Vision Analysis: The system applies image analysis to detect qualities of photos; the qualities include, such as, darkness, blurriness, colorfulness, simplicity, brightness, contrast, balance of light intensity over a photo, and harmony of color interaction.

Photo Similarities: Visual similarity of a photo relative to other photos.

Photo Information: This includes file name of a photo, dimensions (width and height), time of photo capture, make and model of the camera used in photography, aperture, shutter speed, exposure compensation, ISO, flash, focal length, and GPS location.

A.2) Text

For text, the system looks at:

Text Metrics: The system calculates space occupied by text in a textbox area. This includes width and height of the text at a given size. This way, the system can position the text with no cutoff by adjusting text size and other factors, such as, font.

Captions for photos: Captions can be provided with photos, either through an API or other format. Captions can be mined through image analysis and computer vision. For example, the system can run photos in a design page through an analyzer that predicts that a photo bears the Eiffel Tower, and puts a label "Eiffel Tower" alongside the photo on the page.

B) Observed Image Information

Information Derived Through User's Interactions

As a user interacts with selected photos in a design, the invention monitors the behavior of the user and learns about the content through the user's actions on photos. Here are some ways the invention learns the user's interests:

Photo Areas of Interest: By tracking the users' zooming and panning behavior, the invention can understand what areas of photos are more important over the computer vision algorithms that the present invention may use. For example, if the user takes a photo that is 400× 300 pixels in size and pans/zooms the photo in a photo slot so that the bottom left quarter of the photo is showing in the photo slot, the invention learns that the bottom left 200×150 of the image holds importance to the user. The invention can further subtract off a buffer adjustment to the resulting subsection of the photo. By subtracting away from the resulting 200×150 part of the photo, the invention can make a best guess of an actual area of interest of the photo. This buffer adjustment can be calculated in the same way as when the invention seeks to add a buffer adjustment on top of the area of interest of a photo.

Photo Importance: If a user swaps photos on a page, the invention can use this information to understand photo importance/hierarchy on a design page.

C) Automatic Photo Grouping

Once photos are selected, the invention automatically arranges the photos into pages/spreads. If photos are more related to each other, they are more likely to be grouped together.

C.1) Multidimensional Grouping

For photos to be related to each other in a photo set, they may have to be either taken at a close time-range, or appear to be similar. The invention checks photo's timestamps and measures similarities between photo pairs to decide if photos should belong to a same page/spread or not.

Timestamps: Most of the modern cameras provide timestamp information. When photos are taken in an event, they are naturally close to each other by time. The invention applies algorithms to cluster the photos together by timestamps, and thus separate the photos into logical events.

Similarity: Timestamps alone may not always produce best results for grouping. The invention further groups photos by image similarities to place related photos together in a layout/design. For example, a user can take different sceneries within a close time range. By detecting similarities of photos, the invention can arrange the photos together by photo similarities or separate them into two groups of different sceneries.

Multiple cameras: When family or group photos are taken by multiple cameras, their timestamps may not be accurately aligned. For example, when people are traveling internationally, smartphone cameras are often automatically adjusted to a local time, while regular cameras are not often auto-adjusted to the time change: this may create several hours of time difference between the two camera types. The invention solves this misalignment in time difference: when multiple cameras are detected in a photo set, correct orders of all included photos ordered correctly. The invention assumes that a time offset is consistent for the photos from the same camera, and that different cameras may have different time offsets. Photos are sorted by timestamps for each camera.

The invention calculates a matching score as follows: for every photo, the invention searches nearby photos from a set of photos, and calculates photo similarities and time difference. A higher matching score is obtained if photos are similar and their timestamps are closer to each other. Summation of all individual photo matching scores is a score of the sequence in which the photos may be grouped. When all sequence scores are calculated, the invention picks the highest scored sequence. If the user has a third set of photos, the invention will repeat this process by treating the first two photo sets as already paired. The same calculation is used when multiple cameras are involved.

Photos without timestamps: Timestamps can be lost or not be available in some cases. In such cases, the invention sorts photos by natural orders, such as filenames, or uploading orders. Then, the invention progressively groups them by photo similarities until the photos form into book pages. The invention calculates similarity scores among all possible pairs of photos and then sorts these scores. Highly similar photos are grouped together first. The invention continues with the grouping process until a target group cluster numbers are achieved. During this process, the invention may need to evaluate similarities between two groups containing multiple photos. Group similarity is an average of all possible similar pairs of photos in photo sets.

Photo importance: Best photos are selected by its own group for highlighting purposes.

C.2) Aesthetic Rules for Grouping

Photo grouping is designed to create a pleasant-looking spread. Internet users like to focus on important photos in creating their books. Embedded in computer algorithms, the invention allows most attractive photos to be as a single spread in a group. The invention also adjusts spread counts by a number of photos. When there are fewer photos, the invention stretches the number of the groups to make the book appear having more pages. When there are many photos, the invention compresses the number of groups to not exceed the number of maximum pages available in a photobook.

D) Automatic Insertion of Content into Designs

Once content is accumulated from a server (automatic image information) and user's inputs (observed image information), the present invention utilizes a set of algorithms to lay the content onto a page. The algorithm(s) will utilize the following components described below:

D.1) Photo Level Ranking

By analyzing the information derived from a server (automatic image information) and user's inputs (observed image information), the invention determines how to place/position photos in a design so that a placement of the photos are in correct spots, and are panned/zoomed to optimal locations. Photos are scored with photo quality based on computer vision analysis. Computer vision analysis may be facial recognition-related analysis or not related to facial recognition. Some photo/image heuristics that can be employed to calculate photo/image importance or image scores are:

- Using identity and count of faces in photos to increase or decrease importance of a photo: Face recognition is used to identify faces in different photos. Each unique face is grouped together. Faces with higher frequency connote higher importance for that individual (subject) since they (faces) are more popular in a photo set. In some cases, the invention recognizes faces and give extra importance to main characters of a the photo set, i.e., a bride and a groom.
- Reducing scores of photos for blurriness or undesirable traits (too dark or over exposed).
- Using camera settings to determine the environment in which photos were taken.
- Detecting artistic photography techniques, such as, lens flare or motion blur.
- Using photo brightness, contrast and other photo characteristics.
- Using machine learning to recognize important/relevant objects in photos, such as cars, pets, houses, and similar things that might indicate photo importance.
- When a face is detected, face properties are evaluated. For example, if a person's face is smiling, a photo score is higher. Attributes, such as, size, position or clarity of a face affect a score of the photo. The invention combines attributes non-linearly to give a quality evaluation to a face.
- A saliency box performs a target analysis on a photo. For example, within a saliency box, if there is a face, more importance is given to the face as the face is within the area of interest in the photo.
- Scene detection, such as, landscape detection, mountain detection, indoor/outdoor detection, and naturalness or man-made detection can affect photo scores.
- Using face detection related scoring, for example, when faces are detected from a photo, the invention combines size, location, smile confidence, orientation, clarity, and exposure to determine a facial quality score.
- Combing all relevant scores to generate a final photo quality score.

D.2) Buffer Calculations for Best Fitting Content into Photo Boxes

The invention can draw a box around important parts of a photo. How a photo gets positioned inside a photo box can change based on the size of a relevant photo box that is available in a layout or design. For example, when face detection and saliency detection detect a person's face and body in a photo, the invention positions the photo at a photo box in a manner that the areas around the person's face and body are shown. This would be a case if the photo slot is large and if there is more real estate on a design page. This is implemented by employing a buffer over/above the box where the invention determines an area of interest in the photo.

In some cases, when a photo slot is as large as a page, the buffer around the area of importance of a photo may extend out to either a top, a bottom, a left, or a right edge of the photo. If a photo slot is very small, the buffer around an area of interest might be small or non-existent.

D.3) Area of Interest in a Photo

An area of interest in a photo is calculated by combining several computer vision processing techniques to build a box that includes all important parts of the photo (automatic image information), together with information from user interactions (observed image information). Computer vision processing techniques include, but are not limited to, face detection, face recognition, saliency detection (saliency boxes), user specified areas of interest, and so on.

D.4) Scoring for Inserting Photos into Layouts

A design contains multiple photo slots. Each photo slot may be modeled as a rectangle or square. The visible part of a rectangle is a focal box of a photo slot. A photo is processed for saliency and face detection, and each detected area is labeled and represented on the photo as a rectangle with a location on the photo.

- For a photo slot to match a photo, the invention first zooms the photo so that the most of the saliency and face boxes are shown with a minimization of photo cut-off. Photo positioning with a photo slot is calculated at this step. Positioning strives to minimize the area that is cropped. If cropping is unavoidable, the area of interest is either centered to a saliency box, or best positioned to faces. Face cropping may be minimized to a smaller area. A matching score is a combination of photo area cut-off, saliency area cut-off, and face area cut-off. Each cut-off area has its own importance, where faces may have highest importance.
- For each design to match a set of photos, photo permutation is a factorial of a photo set size or a number of photo slots. These calculations may be costly if there are many photos to match up with an equal number of photo slots. The invention performs a depth first search with limited branching to traverse possible matching patterns. For each permutation of photos, the invention combines individual matching scores together to get a score related to permutation. The depth search algorithm decides a best score selection and thus generate a best fitting for this design set, and this score can also be used to compare a matching fit with other design sets.

D.5) Determining a Best Design for Contents

In a case of an auto-flow algorithm, the invention may need to insert content derived from a user into design pages. In order to this, below is an implementation of the heuristic:

- The invention selects designsets for a theme.
- The invention finds best possible designs from the designset that can fit with contents (photos and text).
- Using ranking algorithms and other heuristics, the invention determines a best fitting design from the designset.

D.6) Dynamic Text Insertion Across Platforms

Software clients render text differently than photos. Text often behave differently when trying to create books that are editable across multiple software clients. Text entered into a book through a browser might render as two lines of text. However, for example, when it is rendered on a specific user device, such as, a native APPLE IPAD client, text could show up in three or more lines.

To alleviate this problem, when a user adds text to a page, the text is passed into a text processing engine that breaks it up into text lines. Each text line contains a string of text, its coordinates and size on the page. When the text is rendered on a different client, the client is responsible for slightly compressing character spacing for any text that exceeds the size of the line. By utilizing text metrics, the text to be inserted into textboxes on a design page will fit without requiring the text to cut off. The algorithm works as follows:

- The textbox has a default size. Say, for example, size 16.
- Check if the given text fits into the textbox, and check how it fits if it has to stretch to multiple lines.

If it does not fit, decrease the text size and see if the text fits (with size 15). If it still does not fit, decrease the size again until it fits.

If the system has to decrease the text size beyond a minimum threshold, say for example size 10, then it may be concluded that the text does not fit at all.

D.7) Positioning Photos in Photo Slots with Focal Boxes

A design may have content that are overlapping other content. This can happen for many reasons, but most likely will be for stylistics reasons. When an element is overlapping a photo slot, the photo may be repositioned in a photo slot so that the point of focus stays away from the overlapping elements and thus keeps an adequate margin from these items. This is implemented by utilizing focal boxes. A focal box is defined on a layout or design as a rectangular area within a photo slot that is considered as "visible" or "unobstructed." In other words, it is the area on a design where the photo can be seen clearly. If a photo slot is completely uncovered, then this area would simply be the dimensions of the photo slot itself. A focal area can be represented by any shape, not just a box, as long as it is a continuous shape. Accordingly, the invention ensures that the photo is placed inside the focal box of the photo slot.

E) Layouts, Designs, and Themes

After a user uploads a set of photos from a user device to a server, the system can create a project automatically using the uploaded photos. For that, the system will create canvases in the project by choosing appropriate designs, and fill photo slots and text slots with the user's photos and text. So, the quality of the project directly depends on what designs the system chooses for the user's photos.

In order to create the project automatically, the present invention offers a structure to develop designs in a flexible way, allowing the user to shuffle and/or change designs easily while still keeping the same theme. The structure looks like this:

Layoutset—set of layouts. Layoutsets are used to group layouts by their type, like magazine layouts, signature layouts, etc.

Layout—specifies a number of photo/text slots and their positions on a spread. No styling (like frames, stickers, backgrounds, etc.) are applied on a layout.

Design—adds a style on top of a layout, like stickers, frames, backgrounds, and borders, along with their colors, font styling, etc. CAML (a type of markup language) may be used to implement the functionalities of the present invention. CAML specifies styling as well as positioning information.

Designset—set of designs. Designsets are used to group designs by layoutsets. Every layoutset can spur off many designsets. A design from a given designset can only choose its layout from the associated layoutset (related to that designset).

Theme—a collection of designsets. When a theme gets used in a project, it is essentially a collection of designs being used, since a theme has many designsets, each of which has many designs.

In one embodiment, the user wants to create a canvas. The user has a set of photos and a theme as input parameters. The system needs to automatically select a design for the canvas. To do this, the system:

Selects all designsets for the selected theme.

Finds all designs within these designsets, with a layout which has a given number of photo slots and text slots.

Finds a best fit within the selected designs for the uploaded photos. So the system chooses a best design by using important regions of the photos ("saliency") and using proper dimensions of the photos. A photo analysis may automatically provide a best design. Alternatively, according to some embodiments, the best design may also be manually selected or adjusted by the user.

E.1) Layouts

Spread Size: In one embodiment, a square aspect ratio of 0.98439 may be used, for example. Layouts may be built in bleed so that the edges of the layouts can be trimmed away. This may require a notion of a viewpoint in the editor itself. The bleed, in an embodiment, may be 1/8" and may be calculated off of a 8.5" book. If the height of the book is characterized as 1000 pixels, then 1/8" would be 14.71 pixels. This way, the dimensions of a spread may be 1998.2×1029.42 for the purposes of building layouts, in one example.

Cover Size: For the cover, a programmatic CAML (a markup language) document may be made, which may change widths based on what the spine width should be for a given book.

E.2) Layoutsets

A layout, or the positioning of the photos and textboxes, should reflex a "de-stylized" approach, one that has the notion of being "as default as possible." In a designset, a designer can make a tweak on top of the layout.

In one embodiment, when a photo slot is close to 4:3, 3:4, or 1:1, the photo slot should be made exactly that size. This is especially the case when the photo slot is not part of a grid and is instead floating on the page. Frames may be applied to this. A frame may be re-sizeable or fixed for certain aspect ratios.

Textboxes can support 120 characters, in one embodiment. This is not a limitation.

E.3) Designsets

Book designers may build a designset from one layoutset. For each layout in the layoutset, designers can dress up the layout for that designset. There may be some styling properties which may push the limits of a layout. The designer will then have the ability to tweak any layout on a design-by-design basis. For example:

Textboxes can be resized if the designer wants to use a larger font size in that designset.

Textboxes can be resized and moved if the designer wants to add a text background.

Photo slots can be extended or moved to accommodate elements in the background.

In some embodiments, the invention mines photos, meta-data, use-case, and user data to extract useful information that will allow the processes described here to decide how best to auto-create a media-based product. In one embodiment, three pieces of information, or any subset of this information, may be used to auto-populate the media-based product: (F) image analysis (including meta-data in images), (G) use-case analysis, and/or (H) user analysis. An illustrative example of each is now discussed.

F) Auto-Creation of Books Using Image Analysis

Before getting into the details, the inventors would like to remind the reader of the high-level goals:

1. Get users a book that they are thrilled with ordering as quickly and effortlessly as possible.
   a. Average creation time should be 15-20 minutes
   b. Median creation time should be 10 minutes
   c. 2-3× the completion rate of book creation 2. For the people that choose to edit their projects, this should be optional, so that even without editing, a beautiful photobook is created.

The following assumptions were made by the inventors based on years of experience in producing photobooks:

1. The majority of users with the intent on buying who started but did not purchase photo books didn't complete the purchase because of difficulties in producing a finished product—either too many decisions added anxiety to the process, and/or it was simply too time consuming.
2. By simplifying and streamlining the process, the inventors recognized that they can open up the potential user base to the mass population of people who have never embarked on the process of creating photobooks.
3. If the notion of a perfect photo book exists for a user in which they would have to tweak for hours to perfect, then a nearly perfect photobook achieved in less than a minute (through auto-book creation) would excite the user enough into ordering the book. Note: Some of this behavior can be seen with the photobooks purchased from the inventor's mobile app, where users are purchasing books created in a button click on a mobile device, but totally lacking of text, layouts, backgrounds, or any editing options whatsoever.
4. Most mainstream users would stay away from page-by-page editing and instead would find high-level editing more useful. That is, the unaddressed market would prefer to edit their book in a view devoid of layouts and styling, and one where the user can understand how his or her photos and text transition from page-to-page at a high level.

After analyzing purchase history, the inventors found that 80% of books fall into the following general categories:

1. Wedding
2. Family
3. Baby
4. Travel
5. Year in Review
6. Everyday

Given this, the present inventors developed a system and method for automatic photobook creation by utilizing a use-case identifier which indicates a particular use-case for the photobook. That is, the inventors realized that a handful of use-cases comprise the majority of books created and the inventors can, therefore, build experiences that cater to these use cases. This means that custom business logic and heuristics per use-case category can be developed that can lead to substantial increased usage given past usage data. With these custom heuristics, the inventors developed a system that can select and organize all the content involved in building of a photobook automatically with a minimum of user involvement.

F.1) Image Analysis Examples

First, image analysis, auto-corrections/auto-adjustments, and meta-data extraction is performed. By leveraging computer vision, the present invention can extract relevant information from a photoset and perform automatic adjustments. Some examples are described below:

Analysis
  Detect similar photos
    For example, by using the similarity algorithm.
  Detect faces in photos
    Smiling, blinking, etc.
      Identify the people in the photos (allow us to group by faces)
        For example, in a wedding book, who is the bride and groom?
  One-off characteristics detection
    For example, in this wedding book, which photos have the bride in her dress?
    For example, in this travel book, which photos, if any, take place on a beach?
  Detect undesirable photos, and remove them from the photobook
    Blurry photos
    Bad lighting
    Eyes closed
    Etc.
  Detect where the focus and important part of the image is
    For example, image saliency detection
Auto-corrections/auto-adjustments
  Auto-orient photos for users
  Auto adjust photos for color/brightness/contrast/etc.
  Automatically fix redeye
  Other auto-correction/auto-adjustments
EXIF metadata
  For example, prepopulate a wedding date from the date when the most of photos were made.
  If photos contain GPS coordinates (most smartphone photos do), extract (reverse geocode) country/city/resort name if it is a travel book, and pre-populate a book name. For example, "Lake Tahoe 2012."
  EXIF data might include, but is not limited to:
  Manufacturer of camera
  Model of camera
  Orientation (rotation)
  Software
  Date and Time
  YCbCr Positioning
  Compression
  x-Resolution
  y-Resolution
  Resolution Unit
  Exposure Time
  FNumber
  ExposureProgram
  Exif Version
  Date and Time (original)
  Date and Time (digitized)
  ComponentsConfiguration
  Compressed Bits per Pixel
  Exposure Bias
  MaxApertureValue
  Metering Mode
  Flash
  Focal Length
  MakerNote
  FlashPixVersion
  Color Space
  PixelXDimension
  PixelYDimension
  File Source
  InteroperabilityIndex
  InteroperabilityVersion F.2) Object Detection Examples According to the present invention, various image analytics may be used to detect various objects in the image data. These image analytics may be configured to detect any number of objects. Some illustrative objects are listed below. However, the present invention is not limited to these objects, and various object detection processes may be used to determine one or more objects within the images and group based on the detected objects, and are all within the scope of the present invention:

Presence of people
Presence of pets
Wedding cakes
Vehicles
Groups of people
Sizes of objects
Face detected (a face is a close-up of a person)
Type of vehicle detected (SUV, car, convertible, etc.)
Animals
Structures (for example, Eiffel Tower, pyramids, wedding chapel, etc.)
Sport items (for example, basketball, football, volleyball, etc.)
Landscapes
Indoor vs. outdoor
Nighttime vs. daytime
Nature features (for example, trees, lakes, beaches, etc.)

G) Auto-Creation of Books Utilizing Use-Case Analysis

Second, a usecase of the book is obtained, either manually by asking the user, or automatically through one or more heuristics. By asking the user for the usecase of their book, the process can do a better job of improving the processes used to build the book for the user. For example, in the "wedding" usecase, the process can append additional heuristics to:

Identify photos with the wedding cake
Identify photos with the alter
Determine if the photos are chronological
Add special text boxes throughout the book such as a place to label the "groom" and the "bride."

Some examples of use cases which a user may manually select or which may be determined through automatic heuristics include, but are not limited to:

Wedding
Travel to countries, cities, climates, etc.
  travel to tropics
  travel to Africa
  travel to Paris
  travel to the beach
  etc.
Night out on the town
Hanging out with friends
Baby
Year in review
Water—fun by the pool, beach, lake, etc.
Snow—ski trip, playing in the snow, etc.
Road trip
And so on

H) Auto-Creation of Books Utilizing User Analysis

Third, user analysis is performed on the expected user of the finished product. By leveraging FACEBOOK connect, or other social media platform, the process can use information about the user to help automatically detect different properties in the photo set. For example, if a user logs in with FACEBOOK, the process can examine the user's profile picture to get a sample of his or her face. From this, the process would know which photos in a set are of the user. If, for example, the process knows the user wants to make a wedding book (use-case) and the user's face shows up the most out of anyone else and the process knows they are a male (from FACEBOOK), then the process can infer that this person is a groom.

Some examples of user data which may be determined through automatic processes such as those described above (or which a user may manually enter) include, but are not limited to:

Gender
Age
Location (geolocation and/or city/state)
Relationship status
Friends
Schools attended
Physical characteristics (height, weight, etc.)
Facial features
And so on

I) Other Exemplary Embodiments

In the new layouts, we would like to introduce a concept of "layout variability". The concept is to give designers the ability to introduce "controlled" randomness into layouts.

Layout Structure

Layouts will be designed void of any styling. The concept here is to build a labeling system for the behavior of the different elements on a page. For example, a layout can have styling added to it along with the labels of those items. In this example, we can have the following items defined:

F1 (frame #1)—Basic frames for most photo slots in the book
E1 (embellishment #1)—250 px×400 px image, must be able to sit on top of D1
E2 (embellishment #2)—220 px×400 px image, must be able to sit on top of D1
E3 (embellishment #3)—50 px×40 px image, presented in a small size on the page and can be rotated in different directions, including upside down.
D1 (drape #1)—must be the width of an entire spread and must be able to come up from the bottom of the page.
Q1 (quote #1)—400 px×100 px—must be able to sit on top of background.

Note that the descriptions above are not contextual in nature, but are instead more behavioral in nature. The idea is to define a templating language where all the elements on the pages can be swapped out when different styling packages are applied. For example, in a different styling package like "Haunted Halloween", the E1 might be a scarecrow instead of a snowman.

Grouped Items

Sometimes, a designer may want to combine certain items from the styling package to create other items for that styling package. For example, in a certain styling package, there is a red, blue, and green flower embellishment (E1, E2, E3) respectively. Let's say that this styling package calls for a drape (D3) that has to be able to come up from the bottom, top, and side of the page. To create this, the designer thinks to themselves that it would be really nice to combine the three flower embellishments to create this larger drape.

In the styling package creation interface, we would give the designer an area to work with to create this drape in line with the size of the drape, say 1000 px by 200 px. In this rectangular area, they could then drag in multiple copies of E1, E2, and E3's, and position them randomly or as they like. When they save this drape (D1), we will do two things:

1. We will create a rasterized image of this drape and upload it as one image file.
2. We will store the canvas positioning of the items inside this drape so that we can reproduce this drape from the components used to create it (E1, E2, and E3).

The purpose of #2 is so that when a user is editing a page, we can use the image representation of that element (in this case the drape) for performance reasons. As one image, it's much easier to move around and resize than if we have to resize a ton of elements. However, if the user chooses to ungroup the element, it will degrade to its individual components and they can move those around.

Photo Slot Regions

Designers define a region that a photo slot can occupy. When a photo is placed, the photo slot is best fit into this region. This allows a photo slot to change from landscape to portrait based on its photo. Photo slots can be anchored to an edge or corner of the region.

We will also have fixed-aspect-ratio photo slots for layout designs that require it (i.e., magazine or comic-book style layouts).

Photo Slot Rotation

To add variability to layouts, designers can define a range for a photo slot's rotation. When a photo is placed, the photo slot is slightly rotated at a random angle. We could also specify a set of angles instead of a range (i.e., [5, 10, −5, −10]).

Layout Relationships

One of the findings from the inventors' research was that customers have an affinity for designing spreads, that is, two pages pieced together. This shouldn't come as a surprise given that pages are visually side by side. With a move to lay-flat books, this tendency to design in spreads will only increase.

By linking layouts with each other, we can enable different kinds of relationships. Each layout will contain a side that it prefers being on (left/right/either) and will relate to other layouts to specify:
1. Which layouts it gets paired best with
2. Which layouts it forms a spread with
3. Which other layouts are variations of this layout—In this case, the photo slots and text slots are in the same place, just the styling for that page changes.
4. Which other layouts it pairs with from different aspect ratios [optional]—Switching between aspect ratios should be a relatively rare occurrence.

Knowing these relationships has three immediate benefits:
1. Our auto-book creation algorithm can create visually consistent spreads and understands explicitly how to construct pages together.
2. If a user decides to spend time editing, we can use these relationships to suggest layouts to complement their current designs. The layout panel can automatically sort layouts by ones that are most likely to fit.
3. By specifying how to use each one-page layout, we can construct many permutations of good looking spreads without having to repetitiously design similar spreads over and over again.

Special Layouts

In some cases, we may want to create special contextual layouts for certain use cases. For example, in a family history book, we could want a special layout to be used for a family tree. Or perhaps we want to make layouts specifically designed for the cover of a book. We can achieve this by attaching tags to the layouts or metadata to communicate these subtle differences.

Linking Layouts (Related Items)

Since we can have a set of "left-hand" pages match up to a set of "right-hand" pages, we can write an algorithm to link items that overlap the two pages. In theory, we should never have to actually persist the related item relationship, because it can be calculated quickly on the fly. In one embodiment, the algorithm is:
1. As an optimization, detect first which items on the left page spill over onto the right page.
2. If the coordinates spill over and the content for this item can be detected on the other page (i.e., same photo_id, sticker_id, text, etc.), convert the particular item and all similar items on the other page to a spread level coordinate system. If it is an empty photo slot, then it must be detected against other empty photo slots on the other page.
3. If two similar items are located in the sample spot, either with exactly matching coordinates, or with slightly rounded numbers, then move on to next step.
4. For these two items, see if the rotation, width, and height match up either exactly or with some minor rounding. If they do, then their is a match and these items should be linked.

Style(s) or Styling(s)

Styles are a packaging of similar visual elements that define the look and feel of a book. A design specifies style(s) or styling(s) on top of a layout. These styling elements include, but are not limited to:

Photo frames & borders
Backgrounds
Fonts
    Size, style, color, etc.
Stickers
    Drapes
    Fasteners
    Strips
    Swirls
    Etc.

A style can be applied to a whole book, or to a section of a book. Lets take the case of a user making a Year in Review book. They might want to choose a winter style that has creative snowmen and snowflakes for winter months, and an elegant style with wispy flourishes for a wedding event, and a joyous festive style for a Fourth of July party.

CSS for Canvas Creation

All styling descriptions for a page will reduce down to an open CSS-like text-based format that will be used to apply styling to pages. One of the main differences between this and the CSS used with HTML is that this implementation won't have the ability to modify the structure of the page (i.e., move elements around).

Styling Relationships

Like layout packages, styling packages can be related to each other in different ways:
1. Context—For example, all the styling packages are designed for wedding books
2. Variations—A group of styling packages can be variations off each other.
    All elements are the same, but different color palette used
    Colors and fonts are the same, but the stickers are switched out for other similar stickers.

Layouts and Styling

In order for a layout to be used, all the styling elements must be available. If one element is missing, then the layout cannot be used.

Canvases ("Pages")

Canvases encompass the layout, design (styling), and content together. However, instead of storing this information explicitly, in one embodiment, we are going to simply link to the corresponding pieces.

For the layout, the canvas will simply link over to the layout. For modifications to the layout, there will be a "diff" stored to explain how to modify the old layout to create a new one.

For the design (styling), this will be treated similarly to the layout. Styling will be a merging of the section's styling plus any modifications to the styling on the current page.

The content (photos, text, etc.) links back to its corresponding parts in the section from where it came to avoid duplication. In one embodiment, for text with markup (i.e., highlight a word), this will translate back into the open text markup format that we choose to use and will be stored in the section, not on the canvas.

CONCLUSIONS

One of ordinary skill in the art knows that the use cases, structures, schematics, and flow diagrams may be performed in other orders or combinations, but the inventive concept of the present invention remains without departing from the broader spirit of the invention. Every embodiment may be unique, and methods/steps may be either shortened or lengthened, overlapped with the other activities, postponed, delayed, and continued after a time gap, such that every user is accommodated to practice the methods of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor coupled to a memory. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system, and executes various computer software applications, components, programs, codes, libraries, objects, modules, etc. indicated collectively by reference numerals in FIG. 1U to perform the personalization techniques described above.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A method of creating a printable product, the method offered by a user device in a client-server environment, the method comprising:

providing an interface to allow a user to select a plurality of photos at a photo editing area of said user device;

receiving an upload of said plurality of photos from said user device to a server, said server comprising a data repository for storing said plurality of photos and an engine for analyzing said plurality of photos;

creating an automatic grid preview of a plurality of spreads, each spread comprising one or more photos of said printable product at said user device, each spread consisting of two opposing pages of the printable product, and wherein said grid preview is rendered by said server onto said user device;

offering to said user an option of re-arrangement for manually re-arranging said plurality of spreads and said plurality of photos, wherein each spread or each photo is offered for re-arrangement, wherein a manual re-arrangement over-rides contents of said grid preview, wherein each spread or each photo is re-arranged by at least dragging at said grid preview a photo from a first spread to outside of said first spread, and dropping said photo between said first spread and a second spread, wherein said dropping automatically creates a new third spread comprising two opposing pages and said photo, said new third spread located between said first spread and said second spread;

sending to a printer an order to print said printable product; and printing said printable product on paper, wherein after said printable product is printed it becomes a delivery item on behalf of said user who placed said print order.

2. The method of claim 1, wherein said photo editing area offers a temporary photo storage area to store an unused photo.

3. The method of claim 2, wherein each photo is further re-arranged by: deleting a photo from another spread, and inserting a photo into another spread, wherein said deleted photo is automatically dropped at said temporary photo storage area, and wherein said inserted photo is automatically removed from said temporary photo storage area.

4. The method of claim 1, wherein said printable product is a photobook.

5. The method of claim 4, further comprising:

creating a manifested preview of said photobook based on said re-arrangement, wherein said manifested preview is a three-dimensional virtual production of a printable photobook graphically showing a front cover, a back cover, a spine, and said plurality of spreads, wherein said front cover, said back cover, and said plurality of spreads are virtually flappable or turnable via a computer mouse or a keystroke or a touch gesture, wherein said manifested preview is created before sending to said printer said order to print said photobook.

6. The method of claim 4, further comprising:

printing a shipping label for shipping said photobook to said user after printing said photobook, wherein a shipping address is provided by said user.

7. The method of claim 1, wherein said grid preview comprises automatic grouping of said plurality of photos, wherein said grouping is based on at least one aspect of image heuristics, wherein said at least one aspect of image heuristics comprises a use case.

8. The method of claim 1, wherein each photo, by image analysis, is analyzed to extract image metadata.

9. The method of claim 1, wherein said contents comprise said plurality of photos, said plurality of spreads, text, captions, and relevant locations and sizes thereof.

10. The method of claim 1, wherein the photo is further re-arranged by: zooming into the photo, zooming out of the photo, and panning the photo.

11. The method of claim 1, wherein said first spread is further re-arranged by, changing a default layout of said first spread to a second pre-set layout.

12. The method of claim 1, wherein said grid preview is further re-arranged by adding an additional photo to said photo editing area by a new photo upload.

13. The method of claim 1, further comprising:

linking a layout on a left page of at least one spread, having the two opposing pages, to a layout on a right page of the spread.

14. The method of claim 1, wherein a location where the user can re-arrange the photos on a single spread is separate from a location where the user can arrange the photos between the spreads.

15. A non-transitory, computer-readable storage medium storing executable instructions, which when executed by a processor, causes the processor to perform a process of creating a printable product in a client-server environment, the instructions causing the processor to perform the steps of:

providing an interface to allow a user to select a plurality of photos at a photo editing area of a user device;

receiving an upload of said plurality of photos from said user device to a server, said server comprising a data repository for storing said plurality of photos and an engine for analyzing said plurality of photos;

creating an automatic grid preview of a plurality of spreads, each spread comprising one or more photos of said printable product at said user device, each spread consisting of two opposing pages of the printable product, and wherein said grid preview is rendered by said server onto said user device;

offering to said user an option of re-arrangement for manually re-arranging said plurality of spreads and said plurality of photos, wherein each spread or each photo is offered for re-arrangement, wherein a manual re-arrangement over-rides contents of said grid preview, wherein each spread or each photo is re-arranged by at least (a) moving at said grid preview a first photo from a first spread to a second spread, and (b) dragging at said grid preview a second photo from said first spread to outside of said first spread, and dropping said second photo between said first spread and said second spread, wherein said dropping automatically creates a new third spread comprising two opposing pages and said second photo, said new third spread located between said first spread and said second spread;

sending to a printer an order to print said printable product; and printing said printable product on paper, wherein when said printable product is printed it becomes a delivery item on behalf said user who placed said print order.

16. The storage medium of claim 15, wherein said photo editing area offers a temporary photo storage area to store an unused photo.

17. The storage medium of claim 15, wherein said printable product is a photobook.

18. The storage medium of claim 17, further comprising:

creating a manifested preview of said photobook based on said re-arrangement, wherein said manifested preview is a three-dimensional virtual production of a printable photobook graphically showing a front cover, a back cover, a spine, and said plurality of spreads, wherein said front cover, said back cover, and said plurality of spreads are virtually flappable or turnable via a computer mouse or a keystroke or a touch gesture, wherein said manifested preview is created before sending to said printer said order to print said photobook.

19. The storage medium of claim 15, wherein said grid preview comprises automatic grouping of said plurality of photos, wherein said grouping is based on at least one aspect of image heuristics, wherein said at least one aspect of image heuristics comprises a use case.

20. A system for creating a printable product, the system comprising:

a user device having a first processor, a display, a first memory;

a server comprising a second processor, a second memory, and a data repository;

a communications-link between said user device and said server; and a plurality of computer codes embodied on said second memory of said server, said plurality of computer codes which when executed causes said server to execute a process for:

establishing a client-server connection between said server and said user device;

providing an interface to allow a user to select a plurality of photos at a photo editing area of said user device;

receiving an upload of said plurality of photos from said user device to said server, said server comprising said data repository for storing said plurality of photos and an engine for analyzing said plurality of photos;

creating an automatic grid preview of a plurality of spreads, each spread comprising one or more photos of said printable product at said user device, each spread consisting of two opposing pages of the printable product, and wherein said grid preview is rendered by said server onto said user device;

offering to said user an option of re-arrangement for manually re-arranging said plurality of spreads and said plurality of photos, wherein each spread or each photo is offered for re-arrangement, wherein a manual re-arrangement over-rides contents of said grid preview, wherein each spread or each photo is re-arranged by at least (a) swapping at said grid preview a location of a first spread with a location of a second spread by moving both opposing pages of each spread simultaneously, and (b) dragging at said grid preview a photo from said first spread to outside of said first spread, and dropping said photo between said first spread and said second spread, wherein said dropping automatically creates a new third spread comprising two opposing pages and said photo, said new third spread located between said first spread and said second spread;

sending to a printer an order to print said printable product; and printing said printable product on paper, wherein when said printable product is printed it becomes a delivery item on behalf of said user who placed said print order.

\* \* \* \* \*